United States Patent
Takasago et al.

(10) Patent No.: US 9,726,798 B2
(45) Date of Patent: Aug. 8, 2017

(54) OPTICAL FILM, POLARIZING PLATE, AND METHOD FOR PRODUCING OPTICAL FILM

(71) Applicant: FUJIFILM Corporation, Tokyo (JP)

(72) Inventors: Rie Takasago, Kanagawa (JP); Hiroshi Matsuyama, Kanagawa (JP); Makoto Ishiguro, Kanagawa (JP); Shinichi Morishima, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/672,852

(22) Filed: Mar. 30, 2015

(65) Prior Publication Data

US 2015/0277006 A1 Oct. 1, 2015

(30) Foreign Application Priority Data

| Mar. 31, 2014 | (JP) | ................................. 2014-071861 |
| Jul. 8, 2014 | (JP) | ................................. 2014-140956 |
| Sep. 1, 2014 | (JP) | ................................. 2014-177467 |

(51) Int. Cl.

| C09K 19/34 | (2006.01) |
| C09K 19/54 | (2006.01) |
| G02B 5/30 | (2006.01) |
| C09K 19/20 | (2006.01) |
| G02B 1/12 | (2006.01) |
| C09K 19/60 | (2006.01) |
| G02B 1/11 | (2015.01) |
| C09K 19/04 | (2006.01) |
| C09K 19/30 | (2006.01) |

(52) U.S. Cl.
CPC ........ *G02B 5/3016* (2013.01); *C09K 19/2007* (2013.01); *C09K 19/2014* (2013.01); *C09K 19/348* (2013.01); *C09K 19/3486* (2013.01); *C09K 19/3491* (2013.01); *C09K 19/3494* (2013.01); *C09K 19/3497* (2013.01); *C09K 19/542* (2013.01); *C09K 19/601* (2013.01); *G02B 1/12* (2013.01); *G02B 5/3083* (2013.01); *C09K 2019/0448* (2013.01); *C09K 2019/3077* (2013.01); *C09K 2019/548* (2013.01); *G02B 1/11* (2013.01)

(58) Field of Classification Search
CPC ............ C09K 19/3402; C09K 19/3405; C09K 19/3408; C09K 19/3477; C09K 19/348; C09K 19/3483; C09K 19/3486; C09K 19/3491; C09K 19/3494; C09K 19/3497; C09K 19/542; C09K 19/548; C09K 19/0448; C09K 2219/03; G02B 5/3016; G02B 5/3025; G02B 5/3083
See application file for complete search history.

(56) References Cited

U.S. PATENT DOCUMENTS

| 7,688,403 | B2 | 3/2010 | Usukura et al. | |
| 9,164,213 | B2 | 10/2015 | Yaginuma et al. | |
| 2007/0054066 | A1 | 3/2007 | Usukura et al. | |
| 2009/0040433 | A1* | 2/2009 | Aiki | ................... G02F 1/133516 349/75 |
| 2010/0045901 | A1* | 2/2010 | Uehira | ................. C07D 277/64 349/75 |
| 2015/0168624 | A1* | 6/2015 | Yaginuma | ................ G02B 1/04 359/489.07 |

FOREIGN PATENT DOCUMENTS

| JP | 2004-238431 A | 8/2004 |
| JP | 2005-128503 A | 5/2005 |
| JP | 2008-297210 A | 12/2008 |
| JP | 4592005 B2 | 12/2010 |
| JP | 2011006360 A * | 1/2011 |
| JP | 2011-242723 A | 12/2011 |
| JP | 2012-255926 A | 12/2012 |
| JP | 2014-026266 A | 2/2014 |
| WO | 2005/050269 A1 | 6/2005 |
| WO | 2011/129404 A1 | 10/2011 |

OTHER PUBLICATIONS

Notification of Reasons for Refusal issued by the Japanese Patent Office on Jun. 21, 2016, in connection with Japanese Patent Application No. 2015-066390.

Notification of Reasons for Refusal issued by the Japanese Patent Office on Dec. 6, 2016, in connection with Japanese Patent Application No. 2015-066390.

* cited by examiner

*Primary Examiner* — Shean C Wu
(74) *Attorney, Agent, or Firm* — Edwards Neils LLC; Jean C. Edwards

(57) ABSTRACT

An optical film of the present invention includes a positive A-plate and a positive C-plate, in which the Re(450), Re(550), and Re(650) of the positive A-plate satisfy the relationship of Re(450)≤Re(550)≤Re(650), the positive A-plate is formed of a cured product of a composition including the liquid crystal compound A, and the positive C-plate is formed of a cured product of a composition including the liquid crystal compound C.

24 Claims, No Drawings

OPTICAL FILM, POLARIZING PLATE, AND METHOD FOR PRODUCING OPTICAL FILM

CROSS-REFERENCE TO RELATED APPLICATIONS

The present application claims priority under 35 U S.C. §119 to Japanese Patent Application No. 2014-071861, filed on Mar. 31, 2014, Japanese Patent Application No. 2014-140956, filed on Jul. 8, 2014, and Japanese Patent Application No. 2014-177467, filed on Sep. 1, 2014. Each of the above applications is hereby expressly incorporated by reference, in its entirety, into the present application.

BACKGROUND OF THE INVENTION

1. Field of the Invention

The present invention relates to an optical film, a polarizing plate, and a method for producing the optical film.

2. Description of the Related Art

An optical film having a function as a phase difference plate has frequently been used in a liquid crystal display apparatus, and for example, a λ/4 phase difference plate in a form in combination with a linearly polarizing plate has often been used as a circularly polarizing plate. In order to attain a high contrast in the inclination direction of a liquid crystal display apparatus in an IPS mode or like, various configurations using a combination of a positive A-plate with a positive C-plate as a phase difference plate have been proposed (for example, JP4592005B and JP2012-255926A).

On the other hand, WO2005/050269A proposes a phase difference plate having a reverse wavelength dispersion. A phase difference plate is usually difficult to be prepared as a phase difference plate giving the same effects as the light at any wavelength with respect to white light with a synthetic wave having mixed rays in a visible light region, and thus, for example, the phase difference plate functions as a ¼ wavelength plate with respect to light at a wavelength of 550 nm, but the phase difference plate does not function as a ¼ wavelength plate with respect to light at a wavelength of 450 nm or 650 nm, which causes problems such as coloration at the time of use.

To solve these problems, WO2005/050269A proposes a phase difference plate having reverse wavelength dispersion as a phase difference plate functioning in a broad wavelength region (broadband phase difference plate). Further, for example, a configuration in which two layers such as a λ/2 wavelength plate and a λ/4 wavelength plate are laminated by shifting a slow axis to be allowed to function as a broadband phase difference plate is also proposed (JP2004-238431A)

SUMMARY OF THE INVENTION

As a liquid crystal display apparatus becomes thinner, a phase difference plate such as a broadband ¼ wavelength plate, constituted with phase difference plates which have been proposed in response to the problems above, has been required to have a configuration capable of making the device thinner while maintaining the performance. Further, a circularly polarizing plate has recently also been used as an anti-reflection film of an organic electroluminescent device, and thus it is thought that with the spread of the organic electroluminescent device, it is required that a phase difference plate should be even thinner and a step for producing the same should be carried out more efficiently.

It is an object of the present invention to provide an optical film having a novel configuration capable of providing as an optical film which can be used as a phase difference plate. Specifically, the object is to provide an optical film having a novel configuration, in which the film has superior performance and is thinner, and a production step therefor is carried out more efficiently. It is another object of the present invention to provide a polarizing plate including the optical film, and a method for producing the optical film.

Means for solving the aforementioned problems are as described in <1> to <20> below.

<1> An optical film including a positive A-plate A-0 and a positive C-plate, in which Re(450) which is an in-plane retardation value measured at a wavelength of 450 nm, Re(550) which is an in-plane retardation value measured at a wavelength of 550 nm, and Re(650) which is an in-plane retardation value measured at a wavelength of 650 nm, of the positive A-plate A-0 satisfy a relationship of Re(450)≤Re(550)≤Re(650), the positive A-plate A-0 is formed of a cured product of a composition including the liquid crystal compound A0, and the positive C-plate is formed of a cured product of a composition including the liquid crystal compound C.

<2> The optical film as described in <1>, in which the liquid crystal compound A0 is a polymerizable rod-shaped liquid crystal compound, and the liquid crystal compound A0 is fixed in a homogeneous alignment state in the positive A-plate.

<3> The optical film as described in <1> or <2>, in which the liquid crystal compound C is a polymerizable rod-shaped liquid crystal compound, and the liquid crystal compound C is fixed in a homeotropic alignment state in the positive C-plate.

<4> The optical film as described in any one of <1> to <3>, in which the positive A-plate A-0 exhibits Re(550), which is a front-surface retardation value measured at a wavelength of 550 nm, of 100 nm to 180 nm.

<5> The optical film as described in any one of <1> to <4>, in which the positive C-plate exhibits an Re(550), which is an in-plane retardation value measured at a wavelength of 550 nm, of −10 nm to 10 nm, and an Rth(550), which is a retardation value measured at a wavelength of 550 nm in the thickness direction, of −180 nm to −10 nm.

<6> The optical film as described in any one of <1> to <5>, in which the positive A-plate A-0 is directly in contact with the positive C-plate.

<7> The optical film as described in any one of <1> to <6>, in which the positive C-plate is a layer obtained by curing a composition including the liquid crystal compound C directly applied onto the surface of the positive A-plate A-0.

<8> The optical film as described in any one of <1> to <5>, in which at least one of the liquid crystal compound A0 and the liquid crystal compound C is a liquid crystal compound represented by the following general formula (II):

$$L_1\text{-}G_1\text{-}D_1\text{-}Ar\text{-}D_2\text{-}G_2\text{-}L_2 \qquad \text{General Formula (II)}$$

(in the formula, $D_1$ and $D_2$ each independently represent —CO—O—, —O—CO—, —C(=S)O—, —O—C(=S)—, —$CR^1R^2$—, —$CR^1R^2$—$CR^3R^4$—, —O—$CR^1R^2$—, —$CR^1R^2$—O—, —$CR^1R^2$—O—$CR^3R^4$—, —$CR^1R^2$—O—CO—, —O—CO—$CR^1R^2$—, —$CR^1R^2$—O—CO—$CR^3R^4$—, —$CR^1R^2$—CO—O—$CR^3R^4$—, —$NR^1$—$CR^2R^3$—, —$CR^1R^2$—$NR^3$—, —CO—$NR^1$—, or —$NR^1$—CO—, $R^1$, $R^2$, $R^3$, and $R^4$ each independently represent a hydrogen atom, a halogen atom, or an alkyl group having 1 to 4 carbon atoms, $G_1$ and $G_2$ each independently represent a divalent alicyclic hydrocarbon group having 5 to 8 carbon atoms, a methylene group contained in the alicyclic hydrocarbon group may be substituted with —O—, —S—, or —N($R^6$)—, $R^6$ represents a hydrogen atom or an alkyl group having 1 to 6 carbon atoms, $L_1$ and $L_2$ each independently represent a monovalent organic group, and at least one selected from a group consisting of $L_1$ and $L_2$ represents a monovalent group having a polymerizable group, and Ar represents a divalent aromatic ring group represented by the following general formula (II-1), (II-2), (II-3), or (II-4):

General formula (II-1)

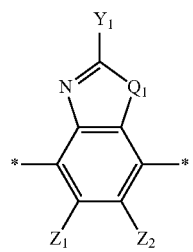

(II-2)

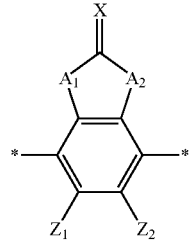

(II-3)

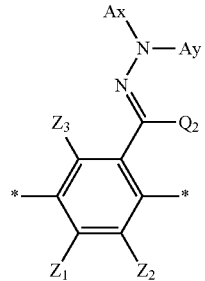

(II-4)

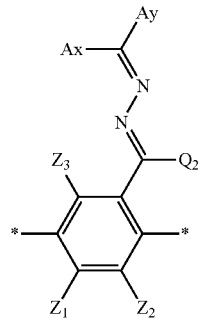

(in Formulae (II-1) to (II-4), $Q_1$ represents —S—, —O—, or $NR^{11}$—, $R^{11}$ represents a hydrogen atom or an alkyl group having 1 to 6 carbon atoms, $Y_1$ represents an aromatic hydrocarbon group having 6 to 12 carbon atoms, or an aromatic heterocyclic group having 3 to 12 carbon atoms, $Z_1$, $Z_2$, and, $Z_3$ each independently represent a hydrogen atom or an aliphatic hydrocarbon group having 1 to 20 carbon atoms, an alicyclic hydrocarbon group having 3 to 20 carbon atoms, an aromatic monovalent hydrocarbon group having 6 to 20 carbon atoms, a halogen atom, a cyano group, a nitro group, —$NR^{12}R^{13}$, or $SR^{12}$, $Z_1$ and $Z_2$ may be bonded to each other to form an aromatic ring or an aromatic heterocycle, and $R^{12}$ and $R^{13}$ each independently represent a hydrogen atom or an alkyl group having 1 to 6 carbon atoms, $A_1$ and $A_2$ each independently represent a group selected from the group consisting of —O—, —$NR^{21}$—(in which $R^{21}$ represents a hydrogen atom or a substituent), —S—, and CO—, X represents a hydrogen atom or a non-metal atom belonging to any one of Groups 14 to 16, to which a substituent may be bonded, Ax represents an organic group having 2 to 30 carbon atoms, having at least one aromatic ring selected from the group consisting of an aromatic hydrocarbon ring and an aromatic heterocycle, Ay represents a hydrogen atom, an alkyl group having 1 to 6 carbon atoms, which may have a substituent, or an organic group having 2 to 30 carbon atoms, having at least one aromatic ring selected from the group consisting of an aromatic hydrocarbon ring and an aromatic heterocycle, the aromatic ring contained in Ax and Ay may have a substituent, and Ax and Ay may be bonded to each other to form a ring, and Q2 represents a hydrogen atom, or an alkyl group having 1 to 6 carbon atoms, which may have a substituent).

<9> The optical film as described in any one of <1> to <8>, in which the composition containing the liquid crystal compound A0 contains a cross-linkable polymer in the amount of 0.1% by mass to 20.0% by mass with respect to the total mass of the liquid crystal compound, and the cross-linkable polymer is a non-liquid crystal polymer having a polymerizable group.

<10> The optical film as described in <9>, in which the cross-linkable polymer has an acryloyl group or a methacryloyl group in the repeating unit.

<11> The optical film as described in any one of <1> to <10>, further including an alignment film, in which the alignment film, the positive A-plate A-0, and the positive C-plate are provided in this order, the alignment film is directly in contact with the positive A-plate A-0, and the positive A-plate A-0 is directly in contact with the positive C-plate.

<12> A polarizing plate including a linearly polarizing film and the optical film as described in any one of <1> to <11>.

<13> The polarizing plate as described in <12>, in which the linearly polarizing film is directly in contact with the optical film.

<14> The polarizing plate as described in <12> or <13>, in which the linearly polarizing film, the positive A-plate A-0, and the positive C-plate are provided in this order, and the angle formed between the slow axis of the positive A-plate A-0 and the absorption axis of the linearly polarizing film is 90°.

<15> The polarizing plate as described in <12> or <13>, in which the linearly polarizing film, the positive C-plate, and the positive A-plate A-0 are provided in this order, and the slow axis of the positive A-plate A-0 is parallel to the absorption axis of the linearly polarizing film.

<16> The polarizing plate as described in <15>, which is a circularly polarizing plate.

<17> A display apparatus including the optical film as described in any one of <1> to <1>.

<18> An anti-reflection plate including the optical film as described in any one of <1> to <11> and a linearly polarizing film, in which the angle formed between the slow axis of the positive A-plate A-0 and the absorption axis of the linearly polarizing film is 45°.

<19> A method for producing the optical film as described in any one of <1> to <11>, including applying a composition containing the liquid crystal compound C onto the surface of the positive A-plate A-0; heating the composition containing the liquid crystal compound C after applying to homeotropically align the liquid crystal compound C; and irradiating the composition containing the homeotropically aligned liquid crystal compound C with ultraviolet rays to obtain the positive C-plate.

<20> The production method as described in <19>, further including applying a composition containing the liquid crystal compound A0 onto a support; heating a composition containing the liquid crystal compound A0 to homogeneously align the liquid crystal compound A0; and irradiating the composition containing the homogeneously aligned liquid crystal compound A0 with ultraviolet rays to obtain the positive A-plate A-0.

According to the present invention, an optical film having a novel configuration, which can be used as a phase difference plate, is provided. The optical film of the present invention is configured such that the film is a broadband phase difference plate, and can be made thinner while maintaining superior performance, and a production step therefor can be carried out more efficiently. A polarizing plate including the optical film of the present invention has fewer problems in coloration and high contrast in the inclination direction.

DESCRIPTION OF THE PREFERRED EMBODIMENTS

Hereinafter, the present invention will be described in detail. The description of the constituent elements that will be described below may be shown based on the representative embodiments of the present invention in some cases, but the present invention is not limited to such the embodiments. Further, in the present specification, a numerical range expressed by a wording "a number to another number" means a range that falls between the former number indicating the lowermost limit of the range and the latter number indicating the uppermost limit thereof. In addition, the terms "orthogonal" and "parallel" used herein with respect to angles are meant to include an error ranging from −10° to +10° from the exact angle, and the terms "the same" and "different" used herein with respect to angles can be judged depending on a difference that may or may not be less than 5°.

The "slow axis" as used in the present specification means a direction in which an in-plane refractive index is maximum, and the "polarizing plate" is meant to include both of a long polarizing plate and a polarizing plate cut to a size to be incorporated into a display apparatus, unless otherwise specifically noted. Further, the "cut" as used herein is intended to include "punching-out", "cutting-out", and the like. In addition, in the present specification, an form including, in particular, a laminate of an optical film of the present invention or an ordinary λ/4 plate with a polarizing film is referred to as an "anti-reflection plate" or a "circularly polarizing plate" in the "polarizing plate".

In addition, the organic EL display apparatus means an organic electroluminescent display apparatus.

In the present specification, the "inclination angle" (also referred to as a tilt angle) means an angle between an inclined liquid crystal and a layer plane, and also means a maximum angle of the angles between the direction of a maximum refractive index and a layer plane in a refractive-index ellipsoid of a liquid crystal compound. Accordingly, in the rod-shaped liquid crystal compound having positive optically anisotropy, a tilt angle means an angle between the long axis direction, that is, the director direction and the layer plane in a rod-shaped liquid crystal compound. Further, in the present invention, the "average tilt angle" means an average value of tilt angles from an angle on the upper interface to an angle on the lower interface of a phase difference layer.

The reverse wavelength dispersion in the present specification means a property that the absolute value of the in-plane retardation further increases at a longer wavelength.

In the present specification, $Re(\lambda)$ and $Rth(\lambda)$ represent an in-plane retardation and a thickness-direction retardation, respectively, at a wavelength of $\lambda$. The $Re(\lambda)$ is measured by making light having a wavelength of $\lambda$ nm incident to a film in the normal direction of the film, using KOBRA 21ADH or WR (trade name, manufactured by Oji Scientific Instruments).

In the case where a film to be used for the measurement represents a uniaxial or biaxial refractive-index ellipsoid, the $Rth(\lambda)$ of the film is calculated by the following method.

The $Re(\lambda)$ of the film is measured around the in-plane slow axis (judged by KOBRA 21ADH or WR) as the inclination axis (rotational axis) (in the case where the film does not have a slow axis, then its rotational axis may be in any in-plane direction of the film), relative to the normal direction of the film up to +50 degrees from at intervals of 10 degrees, in 6 points in all with a light having a wavelength of $\lambda$ nm applied in the inclined direction; and based on the retardation values thus measured, the estimated value of the mean refractive index, and the inputted film thickness value, the $Rth(\lambda)$ is calculated by KOBRA 21ADH or WR.

In the above description, in the case where the film to be analyzed has a direction in which the retardation value is zero at a certain inclination angle, around the in-plane slow axis from the normal direction as the rotational axis, then the retardation value at the inclination angle larger than the inclination angle is changed to negative data, and then the $Rth(\lambda)$ is calculated by KOBRA21ADH or WR.

Around the slow axis as the inclination angle (rotation angle) of the film (in the case where the film does not have a slow axis, then its rotational axis may be in any in-plane direction of the film), the retardation values are measured in any two inclined directions, and based on the retardation values thus measured, the estimated value of the mean refractive index, and the inputted film thickness value, the Rth also may be calculated according to the following expressions (1) and (2):

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Expression (1)

$$Rth = \left(\frac{nx + ny}{2} - nz\right) \times d$$

Expression (2)

In the expression, Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. d represents a thickness of the film.

In the case where the film to be analyzed is not expressed by a uniaxial or biaxial refractive-index ellipsoid, that is, the film does not have an optical axis, the Rth(λ) of the film is calculated by the following method.

The Re(λ) is measured around the in-plane slow axis (judged by KOBRA 21ADH or WR) as the inclination axis (rotational axis), relative to the normal direction of the film from −50 degrees up to +50 degrees at intervals of 10 degrees, in 11 points in all with a light having a wavelength of λ nm applied in the inclined direction; and based on the retardation values thus measured, the estimated value of the mean refractive index, and the inputted film thickness value, the Rth(λ) is calculated by KOBRA 21ADH or WR.

In the aforementioned measurement, the estimated value of the mean refractive index is available from values listed in catalogues of various optical films in Polymer Handbook (John Wiley & Sons, Inc.). Those having the mean refractive indices unknown can be measured using an Abbe refractometer. The values of mean refractive indices of the main optical films are listed below: cellulose acylate (1.48), cycloolefin polymer (1.52), polycarbonate (1.59), polymethyl methacrylate (1.49), and polystyrene (1.59). With KOBRA 21ADH or WR, nx, ny, and nz are calculated by the estimated value of these mean refractive indices and the film thickness. On the basis of nx, ny, and nz thus calculated, [Nz=(nx−nz)/(nx−ny)] is further calculated.

<<Optical Film>>

In the present specification, the optical film means a film that can be used for optical members, for example, various display elements, such as various display apparatuses, light emitting devices, and polarizing plates.

The optical film of the present invention includes a positive A-plate and a positive C-plate. The positive A-plate is formed of a monolayered positive A-plate A-0 having uniform compositions and slow axes.

The optical film may further include, in addition to the positive A-plate and the positive C-plate, other functional layers such as a support, an alignment layer, and an adhesive layer. In the case where the optical film of the present invention includes a support, the optical film of the present invention preferably includes "the support, the positive A-plate A-0, and the positive C-plate" in this order. In the case of further including an alignment film, the optical film of the present invention preferably includes "the support, the alignment film, the positive A-plate A-0, and the positive C-plate" in this order. In the optical film of the present invention, other layers may be included between the positive A-plate and the positive C-plate, both the layers may be in contact with each other, but it is preferable that the positive A-plate A-0 is directly in contact with the positive C-plate.

The optical film preferably has a thickness of, for example, 200 μm or less, 100 μm or less, 60 μm or less, 40 μm or less, 25 μm or less, 10 μm or less, or 5 μm or less, from the viewpoint of attaining a thinner member. Further, the thickness of the optical film is preferably 1 μm or more, 5 μm or more, or 10 μm or more from the viewpoint of suitability of production.

<Positive A-Plate>

In the positive A-plate A-0 in the present specification, the Re(450) which is a retardation value of the positive A-plate A-0 measured at a wavelength of 450 nm, the Re(550) which is a retardation value of the positive A-plate A-0 measured at a wavelength of 550 nm, and the Re(650) which is a retardation value of the positive A-plate A-0 measured at a wavelength of 650 nm satisfy a relationship of Re(450)≤Re(550)≤Re(650). In the positive A-plate, the liquid crystal compound may be homogeneously aligned. The homogeneous alignment means a state where the molecular long axis of the liquid crystal compound is aligned in the horizontal direction. The positive A-plate A-0 preferably exhibits a smectic phase.

Further, in the present specification, the smectic phase refers to a state where molecules arranged in one direction have a layer structure. Further, the nematic phase refers to a state where the constituent molecules of the phase have an alignment order, but have no three-dimensional positional order.

The film thickness of the positive A-plate A-0 is preferably from 0.3 μm to 3.0 μm, more preferably from 0.5 μm to 3.0 μm, still more preferably from 0.9 μm to 2.5 μm, and most preferably from 1.5 μm to 2.5 μm.

Moreover, the positive A-plate A-0 preferably satisfies 40≤Rth(550)≤115, and more preferably satisfies 45≤Rth(550)≤110. By setting the Rth(550) within such a range, the optical film of the present invention is preferable especially in a case where a configuration of the present invention for use in combination with the positive C-plate is incorporated into a liquid crystal display apparatus for IPS.

The positive A-plate A-0 preferably satisfies the following expression (3):

0.8≤Nz≤1.2      (Expression 3)

(in Expression (3), Nz represents (nx−nz)/(nx−ny), nx represents the refractive index in the slow axis direction in a plane, ny represents the refractive index in a direction orthogonal to nx in a plane, and nz represents the refractive index in a direction orthogonal to nx and ny).

Nz more preferably satisfies 0.9≤Nz≤1.1.

Checking whether the liquid crystal compound is fixed in the state of the smectic phase can be performed by observation by an X-ray diffraction pattern. If the liquid crystal compound is fixed in the state of the smectic phases, an X-ray diffraction pattern derived from the layer order is observed, and thus, it is possible to determine the state of the liquid crystal compound fixed. For the positive A-plate, a smectic liquid crystal may be fixed in a state showing the nematic phase. Checking whether the liquid crystal compound is fixed in the state of a nematic phase can also be performed by observation by an X-ray diffraction pattern. If the liquid crystal compound is fixed in the state of a nematic phase, a sharp peak on the low-angle side derived from layer formation is not observed, but only a broad halo peak is observed on the wide-angle side, and thus, it is possible to determine the state of the liquid crystal compound fixed.

[Composition for Forming Positive A-Plate]

In the present specification, the "composition for forming a positive A-plate" means a composition for forming a positive A-plate A-0. Further, the composition for forming a positive A-plate A-0 contains a liquid crystal compound A0.

(Liquid Crystal Compound A0)

The positive A-plate A-0 in the optical film of the present invention is formed of a cured product of a composition for forming a positive A-plate A-0, including the liquid crystal compound A0. In the present specification, the liquid crystal compound A0 represents any of the liquid crystal compounds contained in the composition for forming a positive A-plate A-0, and it may be formed of one liquid crystal compound or may be a mixture of two or more kinds of liquid crystal compounds. The liquid crystal compound A0 is not particularly limited, but it may be a rod-shaped liquid crystal compound, a disc-shaped liquid crystal compound, or a mixture of both the compounds, but is more preferably a rod-shaped liquid crystal compound. The liquid crystal compound A0 preferably contains the polymerizable liquid crystal compound in the amount of 60% by mass or more, 70% by mass or more, 80% by mass or more, 90% by mass or more, or 100% by mass, with respect to the total mass of the liquid crystal compound A0.

As a liquid crystal compound A0, any of known liquid crystal compounds may be used as long as it is a liquid crystal compound exhibiting the stated wavelength dispersion, and for example, the compound represented by General Formula (I) described in JP2008-297210A (especially, the compounds described in the paragraph Nos. 0034 to 0039), the compound represented by General Formula (I) described in JP2010-84032A (especially, the compounds described in the paragraph Nos. 0067 to 0073), and the like may be used. Further, especially in combination with other liquid crystal compounds, a rod-shaped liquid crystal compound selected from azomethines, azoxy compounds, cyanobiphenyls, cyanophenyl esters, benzoic esters, cyclohexanecarbonic phenyl esters, cyanophenylcyclohexanes, cyano-substituted phenylpyrimidines, alkoxy-substituted phenylpyrimidines, phenyl dioxanes, tolans, and alkenylcyclohexylbenzonitrile may be used.

Particularly preferred examples of the liquid crystal compound A0 include compounds represented by the following general formula (II).

$$L_1\text{-}G_1\text{-}D_1\text{-}Ar\text{-}D_2\text{-}G_2\text{-}L_2 \quad \text{General Formula (II)}$$

In the formula, $D_1$ and $D_2$ each independently represent —CO—O—, —O—CO—, —C(=S)O—, —O—C(=S)—, —$CR^1R^2$—, —$CR^1R^2$—$CR^3R^4$—, —O—$CR^1R^2$—, —$CR^1R^2$—O—, —$CR^1R^2$—O—$CR^3R^4$—, —$CR^1R^2$—O—CO—, —O—CO—$CR^1R^2$—, —$CR^1R^2$—O—CO—$CR^3R^4$—, —$CR^1R^2$—CO—O—$CR^3R^4$—, —$NR^1$—$CR^2R^3$—, —$CR^1R^2$—$NR^3$—, —CO—$NR^1$—, or —$NR^1$—CO—, $R^1$, $R^2$, $R^3$, and $R^4$ each independently represent a hydrogen atom, a halogen atom, or an alkyl group having 1 to 4 carbon atoms, $G_1$ and $G_2$ each independently represent a divalent alicyclic hydrocarbon group having 5 to 8 carbon atoms, the methylene group contained in the alicyclic hydrocarbon group may be substituted with —O—, —S—, or —$N(R^6)$—, and $R^6$ represents a hydrogen atom or an alkyl group having 1 to 6 carbon atoms, $L_1$ and $L_2$ each independently represent a monovalent organic group, and at least one selected from a group consisting of $L_1$ and $L_2$ represents a monovalent group having a polymerizable group, and Ar represents a divalent aromatic ring group represented by the following general formula (II-1), (II-2), (II-3), or (II-4).

General formula

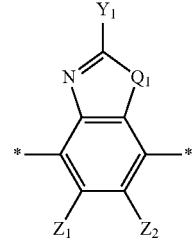

(II-1)

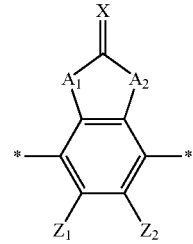

(II-2)

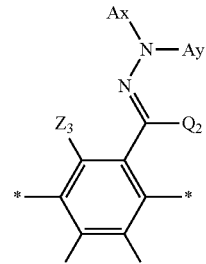

(II-3)

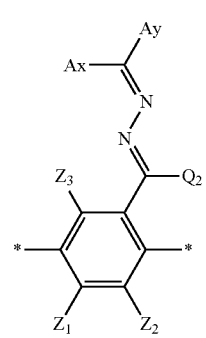

(II-4)

In Formulae (II-1) to (II-4), $Q_1$ represents —S—, —O—, or —$NR^{11}$—, $R^{11}$ represents a hydrogen atom or an alkyl group having 1 to 6 carbon atoms, $Y_1$ represents an aromatic hydrocarbon group having 6 to 12 carbon atoms, or an aromatic heterocyclic group having 3 to 12 carbon atoms, $Z_1$, $Z_2$, and, $Z_3$ each independently represent a hydrogen atom or an aliphatic hydrocarbon group having 1 to 20 carbon atoms, an alicyclic hydrocarbon group having 3 to 20 carbon atoms, an aromatic monovalent hydrocarbon group having 6 to 20 carbon atoms, a halogen atom, a cyano group, a nitro group, —$NR^{12}R^{13}$, or $SR^{12}$, $Z_1$ and $Z_2$ may be bonded to each other to form an aromatic ring or an aromatic heterocycle, and $R^{12}$ and $R^{13}$ each independently represent a hydrogen atom or an alkyl group having 1 to 6 carbon atoms, $A_1$ and $A_2$ each independently represent a group selected from the group consisting of (in which $R^{21}$ represents a hydrogen atom or a substituent), —S—, and CO—, X represents a hydrogen atom or a non-metal atom belonging to any one of Groups 14 to 16, to which a substituent may be bonded, Ax represents an organic group having 2 to 30 carbon atoms, having at least one aromatic ring selected from the group consisting of an aromatic hydrocarbon ring and an aromatic heterocycle, Ay represents a hydrogen atom, an alkyl group having 1 to 6 carbon atoms, which may have a substituent, or an organic group having 2 to 30 carbon atoms, having at least one aromatic ring selected from the group consisting of an aromatic hydrocarbon ring and an aromatic heterocycle, the aromatic ring contained in Ax and Ay may have a substituent, and Ax and Ay may be bonded to each other to form a ring, and Q2 represents a hydrogen atom, or an alkyl group having 1 to 6 carbon atoms, which may have a substituent.

Regarding the definitions and preferred ranges of the respective substituents of the compound represented by General Formula (II), the descriptions of $D^1$, $D^2$, $G^1$, $G^2$, $L^1$, $L^2$, $R^1$, $R^2$, $R^3$, $R^4$, $X^1$, $Y^1$, $Q^1$, and $Q^2$ for the compound (A) described in JP2012-21068A can be referred to with respect to $D_1$, $D_2$, $G_1$, $G_2$, $L_1$, $L_2$, $R^1$, $R^2$, $R^3$, $R^4$, $X^1$, $Y^1$, $Z_1$, and $Z_2$, respectively, and the descriptions of $A_1$, $A_2$, and X for the compound represented by General Formula (I) described in JP2008-107767A can be referred to with respect to $A_1$, $A_2$, and X, respectively, and the descriptions of Ax, Ay, and $Q^1$ for the compound represented by General Formula (I) described in WO2013/018526A can be referred to with respect to Ax, Ay, and $Q_2$, respectively. The descriptions of $Z_3$ can be referred to with respect to the description for $Q^1$ for the compound (A) described in JP2012-21068A.

In particular, the organic groups represented by $L_1$ and $L_2$ are each particularly preferably a group represented by -$D_3$-$G_3$-Sp-$P_3$. $D_3$ has the same meaning as $D_1$. $G_3$ represents a single bond, a divalent aromatic ring group having 6 to 12 carbon atoms, a heterocyclic group, or a divalent alicyclic hydrocarbon group having 5 to 8 carbon atoms, the methylene group contained in the alicyclic hydrocarbon group may be substituted with —O—, —S—, or —$NR^7$—, in which $R^7$ represents a hydrogen atom or an alkyl group having 1 to 6 carbon atoms. Sp represents a single bond, or a spacer represented by —$(CH_2)_n$—, —$(CH_2)$—O—, —$(CH_2$—O—$)_n$—, —$(CH_2CH_2$—O—$)_m$—, —O—$(CH_2)_n$—, —O—$(CH_2)_n$—O—, —O—$(CH_2$—O—$)_n$—, —O—$(CH_2CH_2$—O—$)_m$—, —C(=O)—O—$(CH_2)_n$—, —C(=O)—O—$(CH_2)_n$—O—, —C(=O)—O—$(CH_2$—O—$)_n$—, —C(=O)—O—$(CH_2CH_2$—O—$)_m$—, —C(=O)—N($R^8$)—$(CH_2)_n$—, —C(=O)—N($R^8$)—$(CH_2)_n$—O—, —C(=O)—N($R^8$)—$(CH_2$—O—$)_n$—, or —C(=O)—N($R^8$)—$(CH_2CH_2$—O—$)_m$—, in which n represents an integer of 2 to 12, m represents an integer of 2 to 6, and $R^8$ represents a hydrogen atom or an alkyl group having 1 to 6 carbon atoms. $P_3$ represents a polymerizable group.

The polymerizable group is not particularly limited, but is preferably a radically polymerizable group or a cationically polymerizable group. As the radically polymerizable group, a generally known radically polymerizable group can be used, and suitable examples thereof include an acryloyl group or a methacryloyl group. In this case, it is known that an acryloyl group generally has a high polymerization speed, and thus, from the viewpoint of improvement of productivity, an acryloyl group is preferable. However, a methacryloyl group can be equivalently used as a polymerizable group of a high-birefringence liquid crystal. As the cationically polymerizable group, a generally known cationically polymerizable group can be used, and specific examples of the cationically polymerizable group include an alicyclic ether group, a cyclic acetal group, a cyclic lactone group, a cyclic thioether group, a spiro orthoester group, and a vinyl group. Among these, an alicyclic ether group and a vinyl group are suitable, and an epoxy group, an oxetanyl group, and a vinyl group are particularly preferable.

Particularly preferred examples of the polymerizable group include the following groups.

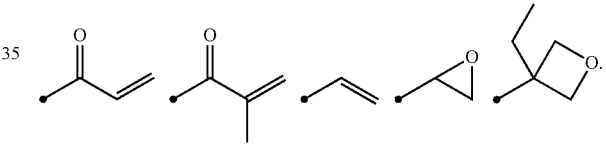

Furthermore, in the present specification, the "alkyl group" may be any of linear, branched, or cyclic groups. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a cyclopropyl group, a cyclobutyl group, a cyclopentyl group, and a cyclohexyl group.

Preferred examples of the compound represented by General Formula (II) are shown below, but are limited thereto.

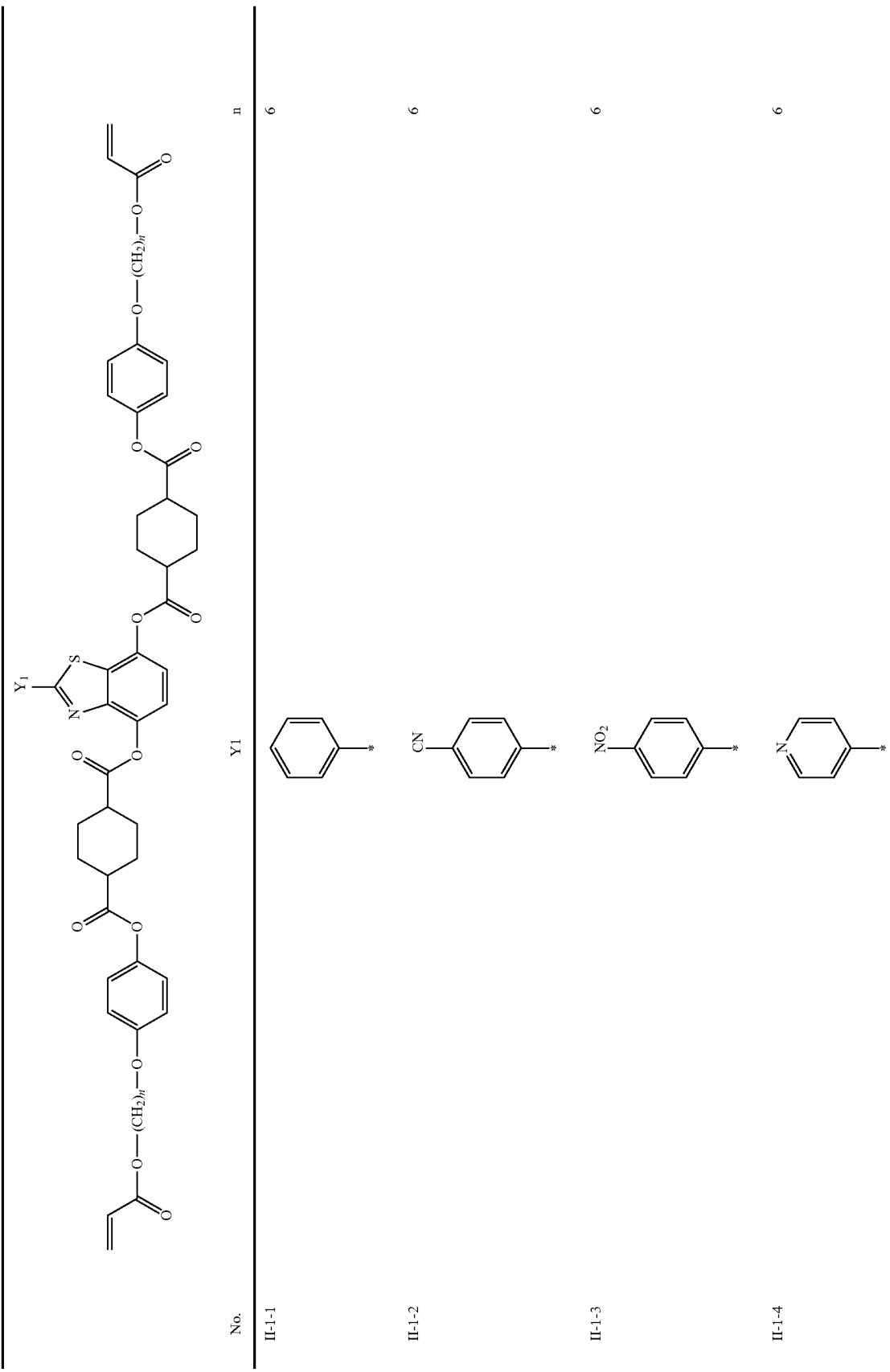

-continued
| | | | |
|---|---|---|---|
| II-1-5 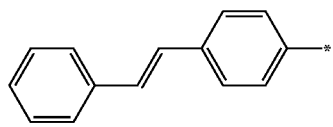 6 | II-1-6 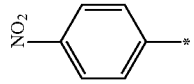 11 | II-1-7 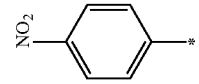 8 | II-1-8 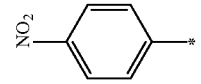 4 |

-continued
| | | | | |
|---|---|---|---|---|
| II-1-9 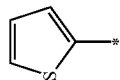 6 | II-1-10 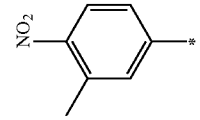 6 | II-1-11 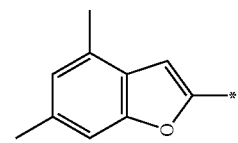 6 | II-1-12 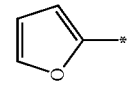 6 | II-1-13 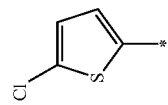 6 |

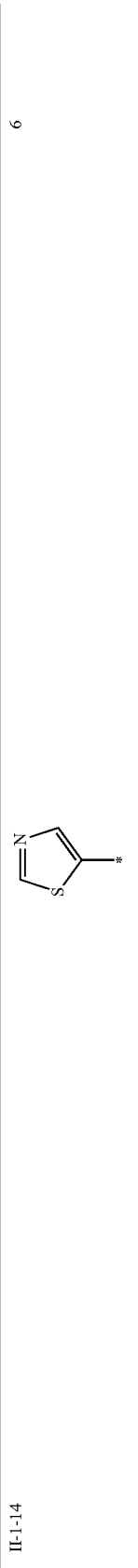
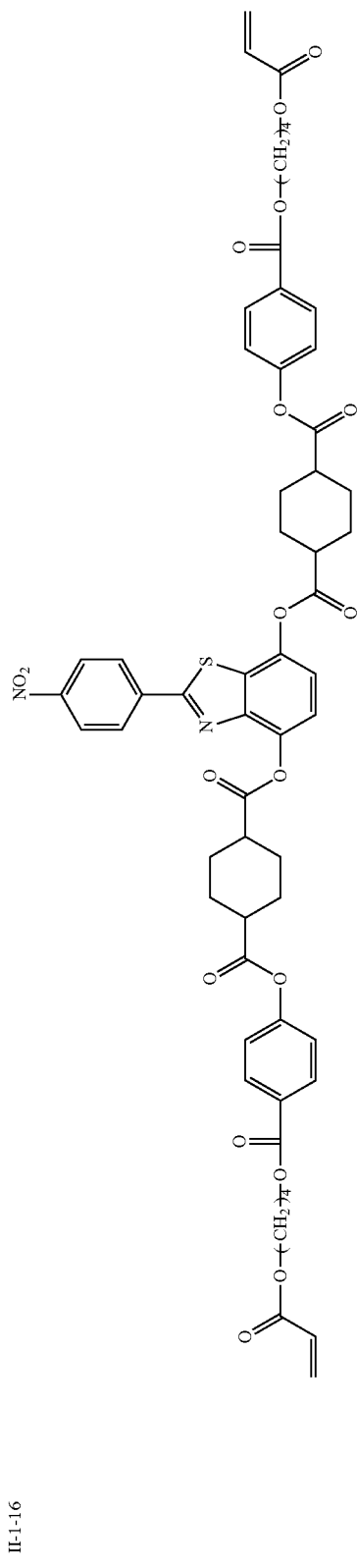

-continued
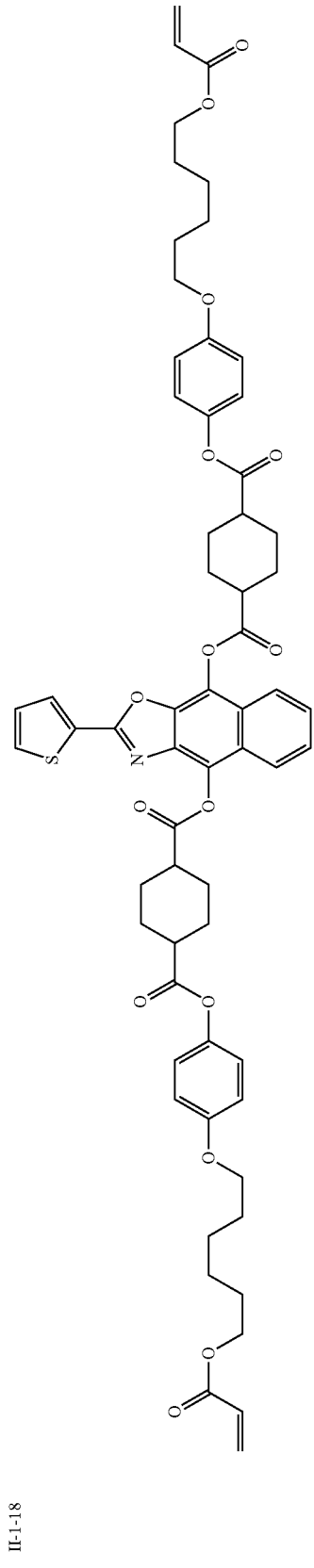
II-1-18
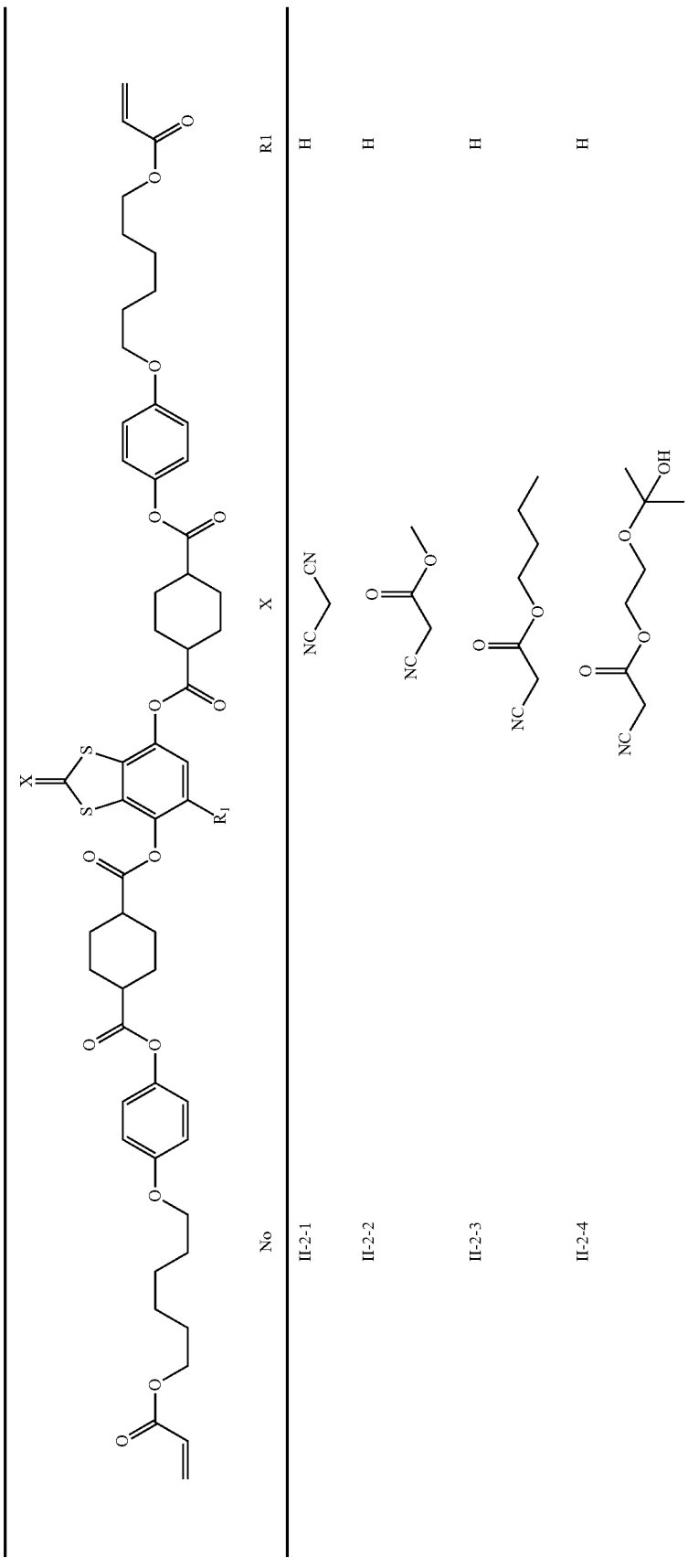
| No | X | R1 |
|---|---|---|
| II-2-1 | NC–CH2–CN | H |
| II-2-2 | NC–CH2–C(=O)–O–CH3 | H |
| II-2-3 | NC–CH2–C(=O)–O–C4H9 | H |
| II-2-4 | NC–CH2–C(=O)–O–CH2CH2–O–C(CH3)2–OH | H |

-continued

| No | Ax | Ay | Q2 |
|---|---|---|---|
| II-3-1 | benzothiazol-2-yl | H | H |
| II-3-2 | benzoxazol-2-yl | H | H |
| II-3-3 | naphthalen-1-yl | H | H |
| II-3-4 | Ph | Ph | H |

| II-2-5 | NCCH₂CN | CH₃ |
| II-2-6 | NCCH₂CN | C(CH₃)₃ |
| II-2-7 | S (see structure) | H |

-continued
| | | |
|---|---|---|
| II-3-5 | 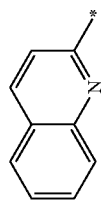 | H | H |
| II-3-6 | 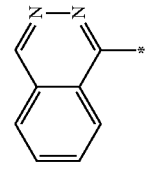 | H | H |
| II-3-7 | 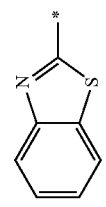 | CH$_3$ | H |
| II-3-8 | 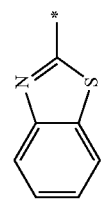 | C$_4$H$_9$ | H |
| II-3-9 | 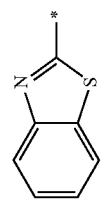 | C$_6$H$_{13}$ | H |
| II-3-10 | 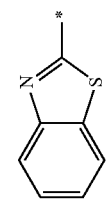 | 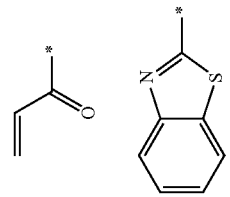 | H |
| II-3-11 | 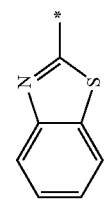 |  | H |
| II-3-12 | | CH$_2$CN | H |

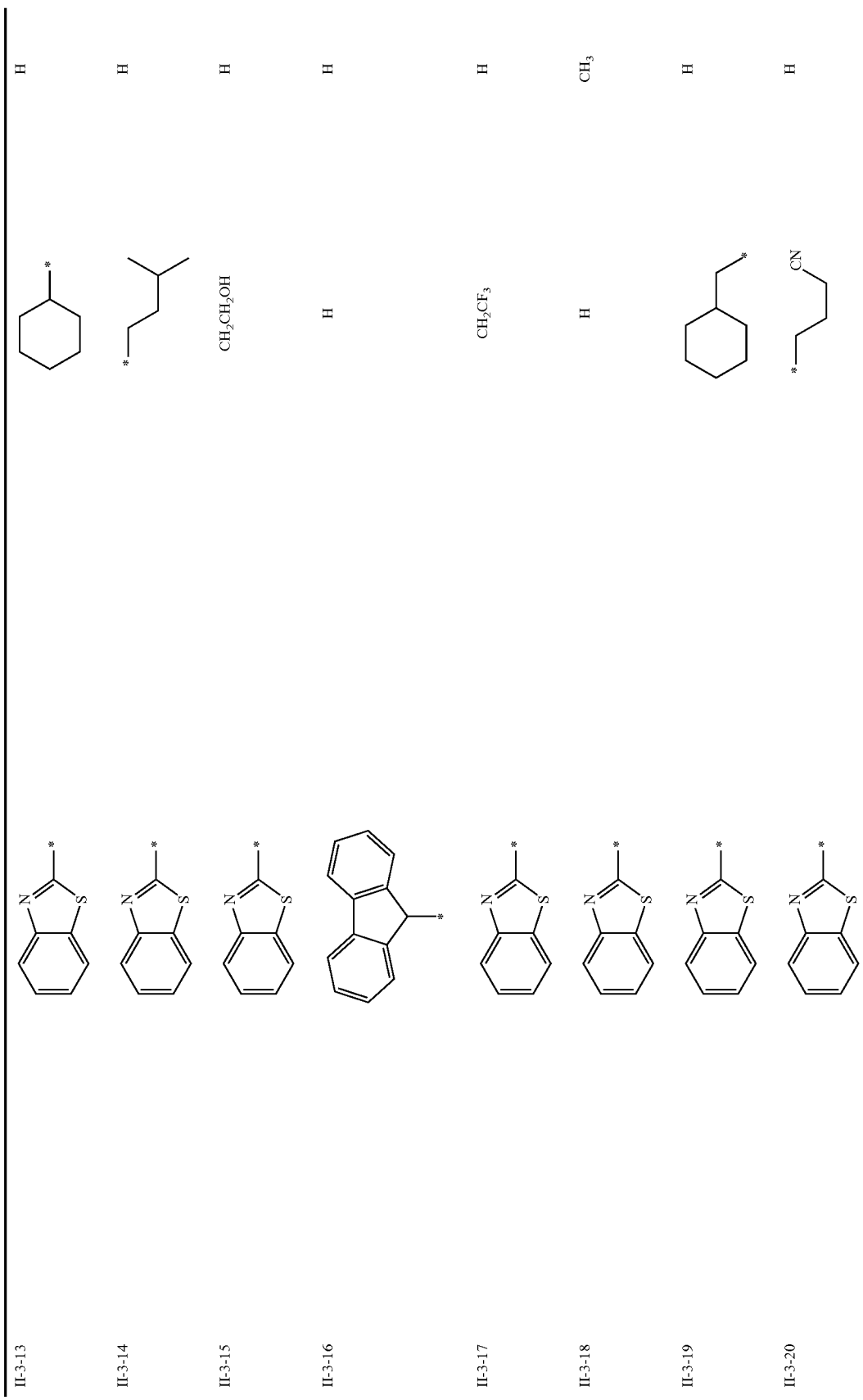

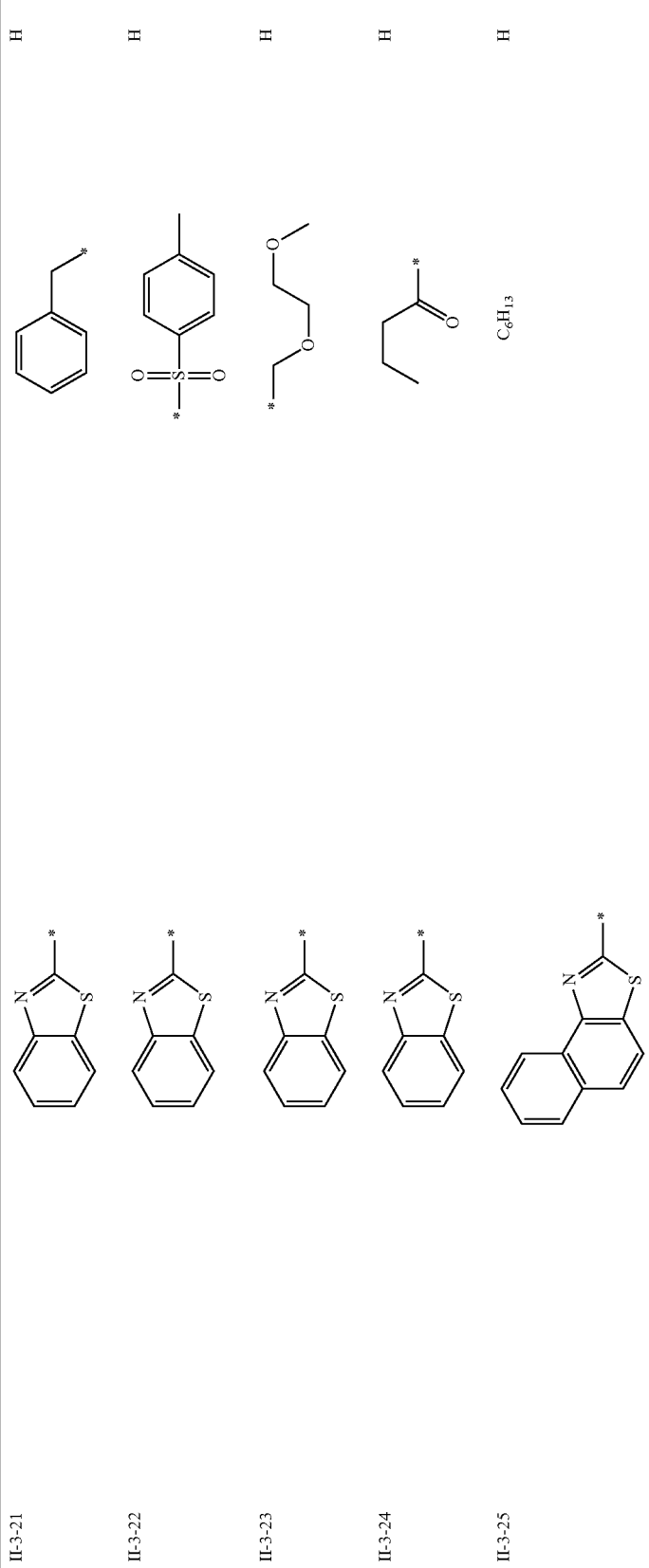
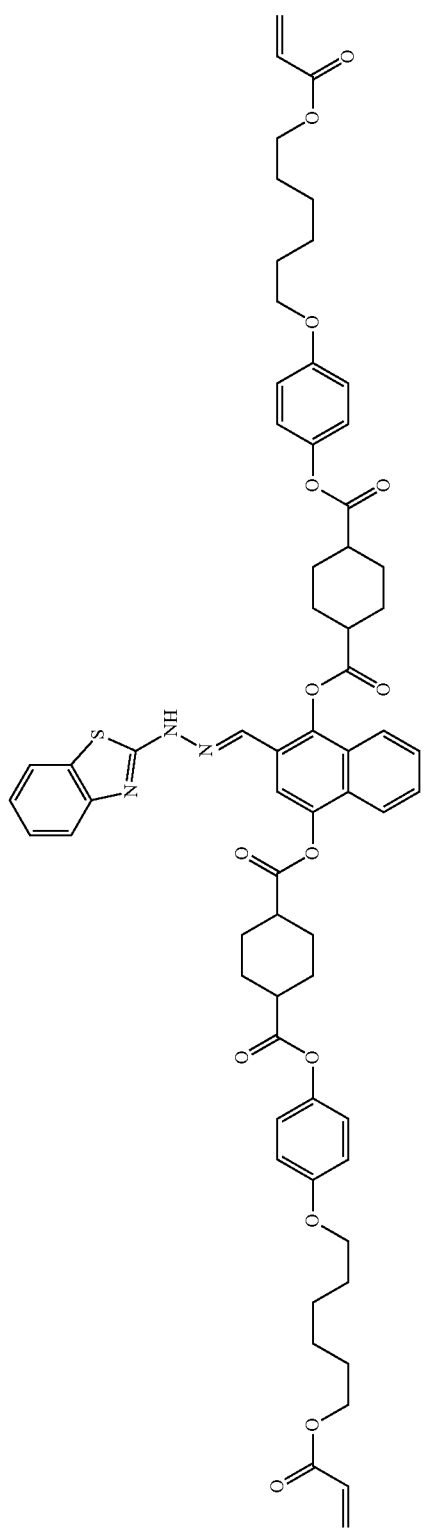

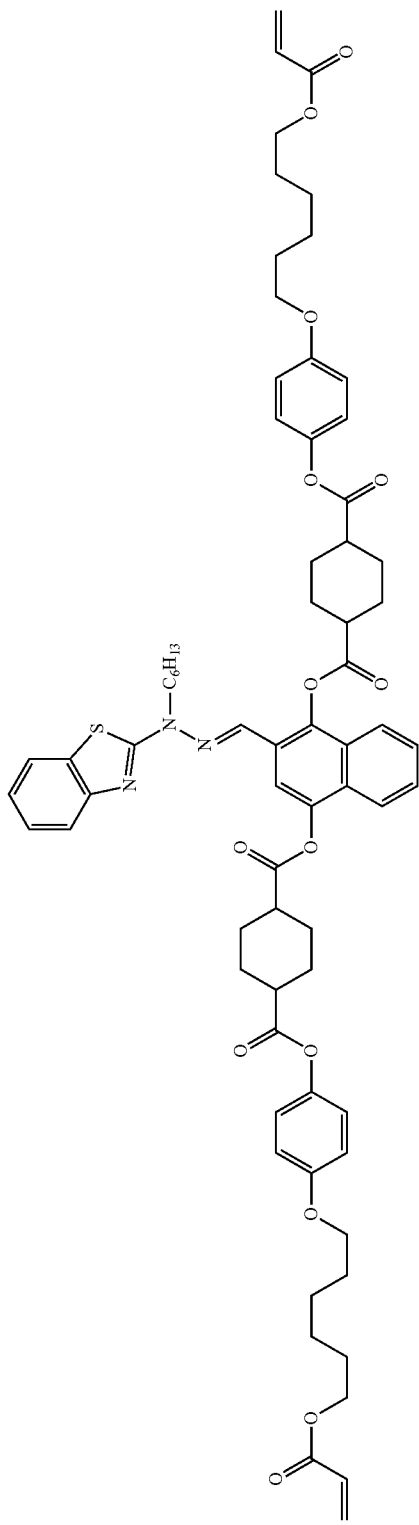
II-3-27
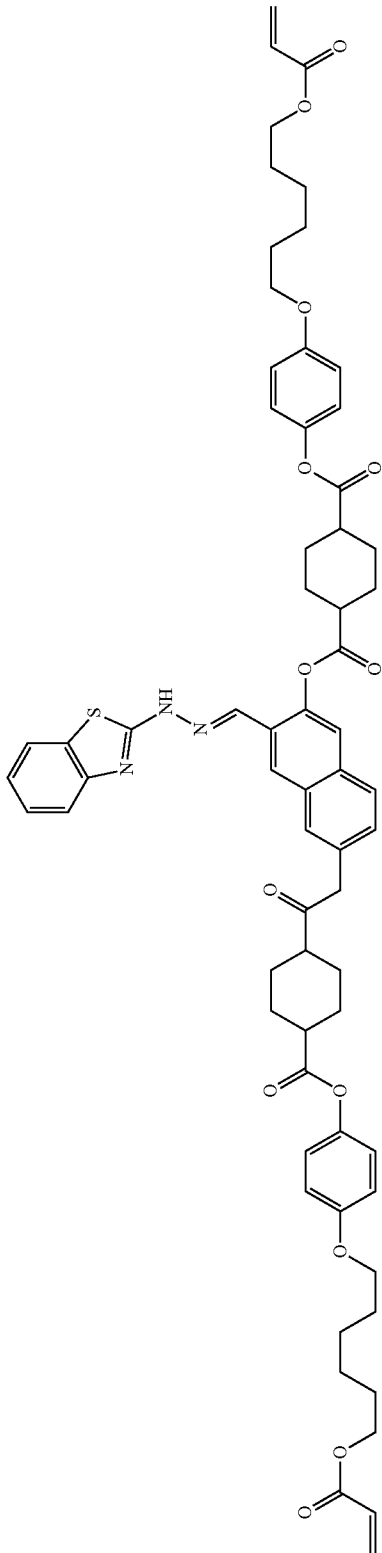
II-3-28

-continued
| No | Ax | Ay | Q2 |
|---|---|---|---|
| II-3-29 | | | |
| II-3-30 | 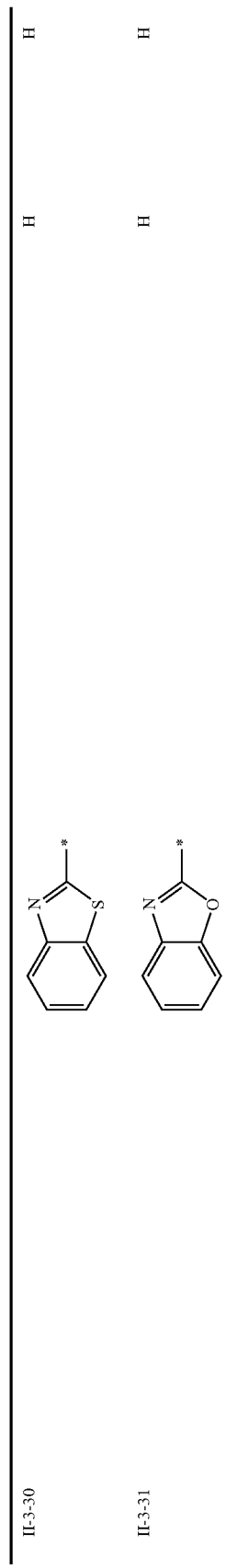 | H | H |
| II-3-31 | 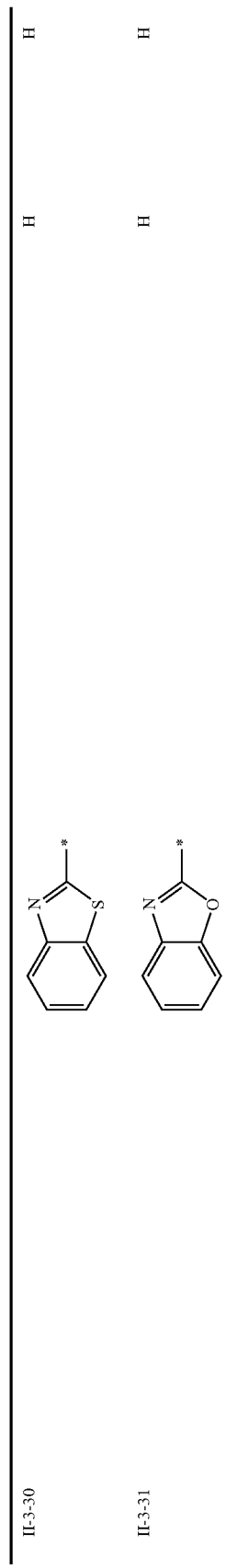 | H | H |
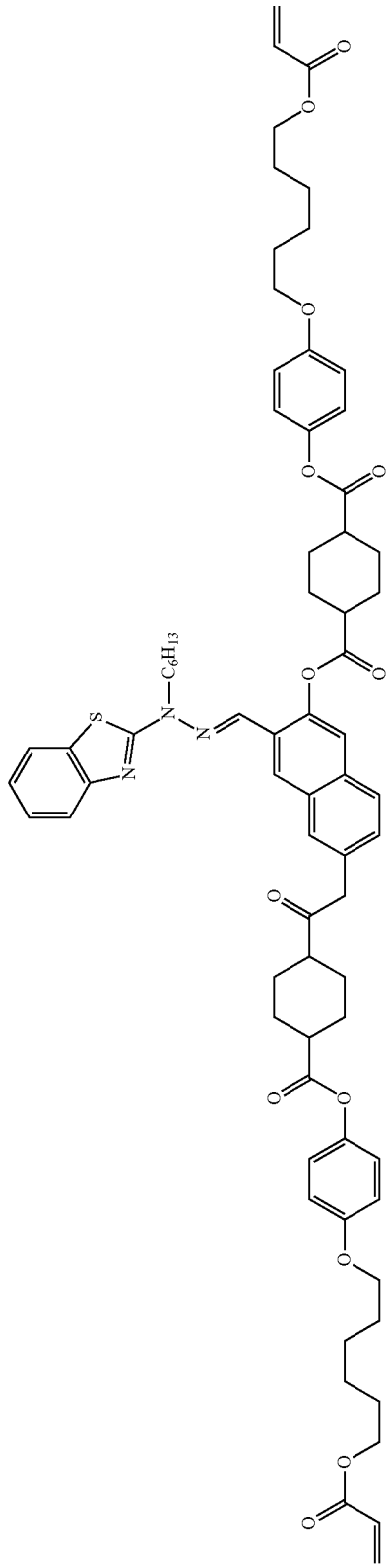

-continued

| | | | |
|---|---|---|---|
| II-3-32 | ![naphthalen-1-yl] | H | H |
| II-3-33 | Ph | Ph | H |
| II-3-34 | quinolin-2-yl | H | H |
| II-3-35 | phthalazin-1-yl | H | H |
| II-3-36 | benzothiazol-2-yl | CH₃ | H |
| II-3-37 | benzothiazol-2-yl | C₄H₉ | H |
| II-3-38 | benzothiazol-2-yl | C₆H₁₃ | H |
| II-3-39 | benzothiazol-2-yl | acryloyl | H |
| II-3-40 | benzothiazol-2-yl | benzothiazol-2-yl | H |

-continued
| | | | |
|---|---|---|---|
| II-3-41 |  | CH₂CN | H |
| II-3-42 |  | 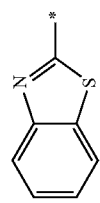 | H |
| II-3-43 | 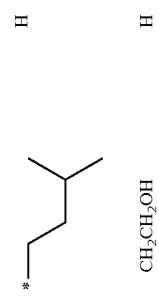 | 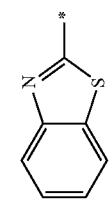 | H |
| II-3-46 |  | CH₂CH₂OH | H |
| II-3-45 |  | H | H |
| II-3-46 |  | CH₂CF₃ | H |
| II-3-47 |  | H | CH₃ |
| II-3-48 | 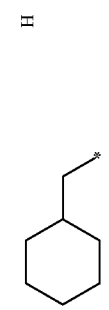 | 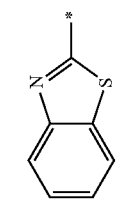 | H |

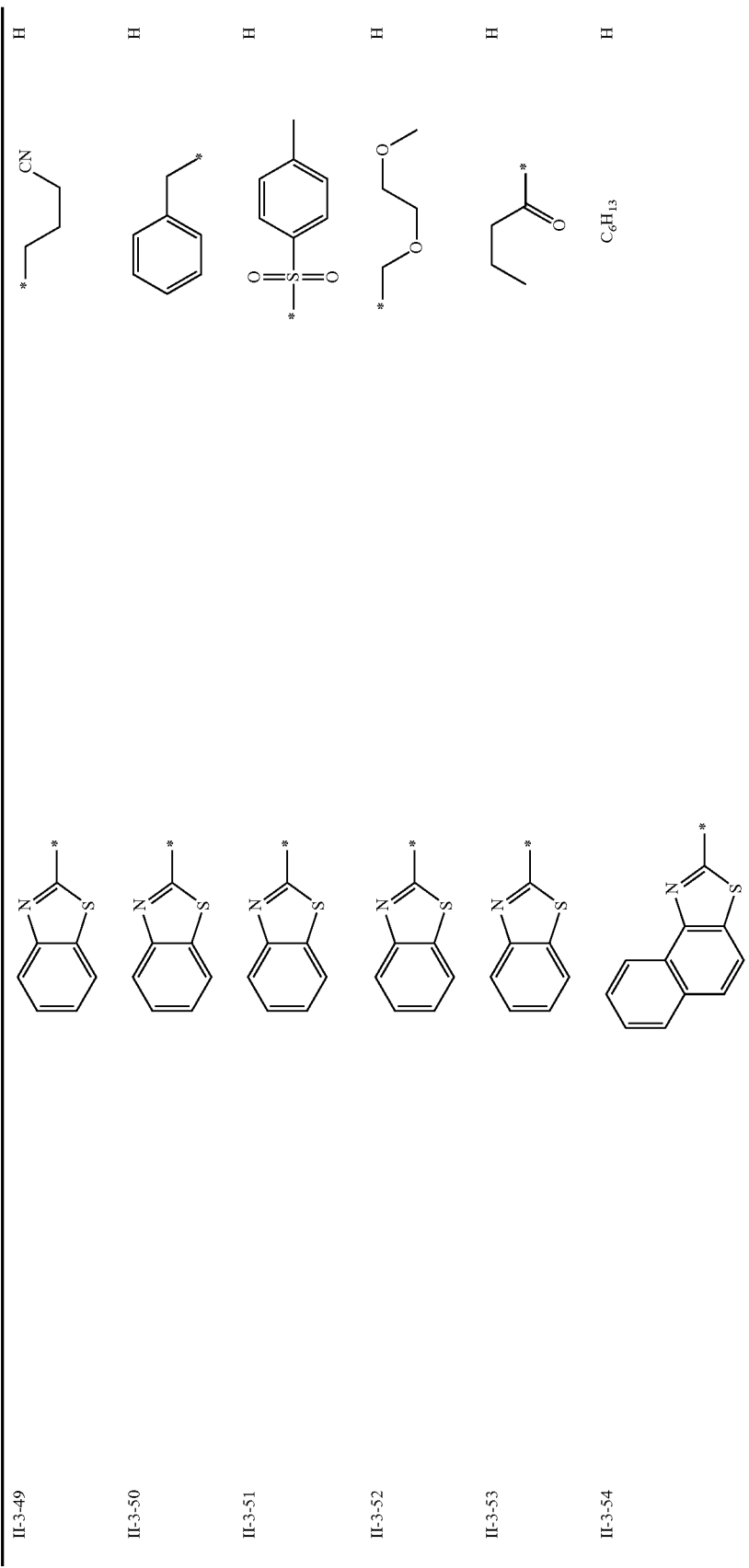

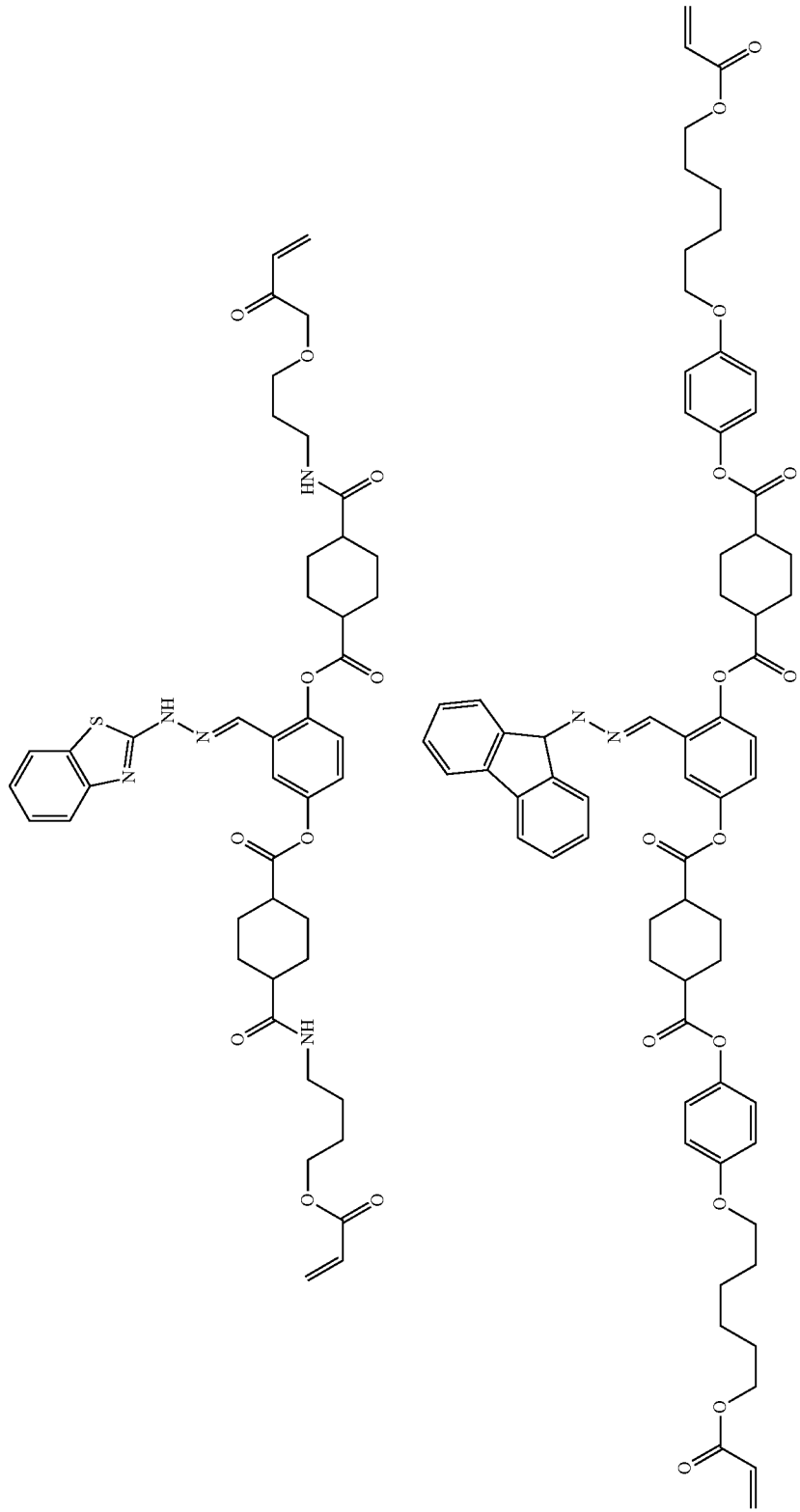

-continued
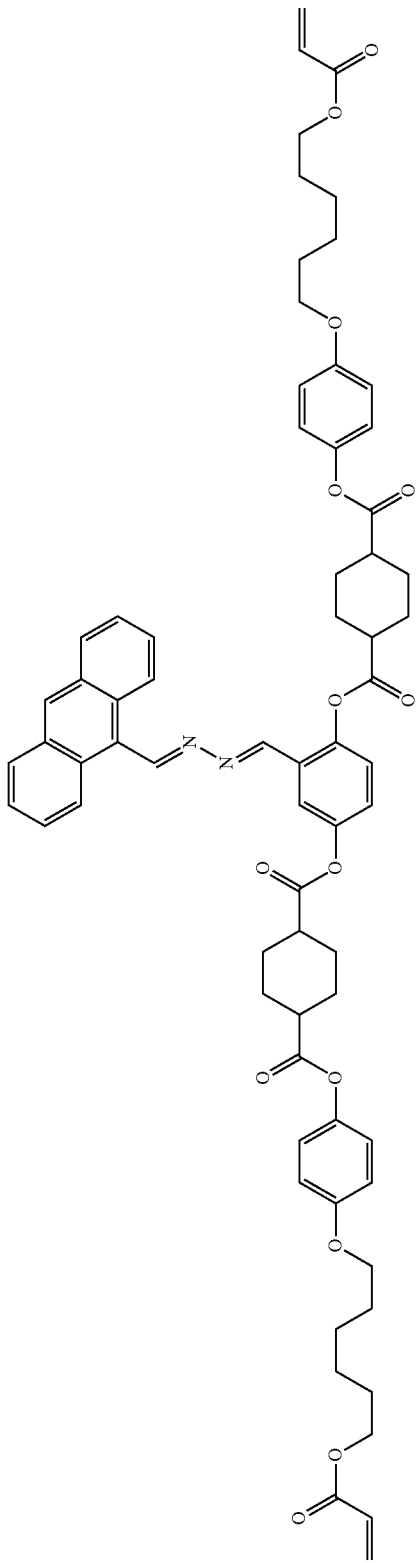
II-4-2
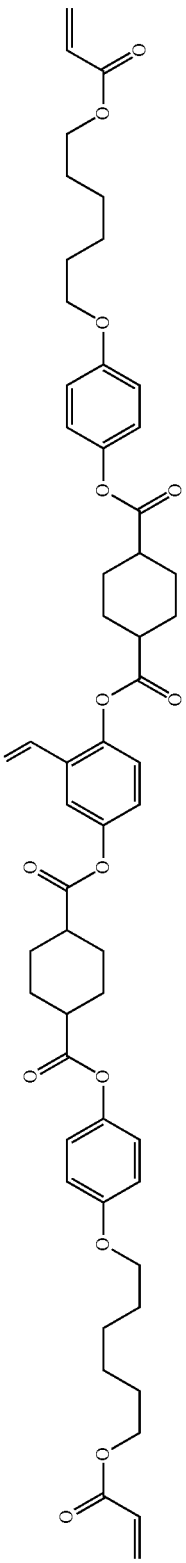
II-4-3

The amount of the liquid crystal compound A0 in the composition for forming a positive A-plate A-0 is preferably from 50% by mass to 98% by mass, and more preferably from 70% by mass to 95% by mass, with respect to the total solid content mass of the composition for forming a positive A-plate.

(Cross-Linkable Polymer)

The composition for forming a positive A-plate A-0 preferably includes cross-linkable polymer. The cross-linkable polymer is a polymer having a cross-linking group (polymerizable group), and means a polymer having no liquid crystallinity (non-liquid crystal polymer). It is presumed that the cross-linkable polymer expresses a leveling function by being unevenly distributed over the air interface during formation of a positive A-plate A-0 from the composition for forming a positive A-plate A-0 to smoothen the surface, and has a function to be an alternative to an alignment film of the positive C-plate. That is, the cross-linkable polymer migrates to the air interface side of the positive A-plate to form a surface concentration region including many cross-linkable polymers, and can align the liquid crystal compounds in the upper layer of a positive C-plate, a positive A-plate on the other side, and the like.

For example, the cross-linkable polymer is unevenly distributed over the air interface of the positive A-plate A-0 to function as a homeotropic alignment film, and the polymerizable rod-shaped liquid crystal compound which is the liquid crystal compound C in the upper layer may be vertically aligned to prepare the positive C-plate. As a result, an optical film in which the positive A-plate A-0 is directly in contact with the positive C-plate, and the cross-linkable polymers are unevenly distributed over the interface of the positive A-plate A-0 on the side of the positive C-plate is obtained.

Moreover, the uneven distribution in the layer of the cross-linked polymer can be confirmed by X-ray photoelectron spectroscopy (XPS) using a sputter, depth-direction analysis of elements/fragments by cross-sectional TOF-SIMS or the like, or observation of the distribution state by the same evaluation of the cross-section of a film using the same device. In addition, the liquid crystal compound C will be described later.

Incidentally, the cross-linkable polymer can suppress the surface stickiness of the positive A-plate by cross-linking the cross-linking groups, and thus, it is possible to provide dissolution resistance against the liquid crystal compound, coating solvents to be used, and the like during formation of the positive C-plate of the upper layer. Consequently, the functions of the alignment film can be significantly improved.

From those viewpoints, that is, for the purpose of exhibiting a sufficient leveling function as well as sufficient formability of a surface concentration region, as the cross-linkable polymer used in the composition for forming a positive A-plate A-0, the polymer preferably has high hydrophobicity to the liquid crystal compound A0 to be used. By significantly increasing the hydrophobicity of the cross-linkable polymer, the unevenly distribution into the surface is promoted, and thus, it is possible to form a surface concentration region.

Preferred examples of the cross-linkable polymer include polymers having the repeating units represented by the following general formula (III).

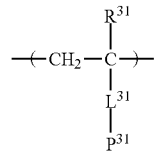

General Formula (III)

In General Formula (III), $R^{31}$ represents a hydrogen atom or an alkyl group having 1 to 4 carbon atoms, and is preferably a hydrogen atom or a methyl group. $P^{31}$ is a monovalent group containing an ethylenically unsaturated group, and $L^{31}$ is a single bond or a divalent linking group, and preferably a single bond, —O—, an alkylene group, an arylene group, and *—COO—, *—CONH—, *—OCO—, or *—NHCO—, each of which is connected to the main chain on the * side. Preferred examples of $P^{31}$ include a monovalent group containing a group selected from an acryloyl group, a methacryloyl group, and a styryl group, and most preferred examples thereof include a monovalent group containing a group selected from an acryloyl group and a methacryloyl group.

In General Formula (III), preferred examples of the combinations include those in which $R^{31}$ is a hydrogen atom or a methyl group, $L^{31}$ is an arylene group, *—COO—, *—CONH—, or *—OCO—, and $P^{31}$ is a monovalent group containing a group selected from an acryloyl group, a methacryloyl group, and a styryl group.

Specific preferred examples of the repeating units represented by General Formula (III) are shown below, but the present invention is not limited thereto.

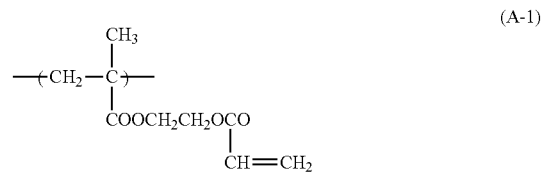

(A-1)

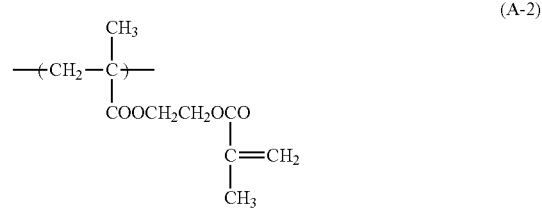

(A-2)

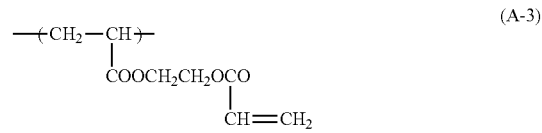

(A-3)

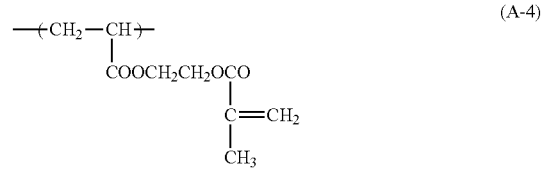

(A-4)

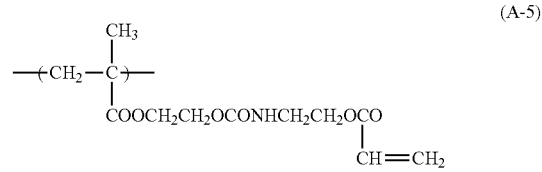

(A-5)

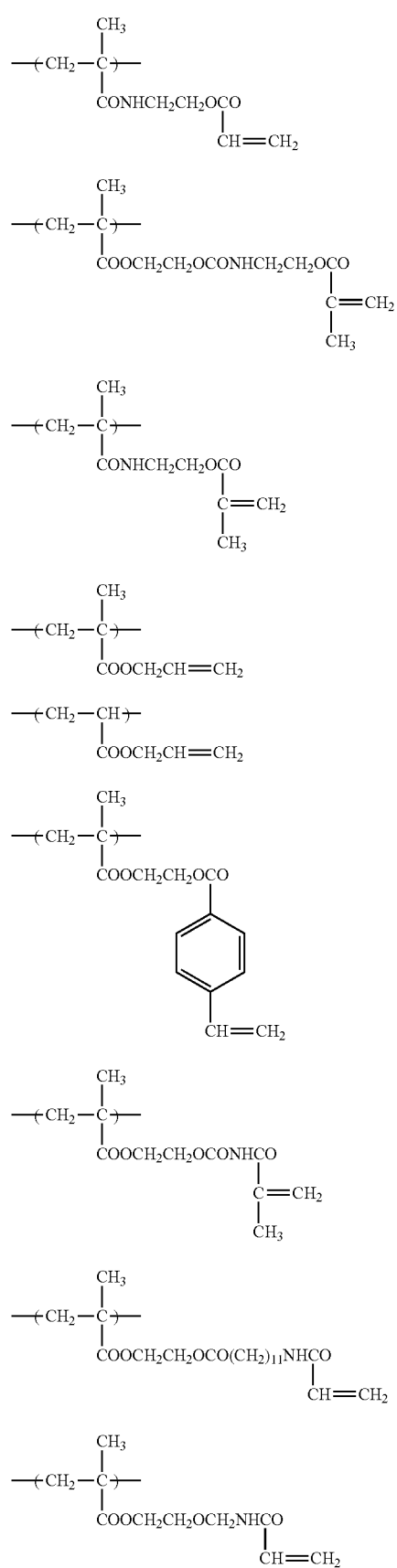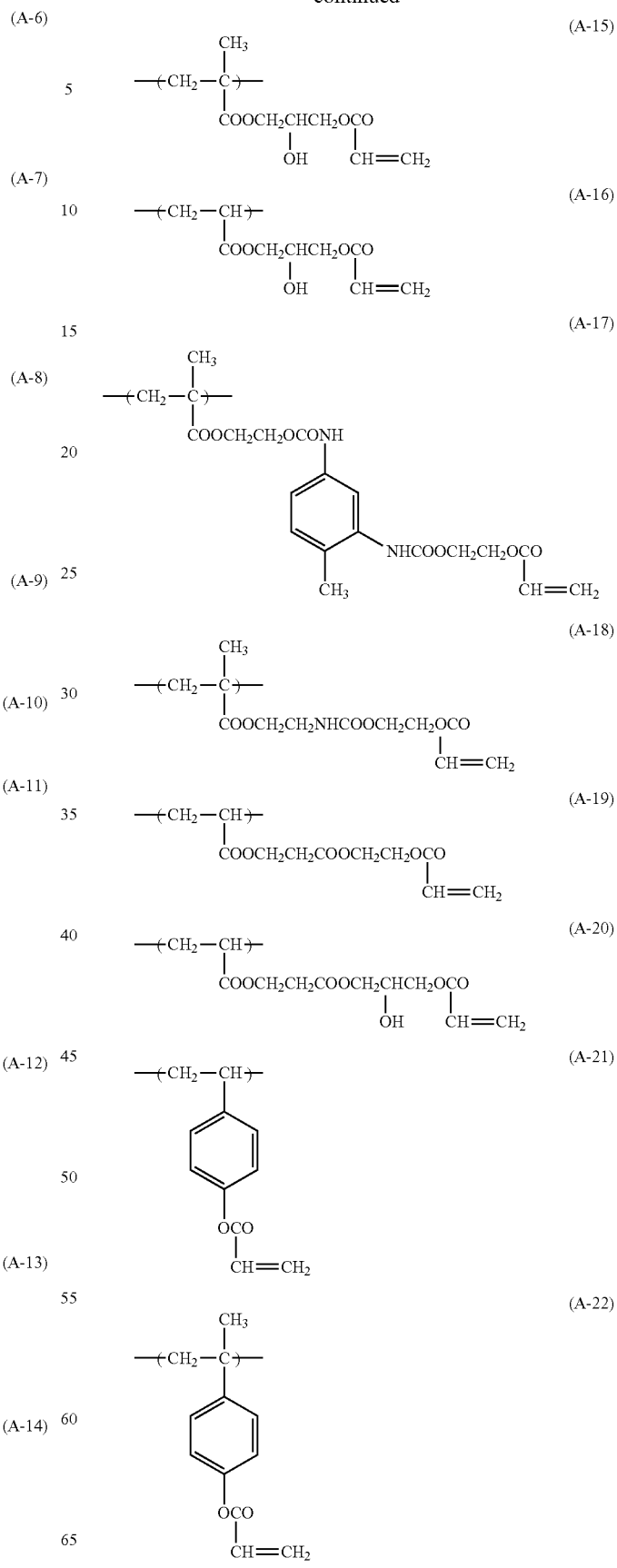

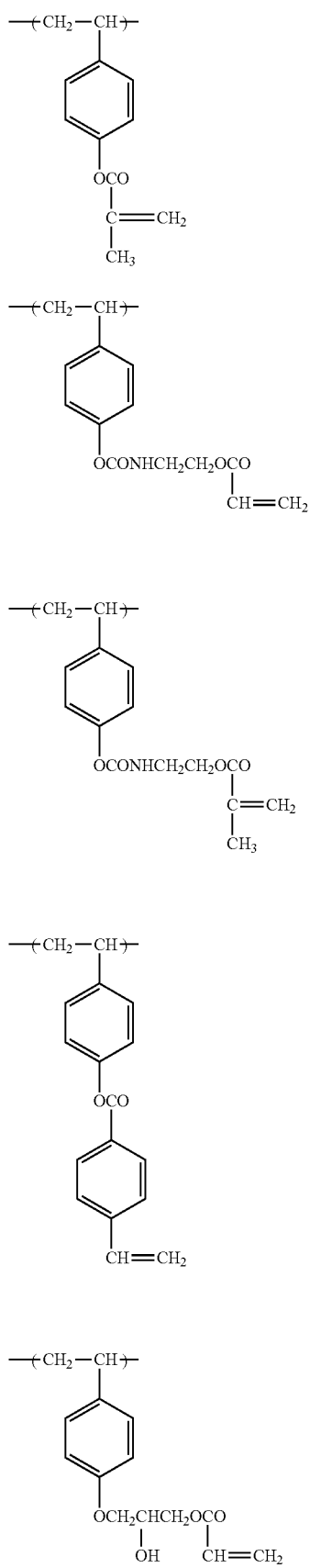

-continued

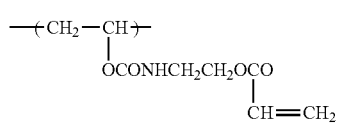 (A-35)

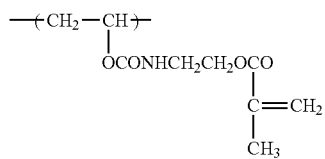 (A-36)

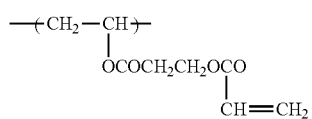 (A-37)

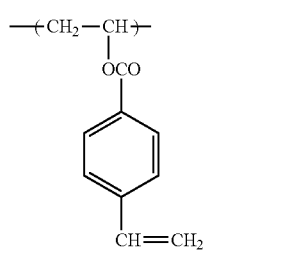 (A-38)

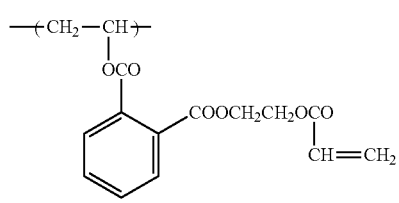 (A-39)

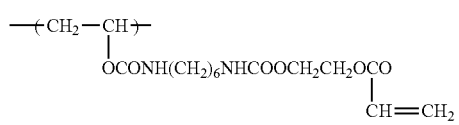 (A-40)

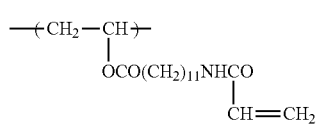 (A-41)

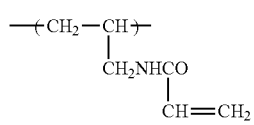 (A-42)

 (A-43)

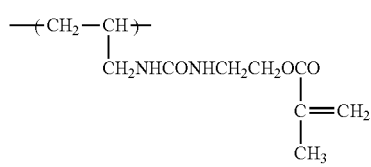 (A-44)

The cross-linkable polymer including the repeating units represented by General Formula (III) may be a copolymer consisting of plural kinds of repeating units represented by General Formula (III), or may be a copolymer including a repeating unit other than the repeating units represented by General Formula (III) (for example, a repeating unit not containing an ethylenically unsaturated group or a repeating unit not containing a polymerizable group).

The cross-linkable polymer containing the repeating units represented by General Formula (III) contains preferably 0.5% by mass to 100% by mass, more preferably 2% by mass to 100% by mass, and still more preferably 5% by mass to 100% by mass, of the repeating units represented by General Formula (III). Further, the preferable molecular weight of the cross-linkable polymer containing the repeating units represented by General Formula (III) is preferably in the range of 1,000 to 1,000,000, more preferably 3,000 to 200,000, and most preferably 5,000 to 100,000, in terms of a weight average molecular weight.

The weight average molecular weight in the present invention refers to an average molecular weight measured by gel permeation chromatography (GPC) as a polystyrene-equivalent value. An example of the specific measurement conditions may be as follows.

GPC device: HLC-8320 (manufactured by Tosoh Corporation):

Columns: TSKgel SuperHZM-H, TSKgel SuperHZ4000, and TSKgel SuperHZ2000 connected, (manufactured by Tosoh Corporation, 4.6 mmID (inner diameter)×15.0 cm)

Eluent: tetrahydrofuran (THF)

With respect to the cross-linkable polymer including the repeating units represented by General Formula (111), reference may be made to the description of the paragraphs <0052> to <0082> of JP2004-238431A.

In the case where the positive C-plate is directly laminated onto the positive A-plate A-0 by a rubbing operation, a cross-linkable polymer which confers some flexibility to the film surface is preferable as the cross-linkable polymer to be added to the positive A-plate A-0, from the viewpoint of the suitability for operation in conferring alignment regulating force to the positive C-plate to be laminated by carrying out rubbing after the cross-linking. Specifically, the glass transition temperature (Tg) of the cross-linkable polymer after the cross-linking is preferably no higher than the temperature at which rubbing is carried out (room temperature). For example, Tg is preferably from −10° C. to 25° C., and more preferably from about 0° C. to 15° C.

Specific examples of such a cross-linkable polymer include polymers having repeating units represented by A-3, A-4, A-10, A-19, A-20, and A-23 to A-44.

The glass transition temperature of the cross-linkable polymer is a temperature at which the micro-Brownian motion of the polymer difference is expressed at the temperature or higher, and for example, at a temperature of such a temperature or higher, the polymer chain is easily stretched, and by setting the polymer after the stretching at Tg or lower, it is possible to immobilize the stretched state.

Various opinions are claimed as a factor for the alignment of the liquid crystals by rubbing the alignment layer, but one of the leading theories is that liquid crystal layer is aligned through microscopic stretching by rubbing the surface of the alignment film polymer substrate.

In the case where an amorphous polymer film is stretched by a rubbing operation, the alignment is generally carried out at a temperature which is slightly higher than the Tg of the film, and breakage easily occurs at Tg or lower. On the other hand, in the case where the amorphous polymer is stretched at a temperature which is much lower than Tg, stretching by rubbing does not occur and the alignment regulating force is not expressed, leading to a non-aligned state.

From the viewpoints above, the glass transition temperature of the cross-linkable polymer can be used as a useful index in order to estimate various properties such as the alignment regulating force of a surface concentration region, in which the cross-linkable polymers are is unevenly distributed on the side of the interface of the C-plate with the A-plate.

The Tg of the film can be measured by thermogravimetry-differential thermal analysis (TG/DTA), differential scanning calorimetry (DSC), thermal mechanical analysis (TMA), dynamic mechanical analysis (DMA), dielectric analysis (DEA), or the like. For the rubbing of the alignment film, the polymer chain of the alignment film surface is stretched, but the rubbing operation is preferably carried out at a temperature corresponding to the Tg of the polymer.

For example, as described in Liquid Crystal Handbook P226 (K. Miyano, Phys. Rev. Lett. 43, 51 (1979), K. Okano and J. Murakami, J. Phys. (Paris), 40, C3-525 (1979) J. M. Geary, J. W. Goodby, A. R. Kmetz, and J. S. Patel, J. Appl. Phys., 62, 4100, (1987)), it is said that a main chain or side chain of the alignment film polymer present around the air interface of the alignment film is usually stretched by a rubbing treatment in alignment film formed on the surface of a film or the like, which serves as a driving force of alignment, leading to alignment of the liquid crystal compound.

Thus, the Tg of the cross-linkable polymer after the cross-linking reaction is preferably around ±30° C., more preferably in the range of −30° C. to +15° C., and particularly preferably in the range of −30° C. to +0° C., of the environment temperature at which the rubbing treatment is carried out.

As in Examples of the present invention, in the case of carrying out rubbing at room temperature, the Tg of the cross-linkable polymer after the cross-linking is preferably in the range of −10° C. to 35° C., more preferably in the range of −10° C. to 25° C., and still more preferably in the range of 0° C. to 20° C.

The Tg of the cross-linkable polymer or the like may be set as follows in the case (1) where a polymer before the cross-linking is available, the case (2) where a polymer before the cross-linking is available and can be subjected to a cross-linking operation, or the case (3) where a cross-linkable polymer is available in the state of being contained in a film (when the cross-linking reaction is completed).

(1) For the cross-linkable polymer, the glass transition temperature after the cross-linking reaction at a cross-linking density of 40% to 100% is elevated by around 30° C. to 40° C., and thus, specifically, the glass transition temperature (Tg) of the cross-linkable polymer before the cross-linking reaction is preferably {a temperature at which the rubbing is carried out (room temperature) −30° C.} or lower. For example, the Tg before the curing is preferably around −50° C. to −5° C., and more preferably around −40° C. to −10° C.

(2) In the case of carrying out curing under the same condition as in a case where a cross-linkable polymer to which an initiator has been added is applied alone on glass to prepare a positive A-plate, for the cross-linkable polymer, the glass transition temperature (Tg) of the cross-linkable polymer after the cross-linking reaction is preferably a temperature at which the rubbing is carried out (room temperature) or lower. For example, the Tg after the curing is preferably around −10° C. to 25° C., and more preferably around 0° C. to 15° C.

(3) Even in the case where the cross-linkable polymer is in the state of being included in a layer, not a cross-linkable polymer as it is as described above, the glass transition temperature (Tg) can be measured. Specifically, by performing surface analysis by means of Nanoscale Thermal Analysis (nano-TA), the glass transition temperature (Tg) of the cross-linkable polymer after the cross-linking reaction, unevenly distributed on the surface of the layer, can be investigated. At this time, the glass transition temperature (Tg) of the cross-linkable polymer after the cross-linking reaction, unevenly distributed on the outermost surface is preferably a temperature at which the rubbing is carried out (room temperature) or lower. For example, the Tg after the curing is preferably around −10° C. to 25° C., and more preferably around 0° C. to 15° C.

The content of the cross-linkable polymer included in the composition for forming a positive A-plate A-0 is less than that of the liquid crystal compound while not interfering with the optical characteristics, that is, the liquid crystal compound is a main component. The content thereof is preferably 0.01% by mass to 20% by mass, more preferably 0.1% by mass to 10% by mass, and particularly preferably 0.5% by mass to 5% by mass, with respect to the total mass of the liquid crystal compound. Further, plural kinds of the cross-linkable polymers may be included together, or may be used in combination with the polymer not containing a cross-linking group.

(Tilt Angle Controlling Agent)

The composition for forming a positive A-plate A-0 may contain a tilt angle controlling agent. With the addition of a tilt angle controlling agent, a polar angle from the support of the liquid crystal compound A0 or from an air interface (during the production) can be controlled.

As the tilt angle controlling agent, for example, a copolymer of a monomer containing a fluoroaliphatic group can be used, and among these, a copolymer with an aromatic condensed ring functional group or with a monomer containing a carboxyl group, a sulfo group, a phosphonoxy group, or a salt thereof is preferably used. Further, the use of a plurality of tilt angle controlling agents enables fine and stable control of the tilt angle. For such tilt angle controlling agents, the descriptions in the paragraph Nos. 0022 to 0063 of JP2008-257205A and paragraph Nos. 0017 to 0124 of JP2006-91732A can be referred to.

Further, examples of a means of controlling the inclination angle of the liquid crystal compound, in addition to a means of using a tilt angle controlling agent, include a method of imparting a pre-inclination angle by an alignment film with controlled rubbing conditions. An alignment film that provides a pre-inclination angle can be used in combination with the tilt controlling agent.

(Polymerization Initiator)

The composition for forming a positive A-plate A-0 may contain a polymerization initiator. The polymerization initiator is preferably incorporated in the case where the liquid crystal compound has a polymerizable group or in the case where the liquid crystal compound has a polymerizable compound. Specific examples of the polymerization initiator include α-carbonyl compounds (described in the respective specifications of U.S. Pat. Nos. 2,367,661 and 2,367,670), acyloin ethers (described in the specification of U.S. Pat. No. 2,448,828), α-hydrocarbon-substituted aromatic acyloin compounds (described in the specification of U.S. Pat. No. 2,722,512), polynuclear quinone compounds (described in the respective specifications of U.S. Pat. Nos. 3,046,127 and 2,951,758), combinations of triaryl imidazole dimer and p-aminophenyl ketone (described in the specification of U.S. Pat. No. 3,549,367), acridine and phenazine compounds (described in the specifications of JP1985-105667A (JP-S60-105667A), and U.S. Pat. No. 4,239,850), oxadiazole compounds (described in the specification of U.S. Pat. No. 4,212,970), and acylphosphine oxide compounds (described in JP1988-40799B (JP-S63-40799B), JP1993-29234B (JP-H05-29234B), JP1998-95788A (JP-H10-95788A), and JP1998-29997A (JP-H10-29997A).

Specific examples of the photopolymerization initiator as a polymerization initiator include Irgacure series (for example, Irgacure 651, Irgacure 754, Irgacure 184, Irgacure 2959, Irgacure 907, Irgacure 369, Irgacure 379, and Irgacure 819) and Darocure Series (for example, Darocure TPO and Darocure 1173, commercially available from BASF Japan, Ltd.), Quantacure PDO, and Esacure Series (for example, Esacure TZM, Esacure TZT, and Esacure KT046) commercially available from Lamberti.

The amount of the photopolymerization initiator to be used is preferably from 0.01% by mass to 20% by mass, and more preferably from 0.5% by mass to 5% by mass of the solid content of the composition for forming a positive A-plate A-0.

(Non-Liquid Crystal Polymerizable Compound)

The composition for forming a positive A-plate A-0 may contain a non-liquid crystal polymerizable compound, in addition to the aforementioned cross-linkable polymer.

The non-liquid crystal polymerizable compound that is used in combination with a liquid crystal compound is not particularly limited as long as it has compatibility with the liquid crystal compound A0 and does not remarkably cause a change in the inclination angles and inhibition of the alignment of the liquid crystal compound. Among these, a compound having an ethylenically unsaturated group which is polymerizable active, such as a vinyl group, a vinyloxy group, an acryloyl group, and a methacryloyl group is preferably used.

As the non-liquid crystal polymerizable compound, a polymerizable compound having two or more reactive functional groups is particularly preferably used, which is expected to promote adhesion between an alignment film and a positive A-plate. The non-liquid crystal polymerizable compound may be a polymer, but is preferably a monomer (for example, a monomer having a weight average molecular weight of 2000 or less).

In the case where the positive A-plate exhibits a smectic phase, the interlayers in the smectic phase are connected to a non-liquid crystal polyfunctional polymerizable compound by addition of the non-liquid crystal polyfunctional polymerizable compound, and thus suppressed from being in close contact with each other, whereby an alignment defect-suppressing effect can be expected.

Specific examples of the non-liquid crystal polymerizable compound include esters of polyhydric alcohol and (meth) acrylic acid (for example, ethylene glycol di(meth)acrylate, 1,4-cyclohexane diacrylate, pentaerythritol tetra(meth)acrylate, pentaerythritol tri(meth)acrylate, trimethylol propane tri(meth)acrylate, trimethylolethane tri(meth)acrylate, dipentaerythritol tetra(meth)acrylate, dipentaerythritol penta (meth)acrylate, dipentaerythritol hexa(meth)acrylate, 1,2,3-cyclohexane tetramethacrylate, polyurethane polyacrylate, and polyester polyacrylate), vinylbenzene and derivatives thereof (for example, 1,4-divinylbenzene, 4-vinylbenzoic acid-2-acryloylethyl ester, and 1,4-divinylcyclohexanone), vinyl sulfone (for example, divinyl sulfone), acrylamide (for example, methylene-bisacrylamide), and methacrylamide.

One kind or two or more kinds of the non-liquid crystal polymerizable compound may be contained in the composition for forming a positive A-plate A-0. The content of the non-liquid crystal polymerizable compound is generally in the range of 0.5% by mass to 50% by mass, and preferably in the range of 1% by mass to 30% by mass, with respect to the liquid crystal compound.

(Solvent)

The composition for forming a positive A-plate A-0 may contain a solvent. As the solvent of the composition, an organic solvent is preferably used. Examples of the organic solvent include amides (for example, N,N-dimethyl formamide), sulfoxides (for example, dimethyl sulfoxide), heterocyclic compounds (for example, pyridine), hydrocarbons (for example, benzene and hexane), alkyl halides (for example, chloroform and dichloromethane), esters (for example, methyl acetate and butyl acetate), ketones (for example, acetone, methyl ethyl ketone, and cyclohexane), and ethers (for example, tetrahydrofuran and 1,2-dimethoxyethane), with alkyl halides and ketones being preferable. As the solvent, one kind or a combination of two or more kinds of organic solvents may be used. The solvent is preferably prepared such that the solid concentration of the composition is 10% by mass to 50% by mass.

(Other Additives)

The composition for forming positive A-plate A-0 may also contain a surfactant for controlling surface properties or surface shapes, an additive (alignment aid) for control the tilt angle of a liquid crystal compound, an additive (plasticizer) for reducing an alignment temperature, a polymerizable monomer, an agent for imparting other functions, or the like.

(Method for Producing Positive A-Plate A-0)

The positive A-plate A-0 can be produced by applying the composition for forming a positive A-plate A-0 on the surface of a support or on the surface of an alignment film formed on the support to cure the composition. In addition, the positive A-plate A-0 can also be produced by subjecting the surface of a polarizing film (for example, a polyvinyl alcohol film) to a rubbing treatment and applying the composition for forming a positive A-plate A-0 to the surface to cure the composition.

(Alignment Treatment and Alignment Film)

In forming the positive A-plate A-0, a technique is necessary for aligning the molecules of the liquid crystal compound in the composition in a desired alignment state. For example, it is common to use a technique of using an alignment film for aligning liquid crystal compound in a desired direction. Examples of the alignment film includes a rubbing-treated film formed of an organic compound such as a polymer; an oblique deposition film of an inorganic compound; a microgrooved film; and a film formed by lamination of LB films formed according to a Langmuir-Blodgett's method of depositing an organic compound such as o-tricosanoic acid, dioctadecylmethylammonium chloride, and methyl stearate. Examples of the film further include an alignment film capable of exhibiting an alignment function through irradiation with light. As the alignment film, a film formed by a rubbing treatment of the surface of a polymer layer is also preferable. The rubbing treatment is carried out by rubbing the surface of a polymer layer a few times in a predetermined direction, using paper or cloth. As for the kind of the polymer for use in the alignment layer, polyimide, polyvinyl alcohol, and modified polyvinyl alcohol described in paragraph Nos. <0071> to <0095> of JP3907735B, the polymerizable group-having polymer described in JP1997-152509A (JP-H09-152509A), or the like can be preferably used. The thickness of the alignment layer is not necessarily think as long as it can provide an alignment function, and it is preferably from 0.01 µm to 5 µm, and more preferably from 0.05 µm to 2 µm. The alignment film has a rubbing-treated surface which has been subjected to a rubbing treatment. As the rubbing treatment, a general rubbing treatment method can be used, and for example, it can be carried out by rubbing the surface of an alignment film by a rubbing roll. In an embodiment in which an alignment film is continuously formed on a support formed of a lengthwise polymer film, from the viewpoint of production suitability, the direction of the rubbing treatment (rubbing direction) preferably coincides with the longitudinal direction of the support. This also applies to a case where a positive A-plate is directly formed on the surface of a polarizing film or the like.

In the most preferable embodiment, an alignment film formed by irradiating a photo-alignment material with polarized or non-polarized light, that is, a so-called photo-alignment film is used as the alignment film. It is preferable to impart the alignment regulating force to the photo-alignment film by a step of irradiating polarized light from the vertical (normal) or inclination direction, or by a step of irradiating non-polarized light from an inclination direction.

As the photo-alignment material is aligned by non-contact light irradiation as described above in the photo-alignment layer, non-uniform physical irregular shapes are less likely to occur than in the case of being subjected to rubbing treatment. Therefore, light leakage is reduced in a liquid crystal display apparatus using an optical film prepared by using the photo-alignment film, and a high contrast can be accomplished. Depending on the use of the photo-alignment film, for example, it is possible to prepare an alignment film having excellent symmetry with a pre-tilt angle of 0° by light irradiation from the vertical (normal) direction. Depending on the use of the obtained alignment film, it is possible to horizontally align the liquid crystal compound in the composition for forming a positive A-plate A-0 with excellent symmetry. As a result, an optical film including a positive A-plate formed by using a photo-alignment film is particularly useful for optical compensation in a liquid crystal display apparatus for which a pre-tilt angle of the drive liquid crystal is not required, such as an IPS mode liquid crystal display apparatus.

Examples of the photo-alignment material for use in a photo-alignment film include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; aromatic ester compounds described in JP2002-229039A; maleimide and/or alkenyl-substituted nadimide compounds having photo-alignment units described in JP2002-265541A and JP2002-317013A; photo-cross-linkable silane derivatives described in JP4205195B and JP4205198B; photo-cross-linkable polyimides, polyamides, and esters described in JP2003-520878A, JP2004-529220A, and JP4162850B; and photo-dimerizable compounds, in particular, a cinnamate compound, a chalcone compound, and a coumarin compound, described in JP1997-118717A (JP-H09-118717A), JP1998-506420 (JP-H10-506420A) and JP2003-505561A, WO2010/150748A, JP2013-177561A, and JP2014-12823A. Particularly preferred examples thereof include azo compounds, a photo-cross-linkable polyimide, a polyamide, an ester, a cinnamate compound, and a chalcone compound.

(Coating Method)

Examples of a method for applying a composition for forming a positive A-plate A-0 on the surface of an alignment film or a polarizing film include known methods such as a curtain coating method, a dip coating method, a spin coating method, a printing coating method, a spray coating method, a slot coating method, a roll coating method, a slide coating method, a blade coating method, a gravure coating method, and a wire bar method.

In addition, the descriptions of JP2008-225281A and JP2008-026730A can be referred for the details of the method for producing the positive A-plate.

(Alignment of Liquid Crystal Compound)

An alignment treatment in which the liquid crystal compound A of the coating layer of the composition for forming a positive A-plate A-0 may be aligned, prior to curing of the composition for forming a positive A-plate A-0, can be carried out by drying at room temperature or the like or by heating. In the case of a thermotropic liquid crystal compound, the liquid crystal phase formed by the alignment treatment can generally be transferred by a change in temperature or pressure. In the case of the liquid crystal with lyotropic properties, the liquid crystal phase can also be transferred according to the compostional ratio such as the amount of a solvent.

In the case where a rod-shaped liquid crystal compound expresses a smectic phase, it is common that a temperature band in which a rod-shaped liquid crystal compound expresses a nematic phase is higher than a temperature band in which the rod-shaped liquid crystal compound expresses the smectic phase. Accordingly, the rod-shaped liquid crystal compound can be transferred from the nematic phase to the smectic phase by heating the rod-shaped liquid crystal compound to a temperature band in which the rod-shaped liquid crystal compound expresses the nematic phase, and then lowering the heating temperature to a temperature band in which the rod-shaped liquid crystal compound expresses the smectic phase. By being transferred to the smectic phase by such a method, a positive A-plate in which the liquid crystal compounds is aligned highly in order can be provided.

In a temperature band in which the rod-shaped liquid crystal compound expresses a nematic phase, it is necessary to heat the rod-shaped liquid crystal compound for a predetermined time until the compound forms a mono-domain. The heating time is preferably from 10 seconds to 5 minutes, more preferably from 10 seconds to 3 minutes, and most preferably from 10 seconds to 2 minutes.

In a temperature band in which the rod-shaped liquid crystal compound expresses a smectic phase, it is necessary to heat the rod-shaped liquid crystal compound for a predetermined time until the compound expresses the smectic phase. The heating time is preferably from 10 seconds to 5 minutes, more preferably from 10 seconds to 3 minutes, and most preferably from 10 seconds to 2 minutes.

[Fixation of Alignment State]

Fixation of an alignment state can be carried out through thermal polymerization or polymerization by active energy rays, and can also be carried out by appropriately selecting a polymerizable group or a polymerization initiator that is suitable for the polymerization. Further, a polymerization reaction by irradiation with ultraviolet rays can be preferably used, taking into consideration production suitability and the like. if the irradiation amount of ultraviolet rays is small, the polymerizable rod-shaped liquid crystal compound thus not polymerized remains, which leads to deterioration of optical characteristics due to temperature change or time passage.

Therefore, it is preferable to determine the irradiation condition such that the ratio of the remaining polymerizable rod-shaped liquid crystal compounds becomes 5% or less. The irradiation condition may depend on the formulation of the polymerizable composition or the film thickness of the positive A-plate, but is preferably carried out at an irradiation amount of 200 mJ/cm² or more as a standard.

<Positive C-Plate>

The positive C-plate of the present invention may have a liquid crystal compound homeotropically aligned. The homeotropic alignment means a state where the molecular long axis of the liquid crystal compound is aligned in the vertical direction. The positive C-plate preferably exhibits a smectic phase or a nematic phase, and more preferably exhibits a smectic phase. Even in the case where a layer structure of high order having the position of the center of gravity of the liquid crystal molecules in the smectic phase is taken and thus homeotropic alignment is easily taken, and further, when the alignment regulating force of a layer-forming surface (base surface) of a substrate is weak, a liquid crystal layer with good homeotropic alignment can be obtained. In the present invention, a positive C-plate exhibiting a smectic phase or nematic phase of high alignment order can be formed directly on the surface of the positive A-plate while not forming an alignment film, and therefore, a thinner film and a higher contrast can be achieved.

The film thickness of the positive C-plate is preferably 0.3 μm to 3.0 μm, more preferably 0.5 μm to 2.8 μm, still more preferably 0.9 μm to 2.5 μm, and most preferably 1.0 μm to 1.5 μm.

Furthermore, the positive C-plate preferably satisfies $-5 \leq Re(550) \leq 5 (|Re(550)| \leq 5)$, and more preferably satisfies $-3 \leq Re(550) \leq 3 (|Re(550)| \leq 3)$.

In addition, the positive C-plate preferably satisfies $-300 \leq Rth(550) \leq 0$, more preferably satisfies $-200 \leq Rth(550) \leq -60$, and still more preferably satisfies $-180 \leq Rth(550) \leq -80$. By setting the Rth(550) within such a range, when the positive C-plate is incorporated into in a liquid crystal display apparatus for IPS, the effects of the present invention are further effectively exerted.

[Composition for Forming Positive C-Plate]

The positive C-plate in the optical film of the present invention is formed of a cured product of a composition for forming a positive C-plate, containing the liquid crystal compound C. In the present specification, the liquid crystal compound C represents all the liquid crystal compound contained in the composition for forming a positive C-plate, or may be one kind of liquid crystal compound or a mixture of at least two or more kinds of liquid crystal compounds.

The composition for forming a positive C-plate contains the liquid crystal compound C, and further, a polymerization initiator, a solvent, and the like are blended therein as necessary. The composition for forming a positive C-plate preferably further contains a vertical alignment agent as described later.

(Liquid Crystal Compound C)

The liquid crystal compound C is preferably a rod-shaped liquid crystal compound. The liquid crystal compound C is preferably a liquid crystal compound exhibiting the liquid crystal state in a smectic phase or nematic phase, and from the viewpoints of the production condition and the like, a liquid crystal compound exhibiting the liquid crystal state in the nematic phase may be used, or from the aforementioned viewpoints, a liquid crystal compound exhibiting the liquid crystal state in the smectic phase may be used.

As the liquid crystal compound C, any liquid crystal compounds known in the related art may be used, and a liquid crystal compound like the liquid crystal compound A0 may also be used. However, in the case where the liquid crystal compound A0 is a rod-shaped liquid crystal compound, the liquid crystal compound C is also preferably a rod-shaped liquid crystal compound.

Furthermore, the liquid crystal compound C is most preferably a compound containing at least one selected from a group consisting of a compound represented by the following general formula (IA) and a compound represented by the following general formula (IIA).

As the liquid crystal compound C, any of liquid crystal compounds known in the related art may be used, and examples of the rod-shaped liquid crystal compound include azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexylbenzonitriles are preferably used. Not only these low-molecular liquid crystal compounds as described above, but also polymeric liquid crystal compounds may be used. The alignment of the rod-shaped liquid crystal compounds is more preferably fixed by polymerization.

The rod-shaped liquid crystal compound preferably contains a polymerizable group which can cause a polymerization or cross-linking reaction by actinic rays, electron beams, heat, or the like. The definition of the polymerizable group is the same as described above and the number of the polymerizable groups is preferably 1 to 6, and more preferably 1 to 3. As the polymerizable rod-shaped liquid crystal compound, the compounds described in Makromol. Chem., Vol. 190, p. 2255 (1989); Advanced Materials, Vol. 5, p. 107 (1993); the specifications of U.S. Pat. Nos. 4,683,327, 5,622,648, 5,770,107, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-328973A, or the like, can be used.

General Formula (IA)

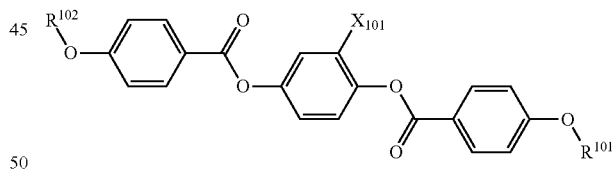

General Formula (IIA)

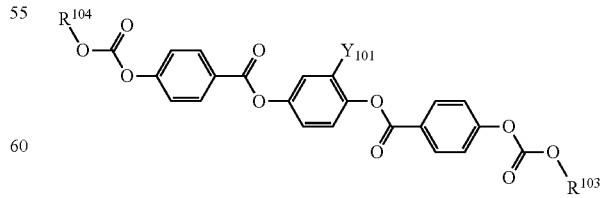

In General Formulae (IA) and (IIA), $R^{101}$ to $R^{104}$ each independently represent $-(CH_2)_n-OOC-CH=CH_2$, in which n represents an integer of 2 to 8. $X_{101}$ and $Y_{101}$ each independently represent a hydrogen atom or a methyl group.

From the viewpoint of suppressing the crystals from being precipitated, $X_{101}$ and $Y_{101}$ each preferably represent a methyl group in General Formula (IA) or (IIA). From the viewpoint of exhibiting the properties as the liquid crystal, n is preferably an integer of 4 to 8.

The amount of the liquid crystal compound C in the composition for forming a positive C-plate is preferably 50% by mass to 98% by mass, and more preferably 70% by mass to 95% by mass, with respect to the total solid content.

(Vertical Alignment Agent)

The composition for forming a positive C-plate preferably contains a vertical alignment agent. Blending of the vertical alignment agent more effectively performs the alignment of the liquid crystal compound in the interface with the positive A-plate. As the vertical alignment agent, a boronic acid compound and/or an onium salt is/are preferably used.

Specific examples of the boronic acid compound include compounds represented by the following formula.

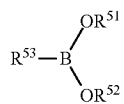

In the formula, $R^{51}$ and $R^{52}$ each independently represent a hydrogen atom, a substituted or unsubstituted aliphatic hydrocarbon group, an aryl group, or a heterocyclic group, and $R^{53}$ represents a substituent including a functional group that can be bonded to a (meth)acrylic group.

As a specific example of the boronic acid compound, the boronic acid compounds represented by General Formula (I) described in the paragraph Nos. 0023 to 0032 of JP2008-225281A can be used. Further, the boronic acid compounds shown below are also preferably used.

Specific examples of the onium salt include compounds represented by the following formula.

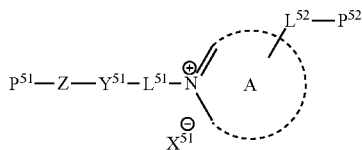

In the formula, ring A represents a quaternary ammonium ion formed of a nitrogen-containing heterocycle; X represents an anion; $L^{51}$ represents a divalent linking group; $L^{52}$ represents a single bond or a divalent linking group; $Y^{51}$ represents a divalent linking group including a 5- or 6-membered ring as a partial structure; Z represents a divalent linking group including 2 to 20 alkylene groups as a partial structure; and $P^{51}$ and $P^{52}$ each independently represent a monovalent substituent having a polymerizable ethylenically unsaturated group.

Specific examples of the onium salt include the onium salts described in the paragraph Nos. 0052 to 0058 of JP2012-208397A, the onium salts described in the paragraph Nos. 0024 to 0055 of JP2008-026730A, and the onium salts described in JP2002-37777A.

The vertical alignment agent is preferably present in an amount of 0.1% by mass to 5% by mass, and more preferably 0.5% by mass to 3% by mass, with respect to the total mass of the liquid crystal compound contained in the composition for forming a positive C-plate. The composition for forming a positive C-plate may contain one kind or two or more kinds of vertical alignment agents. If the composition for forming a positive C-plate contains two or more vertical alignment agents, the total amount thereof falls within the above range.

Furthermore, the composition for forming a positive C-plate may contain a polymerization initiator, a non-liquid crystal polymerizable compound, a solvent, other additives,

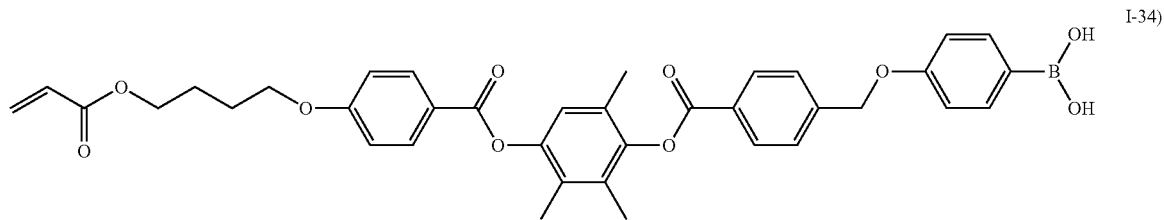

I-34)

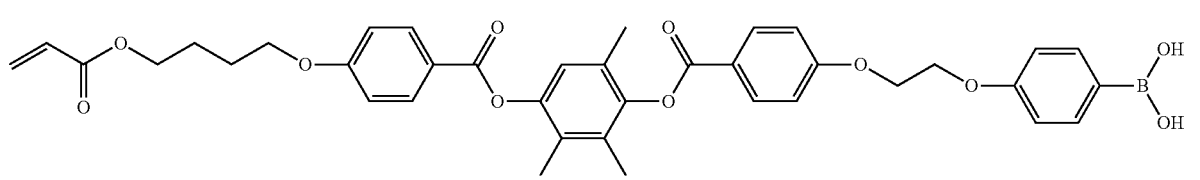

I-35)

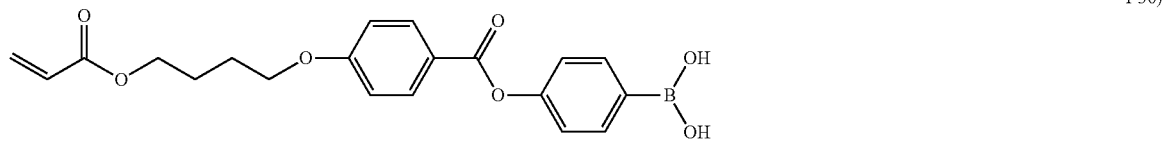

I-36)

and the like. The description of the composition for forming a positive A-plate can be referred to with respect to the details thereof and the preferred ranges or blending amounts thereof are also the same as those of the composition for forming a positive A-plate.

(Method for Producing Positive C-Plate)

The positive C-plate is preferably formed by applying the composition for forming a positive C-plate onto the surface of a positive A-plate. The descriptions of the method for producing a positive A-plate, except for direct application of the composition for forming a positive C-plate onto the surface of the positive A-plate and the compositions of the composition for forming a positive C-plate, can be referred to with respect to the method for producing a positive C-plate.

<Support>

The optical film of the present invention may contain a support. The support is a layer having a function as a substrate for applying the composition for forming a positive A-plate A-0 or a function for maintaining the layer shapes of the positive A-plate and the positive C-plate. The support may be a temporary support which is used as a substrate for applying the aforementioned polymerizable composition to form a positive A-plate, or a positive A-plate and a positive C-plate, and is then peeled. That is, the optical film of the present invention may not contain a support. In the case where the support is used after forming the positive A-plate or positive A-plate and the positive C-plate are formed and then peeled for use, a material having surface properties which are easily peeled may be used, and as such a temporary support for formation, glass, a polyester film which has not been subjected to an easy adhesion treatment, or the like can be used.

As the support (temporary support), a plastic film as well as glass or the like may be used. Examples of the plastic film include polyesters such as polyethylene terephthalate (PET), polycarbonates, acryl resins, epoxy resins, polyurethanes, polyamides, polyolefins, cellulose derivatives, silicones, and polyvinyl alcohols (PVA).

The film thickness of the support may be about 5 µm to 1000 µm, preferably 10 µm to 250 µm, and more preferably 15 µm to 90 µm.

Furthermore, layers having functions as a support and an alignment film, respectively, may be each provided or a single layer having both the functions may be provided.

For example, without lamination with a polymer film, a polarizing film may be subjected to a rubbing treatment or a photo-alignment treatment to prepare a polarizing plate in the form of a thin film, having a positive A-plate formed therein, directly on a glass substrate such as a liquid crystal cell.

<Use of Optical Film>

The optical film of the present invention is useful as, for example, an optical compensation film that optically compensates a liquid crystal cell, or as a phase difference plate of a broadband λ/4 plate used in an organic EL display apparatus. The phase difference plate of the broadband λ/ plate can be used as an anti-reflection plate in combination with a polarizing film in the organic EL display apparatus.

(Optical Compensation Film)

The optical compensation film is suitably used in optical compensatory applications of a liquid crystal display apparatus (LCD), and can reduce the change in the shade or light leakage in black display when viewed in the inclination direction.

For example an optical compensation film can be provided between the polarizing film and the liquid crystal cell in an IPS liquid crystal display apparatus.

The optical compensation film can be used as, for example, a part of a polarizing plate through lamination of the optical film and the polarizing film. In the case where the optical film of the present invention has a support, the optical film, and the polarizing film may be laminated on the side of the positive A-plate and the positive C-plate or on the opposite side, when viewed from the side of the support.

When the optical film and the polarizing film are laminated such that the polarizing film, the positive A-plate, and the positive C-plate are placed in this order, the angle formed between the slow axis direction of the positive A-plate and the absorption axis direction of the polarizing film is preferably in the range of 90°±10°.

When the optical film and the polarizing film are laminated such that the polarizing film, the positive C-plate, and the positive A-plate are placed in this order, the slow axis direction of the positive A-plate is preferably parallel to the absorption axis direction of the polarizing film.

(Anti-Reflection Plate)

The anti-reflection plate is constructed with the optical film and the polarizing film of the present invention.

The anti-reflection plate is suitably used in anti-reflection applications of image display apparatuses such as a liquid crystal display apparatus (LCD), a plasma display panel (PDP), an electroluminescent display (ELD), and a cathode ray tube display apparatus (CRT) to enhance the contrast ratio of a display screen.

For example, the anti-reflection plate can be used on the light extraction surface side of an organic EL display apparatus. In this case, the external light becomes linearly polarized light by the polarizing film, then passes through a phase difference plate, and thus, becomes circular polarization. The circularly polarizing state of the light is inverted when the light is reflected by a metal electrode or the like of the organic EL panel, and the circular polarization becomes a linearly polarized light inclined at 90° from the time of being incident when passing through the phase difference plate again, and reaches the polarizing film to be absorbed thereinto. As a result, it is possible to suppress the effect of external light.

The anti-reflection plate can be produced by, for example, bonding an optical film and a polarizing film with an adhesive or the like or by forming the optical film and the polarizing film directly on the polarizing film. In the case where the optical film of the present invention has a support, the polarizing film may be adhered onto the side of the positive A-plate and the positive C-plate, or onto the opposite side, when viewed from the side of the support.

The angle formed between the slow axis direction of the positive A-plate and the absorption axis direction of the polarizing film in the anti-reflection plate is preferably in the range of 45°±10°.

Production of the anti-reflection plate preferably includes, for example, a step of successively laminating the optical film and the polarizing film, each in the long state. The long anti-reflection plate is cut to the size of a screen in an image display apparatus used.

The anti-reflection plate may include other layers, in addition to the optical film and the polarizing film.

For example, the anti-reflection plate may include a protective film and/or a functional layer on the side opposite to the side on which the optical film of the polarizing film is disposed.

It is preferable to use a cellulose ester film having high optical isotropy as the protective film.

Examples of the functional layer include at least one selected from the group consisting of an anti-reflection layer, an antiglare layer, a hardcoat layer. For these, known layer materials are used. In addition, these layers may be a lamination of a plurality of layers.

The anti-reflection layer refers to a structure to reduce the reflection by an optical interference-involved configuration, unlike so-called an anti-reflection plate of a circularly polarizing plate, in which the structure is made from the optical film and the polarizing plate of the present invention as described above. The anti-reflection layer may have the simplest configuration, that is, a structure formed of only a low refractive index layer. In order to further reduce the reflectance, the anti-reflection layer is preferably constructed by a combination of a high refractive index layer having a high refractive index and a low refractive index layer having a low refractive index. Examples of the configuration include a two-layer configuration having a high refractive index layer and a low refractive index layer in this order from the underside, and a configuration of three layers having different refractive indexes, in which a middle refractive index layer (having a higher refractive index than a lower layer and a lower refractive index than a high refractive index layer), a high refractive index layer, and a low refractive index layer are laminated in this order. Layer configurations, in which much more refractive index layers are laminated are also proposed. Among them, from the viewpoint of durability, optical characteristics, cost, productivity or the like, a configuration having, on a hardcoat layer, a middle refractive index layer, a high refractive index layer, and a low refractive index layer in this order is preferred, and configurations described, for example, in JP1996-122504A (JP-H08-122504A), JP1996-110401A (JP-H08-110401A), JP1998-300902A (JP-H10-300902A), JP2002-243906A, and JP2000-111706A are exemplified. Further, an anti-reflection film of three-layer configuration excellent in robustness against variation in film thickness is described in JP2008-262187A. In the case of disposing the anti-reflection film of three-layer configuration on the surface of an image display apparatus, an average value of reflectance can be controlled to 0.5% or less so that background reflections can be significantly reduced and images excellent in three dimensional appearance can be obtained. In addition, other functions may be imparted to respective layers and a low refractive index layer having antifouling properties, a high refractive index layer having antistatic properties, a hardcoat layer having antistatic properties, and a hardcoat layer having antiglare properties are exemplified (see, for example, JP1998-206603A (JP-H10-206603A), JP2002-243906A, and JP2007-264113 A).

(Polarizing Film)

The polarizing film (polarizer layer) may be any one of so-called linearly polarizing films which have a function of converting natural light into specific linearly polarized light. The polarizing film is not particularly limited, but an absorption type polarizer may be used.

The kind of the polarizing film is not particularly limited and generally used polarizing films can be employed. As the polarizing film, for example, any one of an iodine-based polarizing film, a dye-based polarizing film using a dichromatic dye, a polyene-based polarizing film, and an a polarizer using a wire grid can be used. The iodine-based polarizing film and the dye-based polarizing film are generally prepared by adsorbing iodine or a dichromatic dye on a polyvinyl alcohol, followed by stretching.

The film thickness of the polarizing film may be 50 μm or less, preferably 30 μm or less, and more preferably 20 μm or less. Further, the film thickness of the polarizing film may be usually 1μm or more, 5 μm or more, or 8 μm or more.

Furthermore, as the polarizing film used in the present invention, a coating-type polarizing film prepared by coating or the like, using a thermotropic liquid crystal dichromatic dye, is also preferably used. By using the coating-type polarizing film, a thinner film can be accomplished with respect to a polarizing film with a stretched polyvinyl alcohol. Further, even in the case of application of external forces such as bending, a polarizing plate having a small change in the optical characteristics can be provided.

The film thickness of the coating-type polarizing film as described above may be 250 nm or more, preferably 350 nm or more, and more preferably 450 nm or more.

Furthermore, the film thickness is preferably 1000 nm or less, and more preferably 800 nm or less.

The coating-type polarizing film is formed from a dichromatic dye composition including at least one kind of thermotropic liquid crystal dichromatic dye. The proportion of the non-coloring liquid crystal compound in the dichromatic dye composition is preferably 30% by mass or less.

Examples of the thermotropic liquid crystal dichromatic dye as described above include the thermotropic liquid crystal dichromatic dyes used in optically absorptive anisotropic film, described in JP2011-237513A.

Specific examples of the thermotropic liquid crystal dichromatic dye used in the present invention are shown below, but the invention is not limited to those compounds.

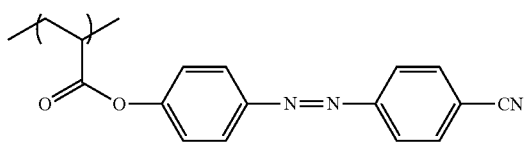

PB-1

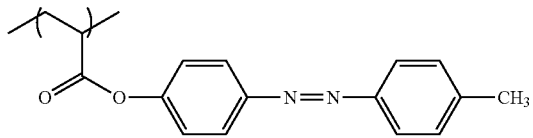

PB-2

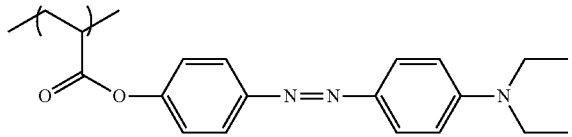

PB-3

-continued
PB-4
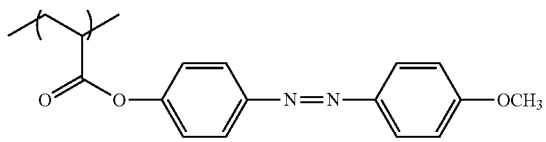
PB-5
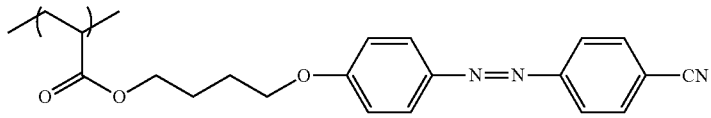
PB-6
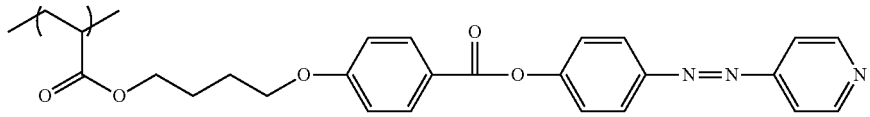
PB-7
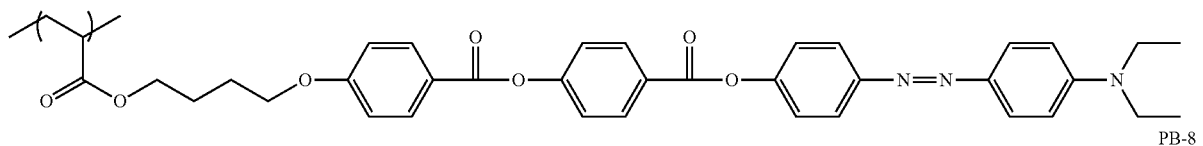
PB-8
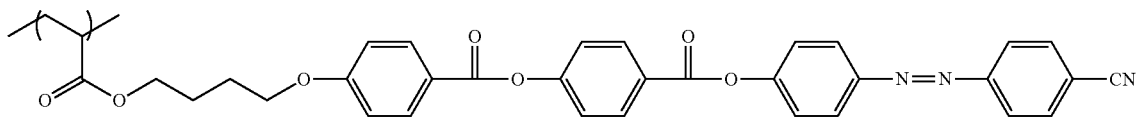
PB-9
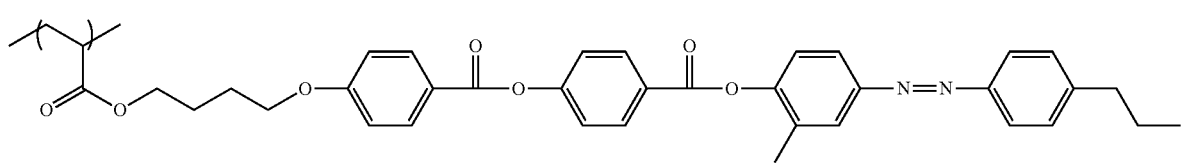
PB-10
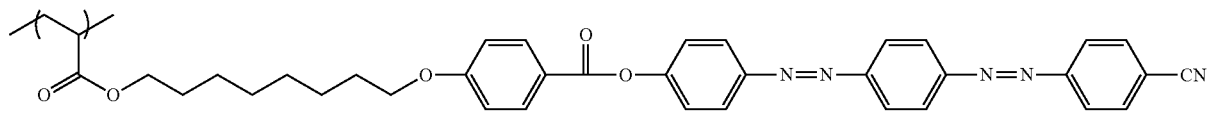
C-1
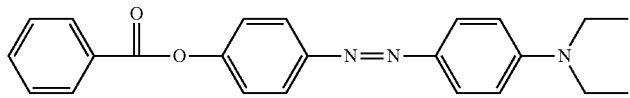
C-2
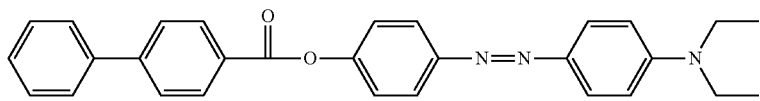
C-3
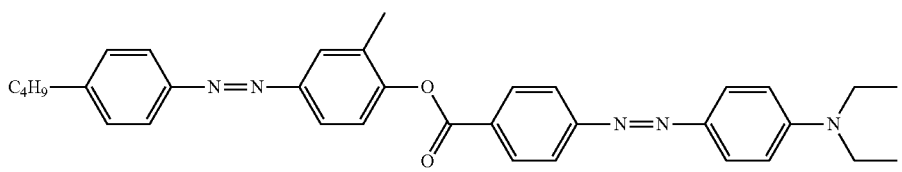
C-4
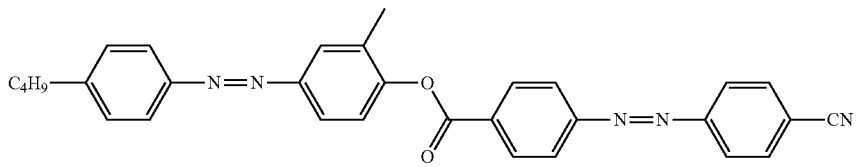

-continued
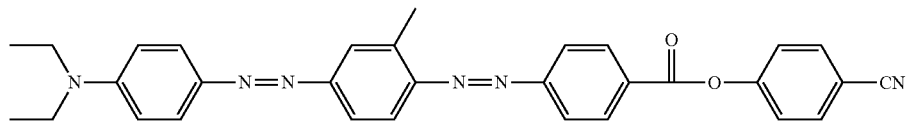
C-5
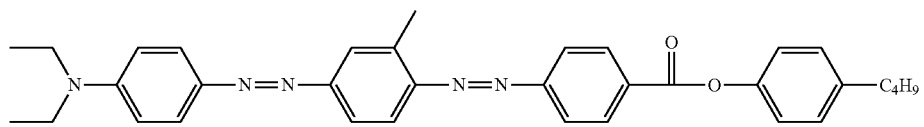
C-6
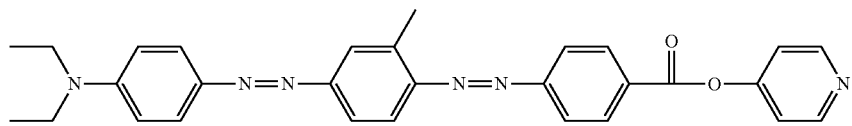
C-7
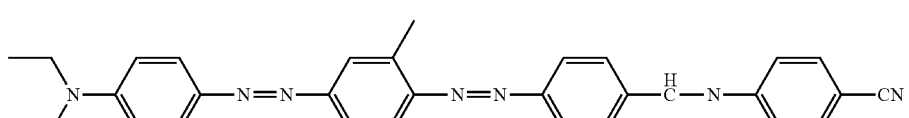
C-8
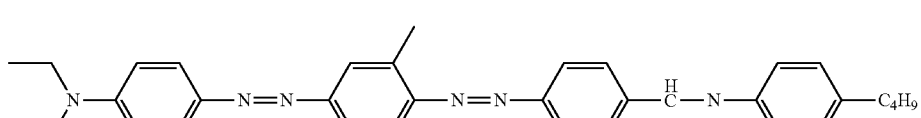
C-9
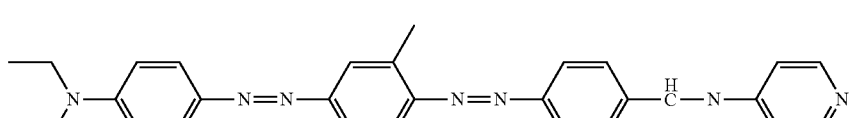
C-10
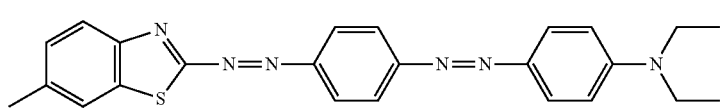
C-11
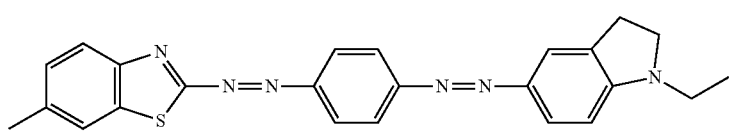
C-12
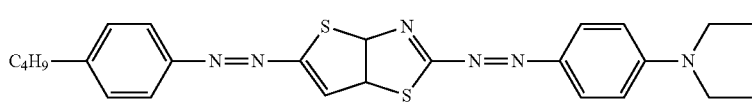
C-13
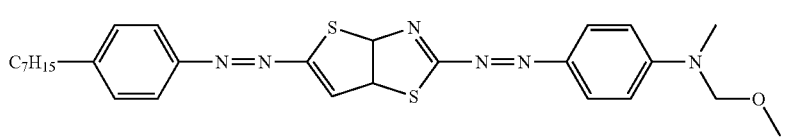
C-14

C-15

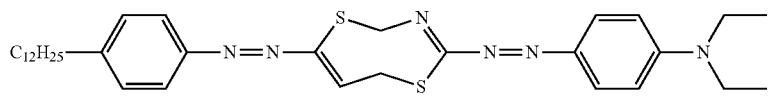

C-16

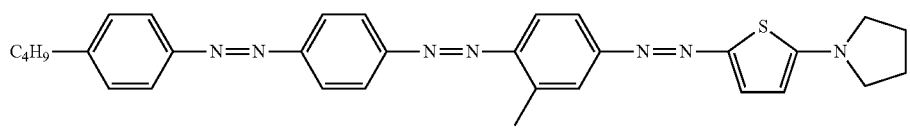

C-17

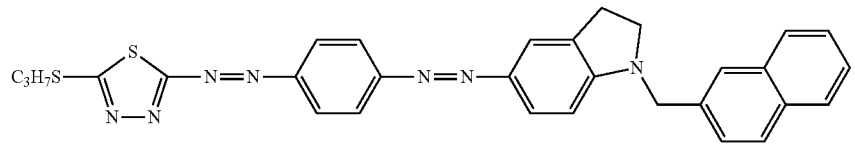

C-18

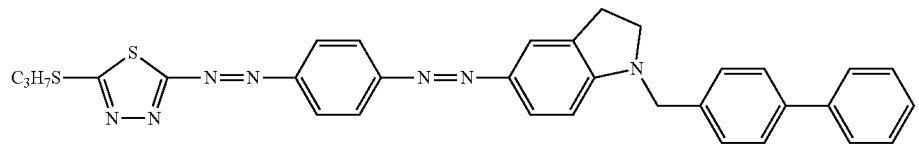

C-19

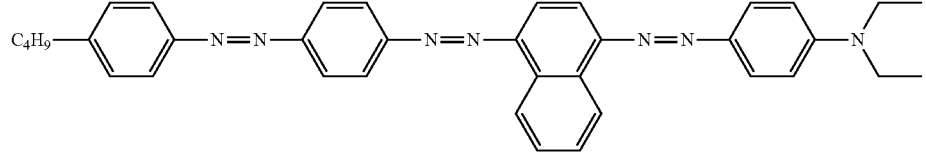

C-20

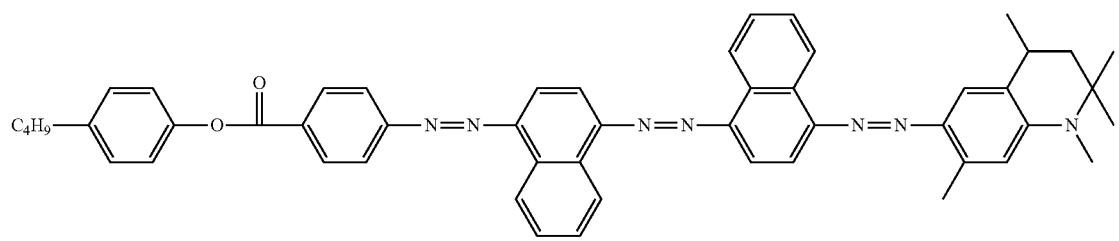

(Adhesive)

In preparation of an optical film, an anti-reflection plate, an organic EL display apparatus, or the like, an adhesive may be used for bonding the respective bonds. In the present specification, "adhesion" is used in the concept that includes "sticking". The adhesive is not particularly limited, but examples thereof include a polyvinyl alcohol-based adhesive, an aqueous boron compound solution, a curable adhesive of an epoxy compound containing no aromatic ring in the molecule, as described in JP2004-245925A, an actinic energy ray-curable adhesive having a photopolymerization initiator having a molar light absorption coefficient of 400 or more at a wavelength of 360 nm to 450 nm and an ultraviolet curable compound as essential components, as described in JP2008-174667A, and an actinic energy ray-curable adhesive including (a) a (meth)acryl-based compound having two or more (meth)acryloyl groups in the molecule, (b) a (meth)acryl-based compound having a hydroxyl group in the molecule and one polymerizable double bond, and (c) a phenol ethylene oxide-modified acrylate or nonyl phenol ethylene oxide-modified acrylate in the total amount of 100 parts by mass of the (meth)acryl-based compound described in JP2008-174667A.

Furthermore, the polyvinyl alcohol-based adhesive is an adhesive containing a modified or non-modified polyvinyl alcohol. The polyvinyl alcohol-based adhesive may contain a modified or non-modified polyvinyl alcohol, and a cross-linking agent. Specific examples of the adhesive include an aqueous solution of a polyvinyl alcohol or a polyvinyl acetal (for example, polyvinyl butyral), and a latex of a vinyl-based polymer (for example, polyvinyl chloride, polyvinyl acetate, and polybutyl acrylate). A particularly preferred adhesive is an aqueous solution of a polyvinyl alcohol. Here, the polyvinyl alcohol is preferably in the state of being completely saponified.

The film thickness of the adhesive layer formed by an adhesive is preferably 0.01 µm to 10 µm, and particularly preferably 0.05 µm to 5 µm, in terms of a dry film thickness.

<Organic EL (Electroluminescene) Display Apparatus>

The optical film or the anti-reflection plate of the present invention can be used in an image display apparatus. Examples of the image display apparatus include, in addition of the IPS type liquid crystal display apparatus as described above, an organic EL display apparatus and a liquid crystal display apparatus. By way of an example of the organic EL display apparatus, an anti-reflection plate may be formed such that, for example, a polarizing film, an optical film, and an organic EL panel are provided in this order.

The organic EL panel is a member which includes a light emitting layer or plural thin organic compound films containing a light emitting layer, formed between a pair of electrodes, that is, an anode and a cathode. The organic EL panel may have, in addition to the light emitting layer, a hole injecting layer, a hole transporting layer, an electron injecting layer, an electron transporting layer, a protective layer, and the like, and each of these layers may have different functions from each other. For the formation of the respective layers, various materials can be used.

The anode serves to feed holes to the hole injecting layer, the hole transporting layer, the light emitting layer, and the like. It can be made of a metal, an alloy, a metal oxide, an electroconductive compound, or a mixture thereof, and is preferably made of a material having a work function of 4 eV or higher. Specific examples of the material include an electroconductive metal oxide such as tin oxide, zinc oxide, indium oxide, and indium-tin oxide (ITO); a metal such as gold, silver, chromium, and nickel; a mixture or a multilayer structure each including one or more of those metals and one or more of those electroconductive metal oxides; an inorganic electroconductive substance such as copper iodide and copper sulfide; an organic electroconductive material such as polyaniline, polythiophene, and polypyrrole; and a multilayer structure including one or more of these materials and ITO. Preferred of these are electroconductive metal oxides, and in particular, ITO is preferred form the viewpoints of productivity, high electrical conductivity, transparency, and the like. Although the film thickness of the anode can be appropriately selected depending on the material thereof, it is usually preferably from 10 nm to 5 µm, more preferably from 50 nm to 1 µm, and still more preferably from 100 nm to 500 nm.

EXAMPLES

Hereinafter, the features of the present invention will be described in more detail with reference to Examples and Comparative Examples. The materials, amounts to be used, ratios, treatment contents, treatment procedures, and the like shown in Examples below can be appropriately modified without departing from the spirit of the present invention. Accordingly, the scope of the present invention is not intended to be restrictively interpreted by the specific examples shown below.

Example 1-1

<Alkali Saponification Treatment of Support>

A commercially available triacetyl cellulose film "Z-TAC" (manufactured by Fujifilm Corporation) was used as a support. The triacetyl cellulose film was allowed to pass through dielectric heating roll supports at a temperature adjusted to 60° C. to elevate the temperature of the film surface of the support to 40° C., and then an alkali solution having the composition shown below was applied onto one surface of the film in a coating amount of 14 ml/m², using a bar coater. Thereafter, the support was heated to 110° C. and transported below a steam type far infrared ray heater manufactured by Noritake Co., Ltd. for 10 seconds. Subsequently, using a bar coater in the same manner as describe above, pure water was applied onto the surface which had been coated with the alkali solution in an amount of 3 ml/m². Then, washing with water using a fountain coater and then dehydration using an air knife were repeated three times, respectively. Subsequently, the film was transported into a drying zone at 70° C. for 10 seconds, and dried therein to prepare an alkali saponification-treated transparent support.

| Composition of Alkali Solution (parts by mass) | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

<Preparation of Alignment Film 1>

Using the transparent support, a coating liquid for forming an alignment film 1 having the following composition was continuously applied onto the alkali saponification-treated surface with a wire bar #8. The coated surface was dried with hot air at 60° C. for 60 seconds and further dried with hot air at 100° C. for 120 seconds, thereby forming an alignment film 1.

| Composition of coating liquid for forming an alignment film 1 | |
|---|---|
| Modified polyvinyl alcohol below | 2.4 parts by mass |
| Isopropyl alcohol | 1.6 parts by mass |
| Methanol | 36 parts by mass |
| Water | 60 parts by mass |

Modified polyvinyl alcohol

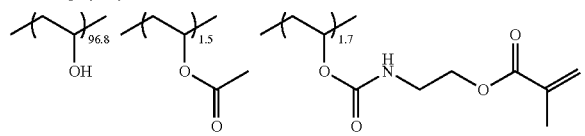

<Preparation of Positive A-Plate A-0 (1)>

Subsequently, the following coating liquid 1 for forming a positive A-plate A-0 was prepared.

| Composition of coating liquid 1 for forming a positive A-plate A-0 | |
|---|---|
| Reverse wavelength dispersion liquid crystal compound R-1 | 100 parts by mass |
| Photopolymerization initiator (Irgacure 819, manufactured by BASF Japan Ltd.) | 3.0 parts by mass |

| Composition of coating liquid 1 for forming a positive A-plate A-0 | |
|---|---|
| Fluorine-containing compound A | 0.8 parts by mass |
| Chloroform | 588 parts mass |

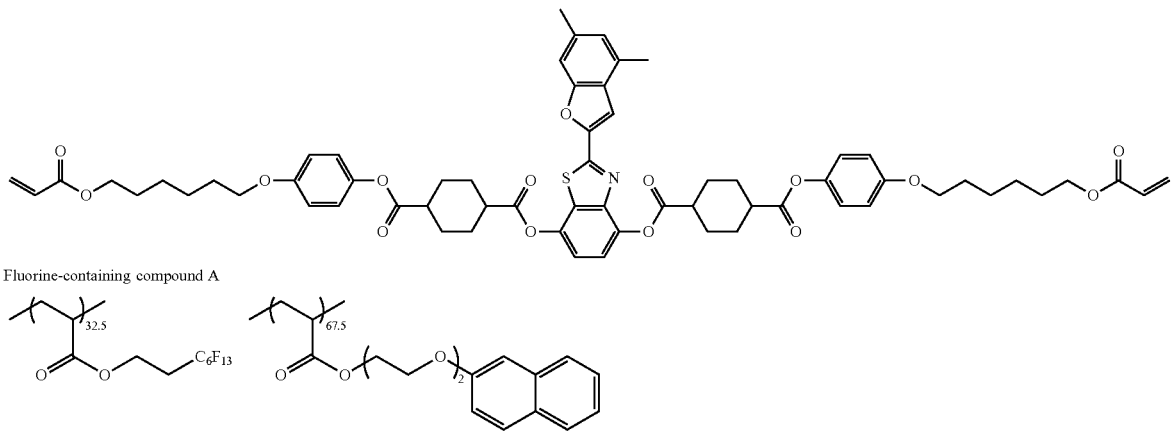

Reverse wavelength dispersion liquid crystal compound R-1: Specific Example II-1-11

Fluorine-containing compound A

The surface of the transparent support having the alignment film 1 on the surface thereof was subjected to a rubbing treatment. The coating liquid 1 for forming a positive A-plate A-0 was applied onto the rubbing-treated surface, using a bar coater, heated and aged at a temperature of the coated film, that is, a film surface temperature of 120° C. for 60 seconds, and then cooled to 70° C. to exhibit a nematic phase after making the film isotropic. Thereafter, the film was irradiated with ultraviolet rays at 1000 mJ/cm$^2$ using an air-cooled metal halide lamp (manufactured by Eye Graphics Co., Ltd.) under an atmospheric air to fix the alignment state, thereby forming a positive A-plate A-0 (1). The slow axis direction of the formed positive A-plate A-0 (1) was parallel to the rubbing direction (the reverse wavelength dispersion liquid crystal compound was aligned to be parallel to the rubbing direction). The dependence of Re on light incident angle and the tilt angle of the optical axis were measured using an automatic birefringence meter (KOBRA-21ADH, manufactured by Oji Scientific Instruments), and it was found that the reverse wavelength dispersion liquid crystal compound was homogeneously aligned with an Re of 130 nm and an Rth of 65 nm at a wavelength of 550 nm, an Re(450)/Re(550) of 0.84, an Re(650)/Re(550) of 1.02, and a tilt angle of the optical axis of 0.4°. At this time, the film thickness was about 1.8 μm.

(Preparation of Positive C-Plate 1-1)

An alignment film 1-1 was prepared on polyethylene terephthalate for a temporary support, using a coating liquid having the same composition as for the coating liquid for forming an alignment film 1, by the same procedure as for the alignment film 1, except that modified polyvinyl alcohol was changed to a commercially available non-modified polyvinyl alcohol PVA103 (manufactured by Kuraray Co., Ltd.). Thereafter, the following coating liquid 1-1 for forming a positive C-plate was coated thereon, then, heated and aged at 60° C. for 60 seconds thereby vertically aligning the polymerizable rod-shaped liquid crystal compounds metal halide lamp (manufactured by Eye Graphics Co., Ltd.) under an atmospheric air to fix the alignment state. In such a way, a positive C-plate 1-1 was prepared. The polymerizable rod-shaped liquid crystal compound was homeotropically aligned with an Re of 0 nm and an Rth of −110 nm at a wavelength of 550 nm, and a tilt angle of the optical axis of 90°. At this time, the film thickness was about 1.5 μm.

| Composition of coating liquid 1-1 for forming positive C-plate | |
|---|---|
| Liquid crystal compound B01 | 80 parts by mass |
| Liquid crystal compound B02 | 20 parts by mass |
| Vertical alignment agent (S01) | 1 part by mass |
| Vertical alignment agent (S02) | 0.5 parts by mass |
| Ethylene oxide-modified trimethylol propane triacylate (V#360, manufactured by Osaka Organic Chemical Industry Ltd.) | 8 parts by mass |
| Irgacure 907 (manufactured by BASF Japan, Ltd.) | 3 parts by mass |
| Kayacure-DETX (manufactured by Nippon Kayaku Co., Ltd.) | 1 part by mass |
| B03 | 0.4 parts by mass |

| Composition of coating liquid 1-1 for forming positive C-plate | |
|---|---|
| Methyl ethyl ketone | 170 parts by mass |
| Cyclohexanone | 30 parts by mass |
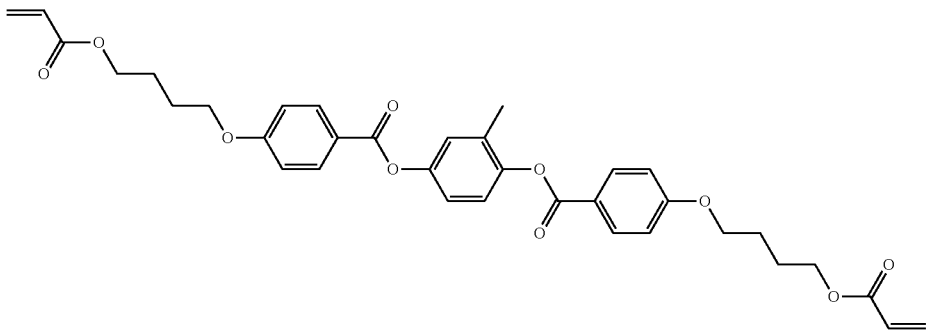
B01
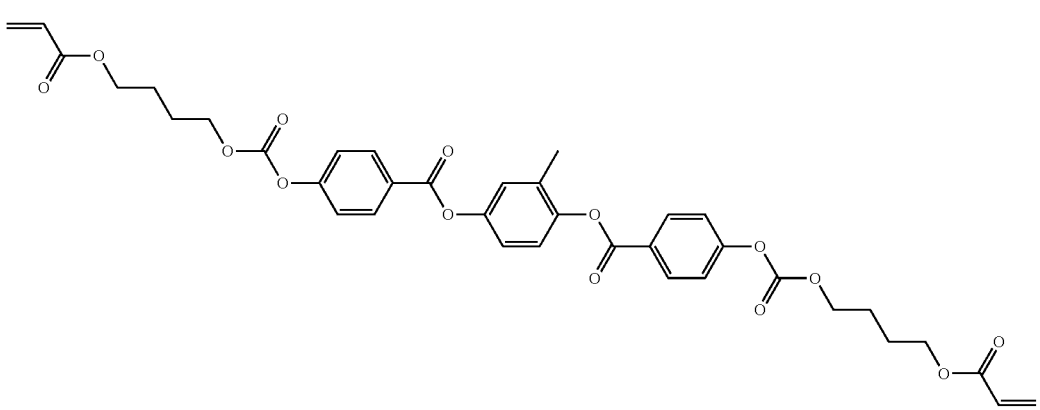
B02
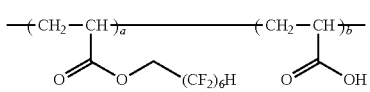
B03
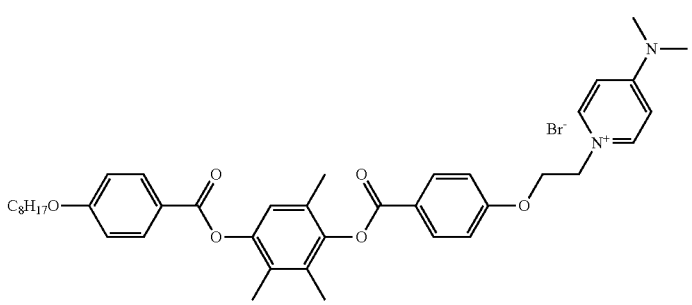
S01
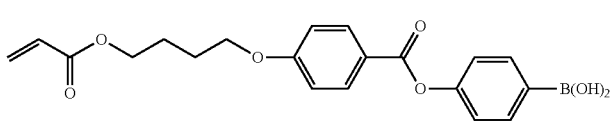
S02

<Bonding of Positive A-Plate A-0 (1) and Positive C-Plate 1-1>

Using an adhesive (SK2057 manufactured by Soken Chemical & Engineering Co., Ltd.), the surface of the liquid crystal layer of the positive C-plate 1-1 was bonded to the surface of the liquid crystal layer of the positive A-plate A-0 (1) prepared above. After the bonding, the polyethylene terephthalate for a temporary support was peeled to prepare an optical film 1.

<Preparation of Polarizing Plate 1-1>

The support surface of a cellulose triacetate film TD80UL (manufactured by Fujifilm Corporation) was subjected to an alkali saponification treatment. Specifically, the support was immersed in a 1.5 N aqueous sodium hydroxide solution at 55° C. for 2 minutes, washed in a water bath at room temperature, and neutralized with 0.1 N sulfuric acid at 30° C. Then, the support was washed again in a water bath at room temperature and further dried with hot air at 100° C.

A polarizing film was prepared by the following procedure. A roll-shaped polyvinyl alcohol film having a thickness of 80 μm was continuously stretched in the MD (transporting) direction to a length 5 times the original length in an aqueous iodine solution, and dried to form a polarizing film having a thickness of 20 μm.

The support (triacetyl cellulose film) of the optical film 1 prepared above was bonded to one side of the polarizing film, and the cellulose triacetate film which had been subjected to an alkali saponification treatment was bonded to the other side of the polarizing film to insert the polarizing film therein. In such a way, a polarizing plate 1-1 having the optical film 1 and the cellulose triacetate film TD80UL as a protective film of the polarizing film was prepared. For the bonding, an aqueous polyvinyl alcohol-based adhesive solution was used. In addition, the bonding was carried out such that the slow axis of the positive A-plate A-0 (1) was orthogonal to the absorption axis of the polarizing film.

Example 1-2

<Preparation of Polarizing Plate 1-2>

The support surface of a cellulose triacetate film TD80UL (manufactured by Fujifilm Corporation) was subjected to an alkali saponification treatment. Specifically, the support was immersed in a 1.5 N aqueous sodium hydroxide solution at 55° C. for 2 minutes, washed in a water bath at room temperature, and neutralized with 0.1 N sulfuric acid at 30° C. Then, the support was washed again in a water bath at room temperature and further dried with hot air at 100° C.

A roll-shaped polyvinyl alcohol film having a thickness of 80 μm was continuously stretched in the MD direction to a length 5 times the original length in an aqueous iodine solution by the same procedure as in Example 1-1, and dried to form a polarizing film having a thickness of 20 μm.

The side of the positive C-plate of the optical film 1 was bonded to one side of the polarizing film prepared above, and the cellulose triacetate film which had been subjected to an alkali saponification treatment was bonded to the other side of the polarizing film. Thus, a polarizing plate 1-2 having the optical film 1 and the cellulose triacetate film TD80UL as a protective film of the polarizing film was prepared. For the bonding, an aqueous polyvinyl alcohol-based adhesive solution was used. In addition, the bonding was carried out such that the slow axis of the positive A-plate A-0 (1) was parallel to the absorption axis of the polarizing film.

Example 2

<Preparation of Positive A-Plate A-0 (2)>

The following coating liquid 2 for a positive A-plate was prepared.

| Composition of coating liquid 2 for forming positive A-plate A-0 | |
|---|---|
| Reverse wavelength dispersion liquid crystal compound R-2 | 100 parts by mass |
| Photopolymerization initiator (Irgacure 819, manufactured by BASF Japan Ltd.) | 3.0 parts by mass |
| Fluorine-containing compound A | 0.8 parts by mass |
| Cross-linkable polymer O-2 | 0.3 parts by mass |
| Chloroform | 588 parts by mass |

Reverse wavelength dispersion liquid crystal compound R-2: Specific Example II-2-2

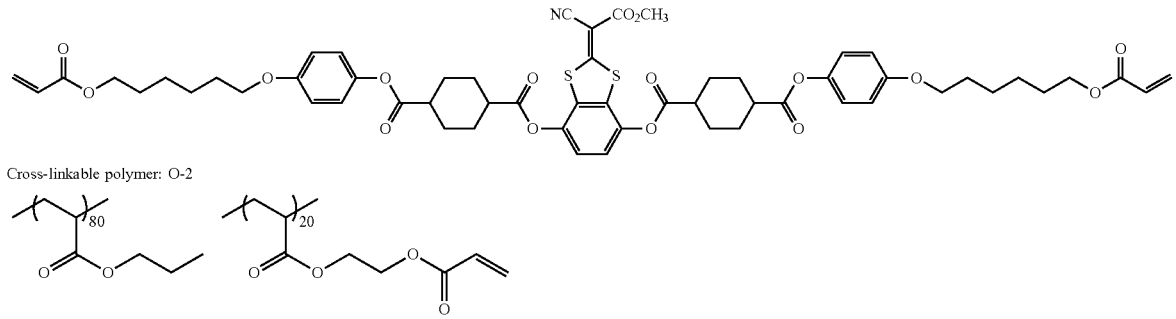

Cross-linkable polymer: O-2

For the cross-linkable polymer O-2, Tg=10° C.

According to the same procedure as in Example 1-1, the triacetyl cellulose film having the alignment film 1 on the surface was prepared and the alignment film 1 was subjected to a rubbing treatment. The coating liquid 2 for forming a positive A-plate A-0 was applied onto the rubbing-treated surface, using a bar coater, heated and aged at a film surface temperature of 150° C. for 60 seconds, and then cooled to 70° C. Thereafter, the film was irradiated with ultraviolet rays at 1000 mJ/cm² using an air-cooled metal halide lamp (manufactured by Eye Graphics Co., Ltd.) under an atmospheric air to fix the alignment state, thereby forming a positive A-plate A-0 (2). For the positive A-plate A-0 (2) thus formed, the slow axis direction was parallel to the rubbing direction (the reverse wavelength dispersion liquid crystal compound was aligned to be parallel to the rubbing direction). The dependence of Re on light incident angle and the tilt angle of the optical axis were measured using an automatic birefringence meter (KOBRA-21ADH, manufactured by Oji Scientific Instruments), and it was found that the reverse wavelength dispersion liquid crystal compound was homogeneously aligned with an Re of 130 nm and an Rth of 65 nm at a wavelength of 550 nm, an Re(450)/Re(550) of 0.85, an Re(650)/Re(550) of 1.01, and a tilt angle of the optical axis of 0°.

<Preparation of Positive C-Plate 1-1>

The positive A-plate A-0 (2) prepared above was directly subjected to a rubbing treatment in the same rubbing direction as that with the alignment film 1. Then, the coating liquid for forming a positive C-plate, used in Example 1-1, was coated thereonto, and heated and aged at 60° C. for 60 seconds. Thereafter, the film was irradiated with ultraviolet rays at 1000 mJ/cm$^2$ using an air-cooled metal halide lamp (manufactured by Eye Graphics Co., Ltd.) under an atmospheric air to fix the alignment state, thereby forming a positive C-plate 1-1. It was found that polymerizable rod-shaped liquid crystal compound was homeotropically aligned with an Re of 0 nm and an Rth of -110 nm at a wavelength of 550 nm, and a tilt angle of the optical axis of 90°. At this time, the film thickness was about 1.2 μm.

<Preparation of Polarizing Plate 2>

The same operation as in Example 1-1 was carried out, except that a laminate of the positive A-plate A-0 (2) and the positive C-plate 1-1, each prepared above, was used instead of the optical film 1, to prepare a polarizing plate 2.

Example 3

<Preparation of Photo-Alignment Film 3-Bonded Polarizing Plate>

The support surface of a cellulose triacetate film TD80UL (manufactured by Fujifilm Corporation) was subjected to an alkali saponification treatment. Specifically, the support was immersed in a 1.5 N aqueous sodium hydroxide solution at 55° C. for 2 minutes, washed in a water bath at room temperature, and neutralized with 0.1 N sulfuric acid at 30° C. Then, the support was washed again in a water bath at room temperature and further dried with hot air at 100° C.

By the same procedure as in Example 1-1, a roll-shaped polyvinyl alcohol film having a thickness of 80 μm was continuously stretched in the MD direction to a length 5 times the original length in an aqueous iodine solution, and dried to form a polarizing film having a thickness of 20 μm. A polarizing plate, in which a cellulose triacetate film TD80UL as a protective film, subjected to the alkali saponification treatment, was bonded to one side thereof was prepared. A coating liquid for forming a photo-alignment film 3 having the following composition was applied onto the other surface of the polarizing plate by a wire bar, followed by drying with hot air at 60° C. for 60 seconds and further drying with hot air at 100° C. for 120 seconds, to prepare a photo-alignment film 3-bonded polarizing plate.

| Composition of coating liquid for forming photo-alignment film 3 | |
|---|---|
| Material P-1 for photo-alignment below | 1.0 part by mass |
| Butoxyethanol | 33 parts by mass |
| Propylene glycol monomethyl ether | 33 parts by mass |
| Water | 33 parts by mass |

Material P-1 for phoso-alignment

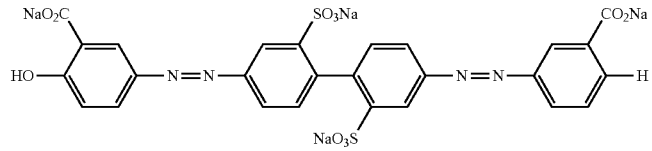

<Preparation of Positive A-Plate A-0 (3)-Bonded Polarizing Plate>

Subsequently, the following coating liquid 3 for forming a positive A-plate A-0 was prepared.

| Composition of coating liquid 3 for forming a positive A-plate A-0 | |
|---|---|
| Reverse wavelength dispersion liquid crystal compound R-3 | 100 parts by mass |
| Photopolymerization initiator (Irgacure 819, manufactured by BASF Japan Ltd.) | 3.0 parts by mass |
| Fluorine-containing compound A | 0.8 parts by mass |
| Cross-linkable polymer O-2 | 0.3 parts by mass |
| Chloroform | 588 parts by mass |

Reverse wavelength dispersion liquid crystal compound R-3: Specific Example II-3-9

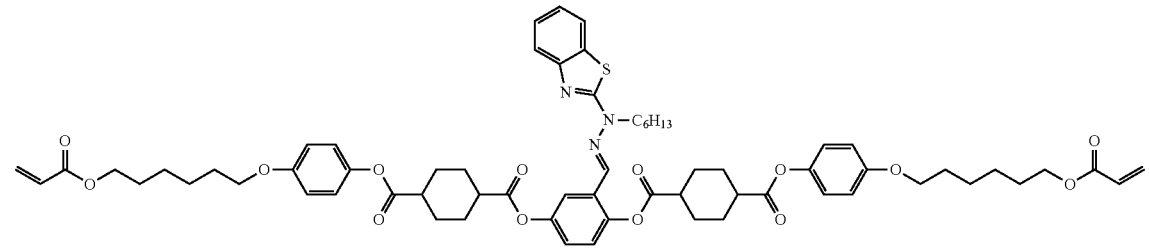

The prepared photo-alignment film 3-bonded polarizing plate was irradiated with ultraviolet rays, using an air-cooled metal halide lamp (manufactured by Eye Graphics Co., Ltd.) at 160 mW/cm under an atmospheric air. At this time, exposure was performed while setting a wire grid polarizer (ProFlux PPL02, manufactured by Moxtek Inc.) to be parallel to the surface of the photo-alignment film 3 and the transmission axis of the wire grid polarizer to be parallel to the absorption axis of the photo-alignment film 3-bonded polarizing plate, and then a photo-alignment treatment was carried out. The light intensity of the ultraviolet rays used herein was set to 100 mW/cm$^2$ in a UV-A region (integrated value at a wavelength of 380 nm to 320 nm), and the irradiation dose was set to 1000 mJ/cm$^2$ in the UV-A region.

Subsequently, the coating liquid 3 for forming a positive A-plate A-0 was applied onto the photo-alignment treated surface, using a bar coater, heated and aged at a film surface temperature of 100° C. for 60 seconds, and then cooled to 70° C. Thereafter, the film was irradiated with ultraviolet rays at 1000 mJ/cm$^2$ using an air-cooled metal halide lamp (manufactured by Eye Graphics Co., Ltd.) under an atmospheric air to fix the alignment state, thereby forming a positive A-plate A-0 (3). For the positive A-plate A-0 (3) thus formed, the slow axis direction was orthogonal to the polarizing irradiation direction (that is, orthogonal to the absorption axis of the polarizing plate) (the reverse wavelength dispersion liquid crystal compound was aligned to be orthogonal to the polarizing irradiation direction). The dependence of Re on light incident angle and the tilt angle of the optical axis were measured using an automatic birefringence meter (KOBRA-21ADH, manufactured by Oji Scientific Instruments), and it was found that the reverse wavelength dispersion liquid crystal compound was homogeneously aligned with an Re of 130 nm and an Rth of 65 nm at a wavelength of 550 nm, an Re(450)/Re(550) of 0.83, an Re(650)/Re(550) of 1.05, and a tilt angle of the optical axis of 0°.

<Preparation of Polarizing Plate 3>

The coating liquid 1-1 for forming a positive C-plate of Example 1-1 was coated directly onto the positive A-plate A-0 (3), heated and aged at 60° C. for 60 seconds, and then irradiated with ultraviolet rays at 1000 mJ/cm$^2$ using an air-cooled metal halide lamp (manufactured by Eye Graphics Co., Ltd.) under an atmospheric air to fix the alignment state, thereby preparing a positive C-plate 1-1. It was confirmed that the polymerizable rod-shaped liquid crystal compound was homeotropically aligned with a tilt angle of the optical axis of 90°. Further, only the retardation of the positive C-plate was measured using AxoScan (manufactured by Axometrics, Inc.), and it was found that the Re was 0 nm and the Rth was 110 nm at a wavelength of 550 nm. By this, a polarizing plate 3, in which the positive A-plate A-0 (3) and the positive C-plate 3 were directly laminated on the polarizing plate, was prepared.

Example 4

<Preparation of Photo-Alignment Film 4>

The coating liquid for forming a photo-alignment film 3 prepared in Example 3 was coated with a wire bar, using the saponification-treated triacetyl cellulose film, by the same procedure as in Example 1-1. The film was dried with hot air at 60° C. for 60 seconds and further dried with hot air at 100° C. for 120 seconds to form a photo-alignment film 4-bonded cellulose triacetate film.

<Preparation of Positive A-Plate A-0 (4)>

Subsequently, the following coating liquid 4 for forming a positive A-plate A-0 was prepared.

| Composition of coating liquid 4 for forming positive A-plate A-0 | |
|---|---|
| Reverse wavelength dispersion liquid crystal compound R-4 | 100 parts by mass |
| Photopolymerization initiator (Irgacure 819, manufactured by BASF Japan Ltd.) | 3.0 parts by mass |
| Fluorine-containing compound A | 0.8 parts by mass |
| Cross-linkable polymer O-2 | 0.3 parts by mass |
| Chloroform | 588 parts by mass |

Reverse wavelength dispersion liquid crystal compound R-4: Specific Example II-4-3

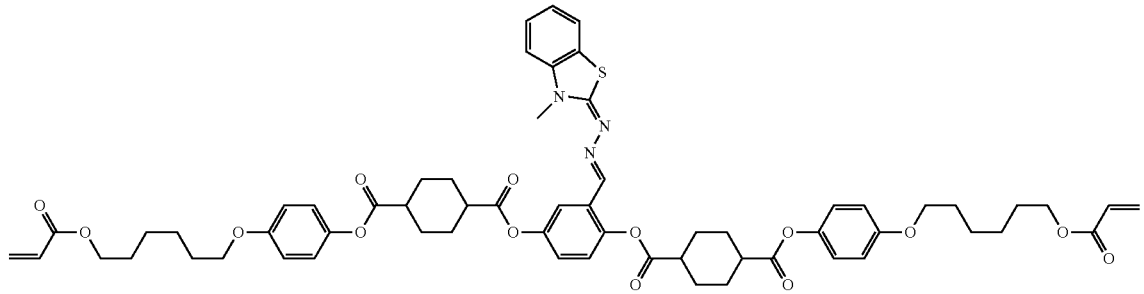 [SMILES: C=CC(=O)OCCCCCCOc1ccc(OC(=O)C2CCC(C(=O)Oc3ccc(OC(=O)C4CCC(C(=O)Oc5ccc(OCCCCCCOC(=O)C=C)cc5)CC4)c(/C=N/N=c4/sc5ccccc5n4C)c3)CC2)cc1]

The prepared photo-alignment film 4-bonded cellulose triacetate film was irradiated with ultraviolet rays, using an air-cooled metal halide lamp (manufactured by Eye Graphics Co., Ltd.) at 160 W/cm under an atmospheric air. At this time, exposure was performed while setting a wire grid polarizer (ProFlux PPL02, manufactured by Moxtek Inc.) to be parallel to the surface of the photo-alignment film 4. The light intensity of the ultraviolet rays used herein was set to 100 mW/cm$^2$ in a UV-A region (integrated value at a wavelength of 380 nm to 320 nm), and the irradiation dose was set to 1000 mJ/cm$^2$ in the UV-A region.

Subsequently, the coating liquid 4 for forming a positive A-plate A-0 was applied onto the photo-alignment treated surface, using a bar coater, heated and aged at a film surface temperature of 115° C. for 60 seconds, and then cooled to 70° C. Thereafter, the film was irradiated with ultraviolet rays at 1000 mJ/cm$^2$ using an air-cooled metal halide lamp (manufactured by Eye Graphics Co., Ltd.) under an atmospheric air to fix the alignment state, thereby forming a positive A-plate A-0 (4). For the positive A-plate A-0 (4) thus formed, the slow axis direction was orthogonal to the polarizing irradiation direction (the reverse wavelength dispersion liquid crystal compound R-4 was aligned to be orthogonal to the polarizing irradiation direction). The dependence of Re on light incident angle and the tilt angle of the optical axis were measured using an automatic birefringence meter (KOBRA-21ADH, manufactured by Oji Scientific Instruments), and it was found that the reverse wavelength dispersion liquid crystal compound was homogeneously aligned with an Re of 130 nm and an Rth of 65 nm at a wavelength of 550 nm, an Re(450)/Re(550) of 0.88, an Re(650)/Re(550) of 1.00, and a tilt angle of the optical axis of 0°.

<Preparation of Positive C-Plate 4>

The coating liquid 1-1 for a positive C-plate of Example 1 was rubbed and then directly applied onto the positive A-plate A-0 (4) in the direction orthogonal to the polarizing irradiation direction above, heated and aged at 60° C. for 60 seconds, and then irradiated with ultraviolet rays at 1000 mJ/cm² using an air-cooled metal halide lamp (manufactured by Eye Graphics Co., Ltd.) under an atmospheric air to fix the alignment state, thereby preparing a positive C-plate 4. It was found that the polymerizable rod-shaped liquid crystal compound was homeotropically aligned with an Re of 0 nm and an Rth of 110 nm at a wavelength of 550 nm, and a tilt angle of the optical axis of 90°.

<Preparation of Polarizing Plate 4>

By the same operation as in Example 1-1 except that a laminate of the positive A-plate A-0 (4) and the positive C-plate 4, each prepared above, was used instead of the optical film 1, a polarizing plate 4 was prepared.

Reference Example 1

<Preparation of Polarizing Plate 0>

The support surface of a cellulose triacetate film TD80UL (manufactured by Fujifilm Corporation) was subjected to an alkali saponification treatment. Specifically, the support was immersed in a 1.5 N aqueous sodium hydroxide solution at 55° C. for 2 minutes, washed in a water bath at room temperature, and neutralized with 0.1 N sulfuric acid at 30° C. After the neutralization, the support was washed again in a water bath at room temperature and further dried with hot air at 100° C.

A polarizing film was prepared by the following procedure. A roll-shaped polyvinyl alcohol film having a thickness of 80 μm was continuously stretched to a length 5 times the original length in an aqueous iodine solution, and dried to form a polarizing film having a thickness of 20 μm.

The triacetyl cellulose film ("Z-TAC") prepared by the same procedure as in Example 1-1 was bonded to one side of the polarizing film, and the cellulose triacetate film which had been subjected to an alkali saponification treatment was bonded to the other side of the polarizing film to insert the polarizing film therein. In such a way, a polarizing plate 0 having the triacetyl cellulose film and the cellulose triacetate film (TD80UL) as a protective film of the polarizing film was prepared. For the bonding, an aqueous polyvinyl alcohol-based adhesive solution was used.

Comparative Example 1

<Preparation of Positive A-Plate A-0 (5)>

The following coating liquid 5 for forming a positive A-plate A-0 was prepared.

| Composition of coating liquid 5 for forming positive A-plate A-0 | |
|---|---|
| Forward wavelength dispersion liquid crystal compound N-1 | 40 parts by mass |
| Forward wavelength dispersion liquid crystal compound N-2 | 60 parts by mass |
| Photopolymerization initiator (Irgacure 819, manufactured by BASF Japan Ltd.) | 3.0 parts by mass |
| Fluoring-containing compound A | 0.8 parts by mass |
| Chloroform | 588 parts by mass |

Forward wavelength dispersion liquid crystal compound N-1;
Liquid crystal compound described in Reference Example 2 of JP4592005B

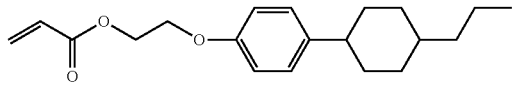

Forward wavelength dispersion liquid crystal compound N-2; "Paliocolor LC242 (manufactured by BASF Japan, Ltd.)" described in Reference Example 2 of JP4592005B According to the same procedure as in Example 1-1, an acetyl cellulose transparent support having the alignment film 1 on the surface thereof was prepared, and the alignment film 1 was subjected to a rubbing treatment. The coating liquid 5 for forming a positive A-plate A-0 was applied onto the rubbing-treated surface, using a bar coater, heated and aged at a film surface temperature of 90° C. for 60 seconds, and then cooled to 70° C. Thereafter, the film was irradiated with ultraviolet rays at 1000 mJ/cm² using an air-cooled metal halide lamp (manufactured by Eye Graphics Co., Ltd.) under an atmospheric air to fix the alignment state, thereby forming a positive A-plate A-0 (5). For the positive A-plate A-0 (5) thus formed, the slow axis direction was parallel to the rubbing direction (the forward wavelength dispersion liquid crystal compound was aligned to be parallel to the rubbing direction). The dependence of Re on light incident angle and the tilt angle of the optical axis were measured using an automatic birefringence meter (KOBRA-21ADH, manufactured by Oji Scientific Instruments), and it was found that the forward wavelength dispersion liquid crystal compound was homogeneously aligned with an Re of 130 nm and an Rth of 65 nm at a wavelength of 550 nm, an Re(450)/Re(550) of 1.09, an Re(650)/Re(550) of 0.95, and a tilt angle of the optical axis of 0°. At this time, the film thickness was about 1.1 μm.

87

<Bonding of Positive A-Plate A-0 (5) and Positive C-Plate 5>

Using an adhesive (SK2057 manufactured by Soken Chemical & Engineering Co., Ltd.), the surface of the liquid crystal layer of the positive C-plate 5 prepared by the same procedure as in Example 1-1 was bonded to the surface of the liquid crystal layer of the positive A-plate A-0 (5) prepared above. After the bonding, the polyethylene terephthalate for a temporary support was peeled to prepare an optical film 5.

<Preparation of Polarizing Plate 5>

The support surface of a cellulose triacetate film TD80UL (manufactured by Fujifilm Corporation) was subjected to an alkali saponification treatment. Specifically, the support was immersed in a 1.5 N aqueous sodium hydroxide solution at 55° C. for 2 minutes, washed in a water bath at room temperature, and neutralized with 0.1 N sulfuric acid at 30° C. After the neutralization, the support was washed again in a water bath at room temperature and further dried with hot air at 100° C.

A roll-shaped polyvinyl alcohol film having a thickness of 80 μm was continuously stretched to a length 5 times the original length in an aqueous iodine solution by the same procedure as in Example 1-1, and dried to form a polarizing film having a thickness of 20 μm.

The support (triacetyl cellulose film) of the optical film 5 prepared above was bonded to one side of the polarizing film, and the cellulose triacetate film which had been subjected to an alkali saponification treatment was bonded to the other side of the polarizing film to insert the polarizing film therein. In such a way, a polarizing plate 5 having the optical film 5 and the cellulose triacetate film TD80UL as a protective film of the polarizing film was prepared. For the bonding, an aqueous polyvinyl alcohol-based adhesive solution was used. In addition, the bonding was carried out such that the slow axis of the positive A-plate A-0 (5) was orthogonal to the absorption axis of the polarizing film.

Example 5

<Preparation of Photo-Alignment Film 5-Bonded Polarizing Plate>

By the same approach as in Example 3, a polarizing plate having a cellulose triacetate film TD80UL (manufactured by Fujifilm Corporation) as a protective film bonded on one surface was prepared.

Furthermore, a coating liquid 5 for a photo-alignment film was prepared with reference to the description of Example 3 in JP2012-155308A, and then applied onto the other surface of the polarizing film with a wire bar. The film was dried with hot air at 60° C. for 60 seconds to prepare a photo-alignment film 5-bonded polarizing plate.

<Preparation of Positive A-Plate A-0 (6)-Bonded Polarizing Plate>

Subsequently, the following coating liquid 6 for forming a positive A-plate A-0 was prepared.

| Composition of coating liquid 6 for forming positive A-plate A-0 | |
|---|---|
| Compound A-1 below | 20.00 parts by mass |
| Liquid crystal compound L-1 below | 40.00 parts by mass |
| Liquid crystal compound L-2 below | 40.00 parts by mass |
| Polymerization initiator (IRGACURE 184, manufactured by BASF Japan Ltd.) | 3.00 parts by mass |
| Polymerization initiator (IRGACURE OXE-01, manufactured by BASF Japan Ltd.) | 3.00 parts by mass |
| Cross-linkable polymer O-2 | 0.30 parts by mass |
| Leveling agent (compound T-1 below) | 0.20 parts by mass |
| Cyclopentanone | 423.11 parts by mass |

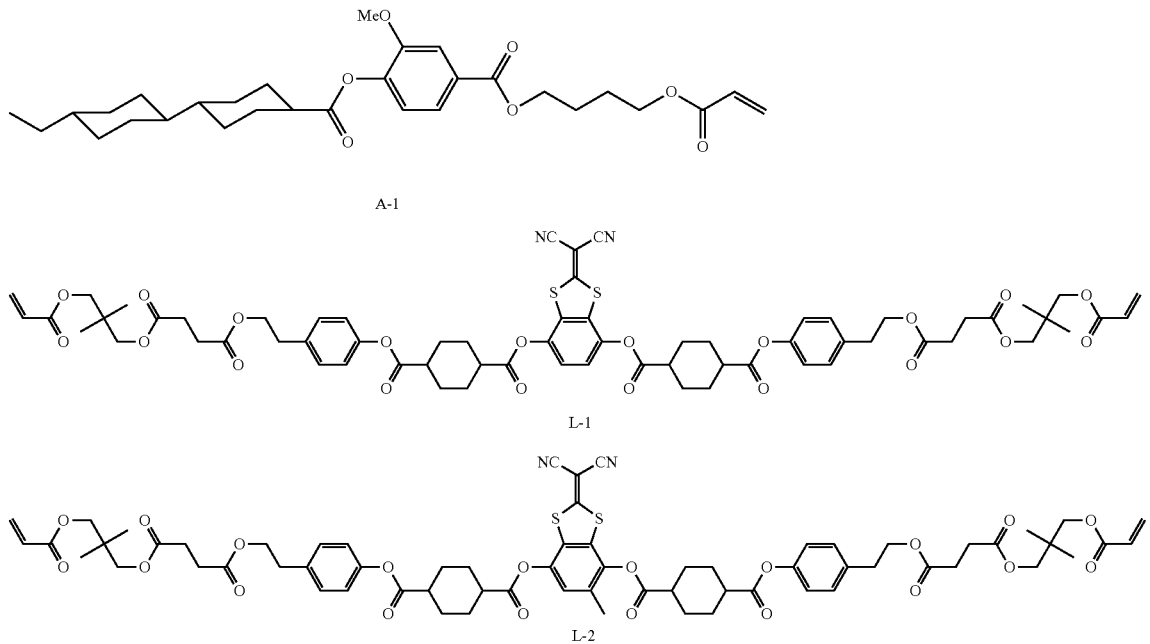

Composition of coating liquid 6 for forming positive A-plate A-0

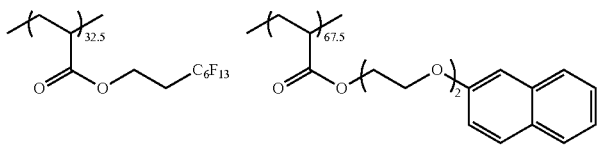

T-1

The prepared photo-alignment film 5-bonded polarizing plate was irradiated with ultraviolet rays, using an ultra-high pressure mercury lamp at 750 W/cm under an atmospheric air. At this time, exposure was performed while setting a wire grid polarizer (ProFlux PPL02, manufactured by Moxtek Inc.) to be parallel to the surface of the photo-alignment film 5 and the transmission axis of the wire grid polarizer to be orthogonal to the absorption axis of the photo-alignment film 5-bonded polarizing plate 5, and then a photo-alignment treatment was carried out. The light intensity of the ultraviolet rays used herein was set to 500 J/cm$^2$ in a UV-A region (integrated value at a wavelength of 380 nm to 320 nm).

Subsequently, the coating liquid 6 for forming a positive A-plate A-0 was applied onto the photo-alignment treated surface, using a bar coater, heated and aged at a film surface temperature of 80° C. for 20 seconds, and then cooled to 55° C. Thereafter, the film was irradiated with ultraviolet rays at 1000 mJ/cm$^2$ using an air-cooled metal halide lamp (manufactured by Eye Graphics Co., Ltd.) under an atmospheric air to fix the alignment state, thereby forming a positive A-plate A-0 (6). For the positive A-plate A-0 (6) thus formed, the slow axis direction was parallel to the polarizing irradiation direction (that is, orthogonal to the absorption axis of the polarizing plate) (the reverse wavelength dispersion liquid crystal compound was aligned to be parallel to the polarizing irradiation direction). The dependence of Re on light incident angle and the tilt angle of the optical axis were measured using an automatic birefringence meter (KOBRA-21ADH, manufactured by Oji Scientific Instruments), and it was found that the reverse wavelength dispersion liquid crystal compound was homogeneously aligned with an Re of 145 nm and an Rth of 73 nm at a wavelength of 550 nm, an Re(450)/Re(550) of 0.90, an Re(650)/Re(550) of 1.01, and a tilt angle of the optical axis of 0°. In addition, the smectic-nematic phase transition temperature of the coating liquid 5 for forming a positive A-plate A-0 was 60° C.

<Preparation of Polarizing Plate 5>

The surface of the positive A-plate A-0 (6) was rubbed in the direction orthogonal to the polarizing irradiation direction as described above, and then the coating liquid 1-1 for forming a positive C-plate of Example 1-1 was directly coated thereon, heated and aged at 60° C. for 60 seconds, and then irradiated with ultraviolet rays at 1000 mJ/cm$^2$ using an air-cooled metal halide lamp (manufactured by Eye Graphics Co., Ltd.) under an atmospheric air to fix the alignment state, thereby preparing a positive C-plate 1-1. It was confirmed that the polymerizable rod-shaped liquid crystal compound was homeotropically aligned with a tilt angle of the optical axis of 90°. Further, only the retardation of the positive C-plate was measured using AxoScan (manufactured by Axometrics, Inc.), and it was found that the Re was 0 nm and the Rth was 110 nm at a wavelength of 550 nm. By this, a polarizing plate 5 in which the positive A-plate A-0 (6) and the positive C-plate 6 were directly laminated on the polarizing plate was prepared.

Examples 6 to 8

Polarizing plates 6 to 8 were prepared by the same procedure as in Example 5, except that the cross-linkable polymer O-2 of the coating liquid 6 for forming a positive A-plate A-0 was changed to each of the following cross-linkable polymers O-6 to O-8 to afford coating liquids 7 to 9 for forming a positive A-plate A-0 in the production of the polarizing plate of Example 5.

Furthermore, in Example 8, the Tg of the cross-linkable polymer O-8 was higher than the Tg of the cross-linkable polymers O-2 (10° C.), O-6 (13° C.), and O-7 (15° C.) used in Examples 3, 4, 6, and 7 at 20° C.; the alignment regulation was hardly afforded by rubbing; the alignment properties of the positive C-plate 9 were deteriorated; and the Rth was decreased to −70 nm.

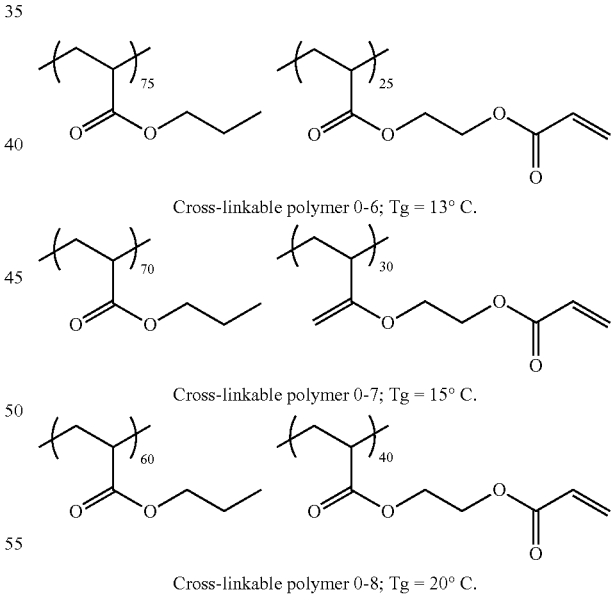

Cross-linkable polymer O-6; Tg = 13° C.

Cross-linkable polymer O-7; Tg = 15° C.

Cross-linkable polymer O-8; Tg = 20° C.

Example 9

<Preparation of Photo-Alignment Film 10-Bonded Polarizing Plate>

By the same approach as in Example 3, a polarizing plate having a cellulose triacetate film TD80UL (manufactured by Fujifilm Corporation) as a protective film bonded on one surface was prepared.

Furthermore, a coating liquid 10 for a photo-alignment film was prepared with reference to the description of Example 3 of JP2012-155308A, and then applied onto the other surface of the polarizing film with a wire bar. The film was dried with hot air at 60° C. for 60 seconds to prepare a photo-alignment film 10-bonded polarizing plate.

<Preparation of Positive A-Plate A-0 (10)-Bonded Polarizing Plate>

Subsequently, the following coating liquid 10 for forming a positive A-plate A-0 was prepared.

| Composition of coating liquid 10 for forming positive A-plate A-0 | |
|---|---|
| Compound A-1 below | 20.0 parts by mass |
| Liquid crystal compound L-1 below | 40.0 parts by mass |
| Liquid crystal compound L-2 below | 40.0 parts by mass |
| Polymerization initiator (IRGACURE 184, manufactured by BASF Japan Ltd.) | 3.00 parts by mass |
| Polymerization initiator (IRGACURE OXE-O1, manufactured by BASF Japan Ltd.) | 3.00 parts by mass |
| Leveling agent (compound T-1 below) | 0.20 parts by mass |
| Cyclopentanone | 423.11 parts by mass |

The prepared photo-alignment film 10-bonded polarizing plate was irradiated with ultraviolet rays, using an ultra-high pressure mercury lamp at 750 W/cm under an atmospheric air. At this time, exposure was performed while setting a wire grid polarizer (ProFlux PPL02, manufactured by Moxtek Inc.) to be parallel to the surface of the photo-alignment film 10 and the transmission axis of the wire grid polarizer to be orthogonal to the absorption axis of the photo-alignment film 10-bonded polarizing plate, and then a photo-alignment treatment was carried out. The light intensity of the ultraviolet rays used herein was set to 500 J/cm² in a UV-A region (integrated value at a wavelength of 380 nm to 320 nm).

Subsequently, the coating liquid 10 for forming a positive A-plate A-0 was applied onto the photo-alignment treated surface, using a bar coater, heated and aged at a film surface temperature of 80° C. for 20 seconds, and then cooled to 55° C. Thereafter, the film was irradiated with ultraviolet rays at 1000 mJ/cm² using an air-cooled metal halide lamp (manufactured by Eye Graphics Co., Ltd.) under an atmospheric air to fix the alignment state, thereby forming a positive A-plate A-0 (10). For the positive A-plate A-0 (10) thus formed, the slow axis direction was parallel to the polarizing irradiation direction (that is, orthogonal to the absorption axis of the polarizing plate) (the reverse wavelength dispersion liquid crystal compound was aligned to be parallel to the polarizing irradiation direction). The dependence of Re on light incident angle and the tilt angle of the optical axis were measured using an automatic birefringence meter (KOBRA-21ADH, manufactured by Oji Scientific Instruments), and it was found that the reverse wavelength dispersion liquid crystal compound was homogeneously aligned with an Re of 145 nm and an Rth of 73 nm at a wavelength of 550 nm, an Re(450)/Re(550) of 0.90, an Re(650)/Re(550) of 1.01, and a tilt angle of the optical axis of 0°. In addition, the smectic-nematic phase transition temperature of the coating liquid 10 for forming a positive A-plate A-0 was 60° C.

<Preparation of Polarizing Plate 9>

The following coating liquid 10 for forming a positive C-plate was directly applied onto the surface of the positive A-plate A-0 (10), heated and aged at 40° C. for 60 seconds, and then irradiated with ultraviolet rays at 1000 mJ/cm² using an air-cooled metal halide lamp (manufactured by Eye Graphics Co., Ltd.) under an atmospheric air to fix the alignment state, thereby preparing a positive C-plate 10. It was confirmed that the polymerizable rod-shaped liquid crystal compound was homeotropically aligned with a tilt angle of the optical axis of 90°. Further, only the retardation of the positive C-plate was measured using AxoScan (manufactured by Axometrics, Inc.), and it was found that the Re was 0 nm and the Rth was 110 nm at a wavelength of 550 nm. By this, a polarizing plate 9 in which the positive A-plate A-0 (10) and the positive C-plate 10 were directly laminated on the polarizing plate was prepared. In addition, the smectic-nematic phase transition temperature of the coating liquid 10 for forming a positive C-plate 9 was 50° C.

| Composition of coating liquid 10 for forming positive C-plate 10 | |
|---|---|
| Liquid crystal compound B-1 | 50.00 parts by mass |
| Liquid crystal compound L-1 | 32.90 parts by mass |
| Liquid crystal compound L-2 | 17.10 parts by mass |
| Polymerization initiator (IRGACURE 184, manufactured by BASF Japan Ltd.) | 3.00 parts by mass |
| Polymerization initiator (IRGACURE OXE-01, manufactured by BASF Japan Ltd.) | 3.00 parts by mass |
| Ethylene oxide-modified trimethylol propane triacrylate (V#360, manufactured by Osaka Organic Chemical Industry, Ltd.) | 8.00 parts by mass |
| Leveling agent (compound T-10-1 below) | 0.40 parts by mass |
| Leveling agent (compound T-10-2 below) | 0.20 parts by mass |
| Cyclopentanone | 223.11 parts by mass |

Leveling agent T-10-1

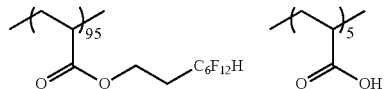

| Composition of coating liquid 10 for forming positive C-plate 10 |
|---|
| Leveling agent T-10-2 |

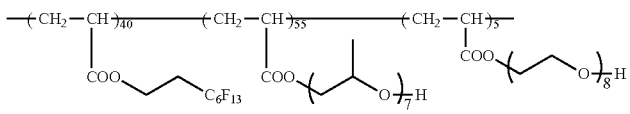

[Preparation of Liquid Crystal Display Apparatus]

Polarizing plates were removed from the visual recognition side of the liquid crystal cell of iPad (using a photo-alignment film, manufactured by Apple, Inc. trade mark), and used as a liquid crystal cell in an IPS mode using the photo-alignment film. In addition, the pre-tilt angle of the cell liquid crystal was 0°.

The liquid crystal display apparatuses of Examples 1 to 4, Comparative Example 1, and Reference Example 1 were each prepared by bonding the polarizing plate including the optical film prepared above to the liquid crystal cell through the surface of the positive C-plate instead of the removed polarizing plate. Further, the polarizing plate including the optical film prepared in Example 1-1 was bonded to the liquid crystal cell through the surface of the positive A-plate. At this time, in view of a direction orthogonal to the surface of the substrate of the liquid crystal cell, the bonding was performed in the direction such that the absorption axis of the polarizing plate was orthogonal to the optical axis of the liquid crystal layer in the liquid crystal cell. For the bonding, an adhesive (SK2057, manufactured by Soken Chemical & Engineering Co., Ltd.) was used.

<Evaluation 1>

The display performance was measured using a commercially available device for measuring a liquid crystal viewing angle and chromatic characteristics, Ezcom (manufactured by Eldim S. A.), and a backlight of a commercially available liquid crystal display apparatus, iPad (manufactured by Apple, Inc., trademark). The measurements were carried out by placing a liquid crystal cell having a polarizing plate bonded thereto such that the optical film prepared above was on the opposite side to the backlight. The results are shown in Table 1 below.

(Panel Contrast)

For a panel in white display, a luminance (Yw) in the vertical direction was measured, and for a panel in black display, a luminance (Yb) in the vertical direction was measured. Thus, the contrast ratio (Yw/Yb) in the vertical direction with respect to the panel was calculated, and the front surface was taken as a contrast and evaluated according to the following criteria.

A: The front surface contrast is 95% or more with respect to that in Reference Example 1.
B: The front surface contrast is 85% or more and less than 95% with respect to that in Reference Example 1.
C: The front surface contrast is 75% or more and less than 85% with respect to that in Reference Example 1.
D: The front surface contrast is less than 75% with respect to that in Reference Example 1.

(Light Leakage in Inclination Direction)

An average highest value (luminance max) of black luminance (Cd/m$^2$) in each of an upward direction (an azimuth angle of 0° to 180°, an interval of 5°) and a downward direction (an azimuth angle of 180° to 360°, an interval of 5°) was shown.

A smaller numeral value indicates less light leakage in black display, and evaluation was carried out in the following four steps, A to D.

A: 1 or less
B: More than 1 and 2 or less
C: More than 2 and 5 or less
D: More than 10

TABLE 1

|  | Positive A-plate A-0 | | | | Positive C-plate | | | Light leakage in |
|---|---|---|---|---|---|---|---|---|
|  | Tilt angle | Re(550) (nm) | Re(450)/ Re(550) | Re(650)/ Re(550) | Tilt angle | Rth(550) (nm) | Panel contrast | inclination direction |
| Example 1-1 | 0.4° | 130 | 0.84 | 1.02 | 90° | −110 | C | A |
| Example 1-2 | 0.4° | 130 | 0.84 | 1.02 | 90° | −110 | C | A |
| Example 2 | 0° | 130 | 0.85 | 1.01 | 90° | −110 | B | A |
| Example 3 | 0° | 130 | 0.83 | 1.05 | 90° | −110 | A | A |
| Example 4 | 0° | 130 | 0.88 | 1.00 | 90° | −110 | B | B |
| Comparative Example 1 | 0° | 130 | 1.09 | 0.95 | 90° | −110 | D | D |
| Reference Example 1 | — | — | — | — | — | — | — | D |
| Example 5 | 0° | 145 | 0.90 | 1.01 | 90° | −95 | A | A |
| Example 6 | 0° | 145 | 0.90 | 1.01 | 90° | −95 | A | A |
| Example 7 | 0° | 145 | 0.90 | 1.01 | 90° | −95 | A | A |
| Example 8 | 0° | 145 | 0.90 | 1.01 | 90° | −70 | A | C |
| Example 9 | 0° | 145 | 0.90 | 1.01 | 90° | −70 | A | A |

Example 10

(Preparation of Anti-Reflection Plate for Organic EL)

An anti-reflection plate for an organic EL was prepared by the following procedure, using a laminate having a polarizing film (prepared by dispersing iodine in a polyvinyl alcohol, followed by stretching) having a thickness of 20 μm only one surface of which was protected with triacetyl cellulose (thickness of 40 μm).

An optical film, in which the positive A-plate A-0 (11) and the positive C-plate 11, each prepared in the same manner as in Example 1 (provided that the thickness of the positive C-plate is controlled so as to have an Rth of −65 nm at a wavelength of 550 nm) were laminated on the non-protected surface (polarizing film including a polyvinyl alcohol, stretched), was bonded by an optically isotropic adhesive (SK2057, manufactured by Soken Chemical & Engineering Co., Ltd.) to prepare an anti-reflection plate (circularly polarizing plate) for an organic EL. Here, the angle formed between the transmission axis of the polarizing film and the slow axis of the positive A-plate A-0 (11) was set to 45°.

Examples 11 to 13

According to the same procedure as in Example 10, except that in the preparation of the optical film of Example 10, the positive A-plate A-0 was changed to each of the positive A-plate A-0 (12) to (14) prepared by the methods of Examples 2 to 4, each of anti-reflection plates 12 to 14 (circularly polarizing plates) for an organic EL was prepared.

Furthermore, in Example 12, exposure was conducted by setting a wire grid polarizer to be parallel to the surface of the photo-alignment film 3 prepared by the method of Example 3 and setting the angle between the transmission axis of the wire grid polarizer and the absorption axis of the polarizing plate to 45°.

Comparative Example 2

<Preparation of Positive C-Plate 15>

The following coating liquid 15 for a positive C-plate was prepared.

| Composition of coating liquid 15 for positive C-plate | |
|---|---|
| Forward wavelength dispersion polymer N-3 | 100 parts by mass |
| 4,4'-Bis(diethylamino) benzophenone | 2 parts by mass |
| Cyclohexanone | 588 parts by mass |

Forward wavelength dispersion polymer N-3; the polymer (1) described in Example 1 of JP2012-255926A A triacetyl cellulose film having the alignment film 1 on the surface thereof was prepared by the same procedure as in Example 1-1. The coating liquid 15 for a positive C-plate was applied onto the surface, using a bar coater, heated and aged at a film surface temperature of 100° C. for 60 seconds, and then cooled to 70° C. Thereafter, the film was irradiated with ultraviolet rays at 1000 mJ/cm$^2$ using an air-cooled metal halide lamp (manufactured by Eye Graphics Co., Ltd.) under an atmospheric air to fix the alignment state, thereby forming a positive C-plate 15. The dependence of Re on light incident angle and the tilt angle of the optical axis were measured using an automatic birefringence meter (KOBRA-21ADH, manufactured by Oji Scientific Instruments), and it was found that the forward wavelength dispersion polymer was homeotropically aligned with an Re of 0 nm and an Rth of −65 nm at a wavelength of 550 nm, and a tilt angle of the optical axis of 90°. At this time, the film thickness was 0.6 μm.

<Lamination of Positive C-Plate 6-6 and Positive A-Plate A-0 (15)>

The following coating liquid 15 for a positive A-plate was prepared.

| Composition of Coating Liquid 15 for Forming Positive A-Plate A-0 | |
|---|---|
| Forward wavelength dispersion polymer N-4 | 84 parts by mass |
| Forward dispersion low-molecular compound N-5 | 16 parts by mass |
| 4,4'-Bis(diethylamino) benzophenone | 2 parts by mass |
| Toluene | 588 parts by mass |

Forward wavelength dispersion polymer N-4; the polymer (2) described in Example 1 of JP2012-255926A Forward dispersion low-molecular compound N-5; the low-molecular (1) described in Example 1 of JP2012-255926A The coating liquid 15 for a positive A-plate A-0 was applied onto the side of the liquid crystal layer of the positive C-plate 15 prepared above, using a bar coater, and then irradiated with ultraviolet rays using an air-cooled metal halide lamp (manufactured by Eye Graphics Co., Ltd.) at 160 W/cm under an atmospheric air. At this time, exposure was performed while setting a wire grid polarizer (ProFlux PPL02, manufactured by Moxtek Inc.) to be parallel to the surface of the positive C-plate 15. The light intensity of the ultraviolet rays used herein was set to 100 mW/cm$^2$ in a UV-A region (integrated value at a wavelength of 380 nm to 320 nm), and the irradiation dose was set to 1000 mJ/cm$^2$ in the UV-A region. Further, the resultant was heated and aged at a film surface temperature of 100° C. for 60 seconds, and then cooled to 70° C. Thereafter, the film was irradiated with ultraviolet rays at 1000 mJ/cm$^2$ using an air-cooled metal halide lamp (manufactured by Eye Graphics Co., Ltd.) under an atmospheric air to fix the alignment state, thereby forming a positive A-plate A-0 (15). The dependence of Re on light incident angle and the tilt angle of the optical axis were measured using an automatic birefringence meter (KOBRA-21ADH, manufactured by Oji Scientific Instruments), and it was found that the forward wavelength dispersion polymer was homogeneously aligned with an Re of 130 nm and an Rth of 65 nm at a wavelength of 550 nm, an Re(450)/Re(550) of 1.15, an Re(650)/Re(550) of 0.90, and a tilt angle of the optical axis of 0°.

By the same procedure as in Example 10, except that the optical film of Example 10 was changed to the laminate, an anti-reflection plate 15 (circularly polarizing plate) for an organic EL was prepared.

<Mounting into Organic EL Element and Evaluation of Display Performance>

(Mounting into Display Apparatus)

GALAXY SII manufactured by SAMSUNG having an organic EL panel mounted therein was decomposed to peel a circularly polarizing plate, and the anti-reflection plates of Examples 5 to 8, and Comparative Example 2 were bonded to the surface of the positive C-plates peeled on the peeled surface, thereby preparing display apparatuses. For the bonding, an optically isotropic adhesive (SK2057, manufactured by Soken Chemical & Engineering Co., Ltd.) was used.

(Evaluation of Display Performance)

The visibility under bright light and the display quality of the organic EL display apparatuses prepared were evaluated.

The display apparatuses were allowed to perform white display, black display, and image display, and reflected light was observed when fluorescent light and the like were applied at a front surface and a polar angle of 60 degrees. The display qualities at the front surface and the polar angle of 60 degrees were evaluated in accordance with the following criteria.

4: The color shift is not visually recognized at all (acceptable).
3: The color difference is visually recognized, but is negligible (acceptable).
2: The color difference is visually recognized, but the amount of reflected light is small, which is not a problem for use (acceptable).
1: The color difference is visually recognized and the amount of reflected light is large, which is thus unacceptable.

TABLE 2

|  | Positive A-plate | | | | Positive C-plate | Total | Display performance | |
| --- | --- | --- | --- | --- | --- | --- | --- | --- |
|  | Tilt angle | Re(550) (nm) | Re(450)/ Re(550) | Re(650)/ Re(550) | Rth(550) (nm) | Rth(550) (nm) | Rth(550) (nm) | Front surface | Polar angle of 60° |
| Example 10 | 0.4° | 130 | 0.84 | 1.02 | 65 | −65 | 0 | 4 | 4 |
| Example 11 | 0° | 130 | 0.85 | 1.01 | 65 | −65 | 0 | 4 | 4 |
| Example 12 | 0° | 130 | 0.83 | 1.05 | 65 | −65 | 0 | 4 | 4 |
| Example 13 | 0° | 130 | 0.88 | 1 | 65 | −65 | 0 | 3 | 3 |
| Comparative Example 2 | 0° | 130 | 1.15 | 0.9 | 65 | −65 | 0 | 2 | 1 |

Examples 14 to 16

According to the same procedure as in Example 11, except that in the preparation of the anti-reflection plate (circularly polarizing plate) for an organic EL in Example 6, the thickness of the polarizing film was changed to each of 8 μm, 5 μm, and 3 μm, each of anti-reflection plates (circularly polarizing plates) 16 to 18 for an organic EL were prepared.

<Mounting into Organic EL Element and Evaluation of Display Performance>

For each of anti-reflection plates (circularly polarizing plate) for an organic EL of Examples 14 to 16, mounting into an organic EL Element and evaluation of display performance were carried out according to the same procedure as in Example 11.

The results are shown in Table 3 below.

TABLE 3

| | Film thickness (μm) of polarizing film | Display performance | |
| --- | --- | --- | --- |
| | | Front surface | Polar angle of 60° |
| Example 14 | 8 | 4 | 4 |
| Example 15 | 5 | 4 | 3 |
| Example 16 | 3 | 3 | 3 |

Example 17

(Preparation of Coating-Type Polarizing Plate 19)

The following coating liquid 19 for a coating-type polarizing plate was prepared.

| Composition of coating liquid 19 for coating-type polarizing plate | |
| --- | --- |
| Dichromatic dye PB-9 | 50 parts by mass |
| Dichromatic dye C-3 | 30 parts by mass |
| Dichromatic dye C-15 | 20 parts by mass |

-continued

| Composition of coating liquid 19 for coating-type polarizing plate | |
|---|---|
| Fluorine-contaning compound C | 0.3 parts by mass |
| Chloroform | 1900 parts by mass |

Fluorine-containing compound C

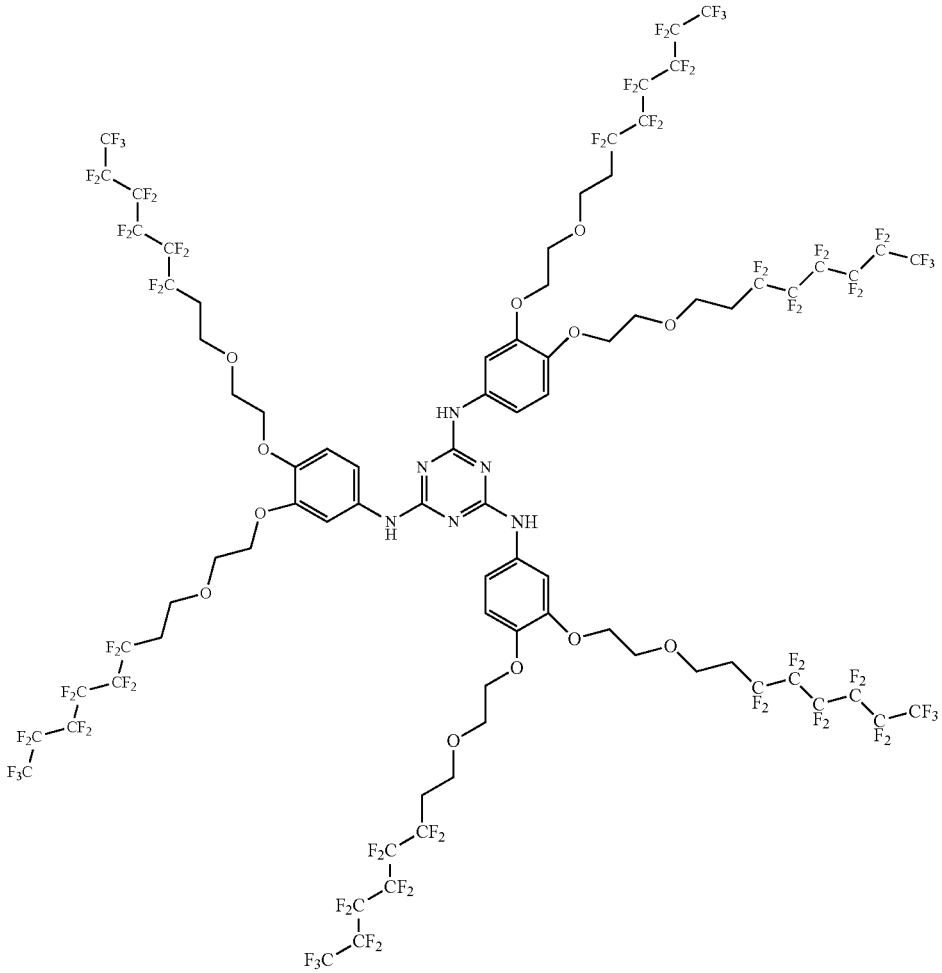 [SMILES: FC(F)(F)C(F)(F)C(F)(F)C(F)(F)C(F)(F)C(F)(F)CCOCCOc1ccc(Nc2nc(Nc3ccc(OCCOCCC(F)(F)C(F)(F)C(F)(F)C(F)(F)C(F)(F)C(F)(F)F)c(OCCOCCC(F)(F)C(F)(F)C(F)(F)C(F)(F)C(F)(F)C(F)(F)F)c3)nc(Nc3ccc(OCCOCCC(F)(F)C(F)(F)C(F)(F)C(F)(F)C(F)(F)C(F)(F)F)c(OCCOCCC(F)(F)C(F)(F)C(F)(F)C(F)(F)C(F)(F)C(F)(F)F)c3)n2)cc1OCCOCCC(F)(F)C(F)(F)C(F)(F)C(F)(F)C(F)(F)C(F)(F)F]

The alignment film 1 was formed on the surface of a commercially available PET film (16 μm thickness) in the same manner as in Example 1-1, and subjected to a rubbing treatment. On the rubbing-treated surface, a coating liquid 19 for a coating-type polarizing plate was coated, using a bar coater, heated and aged at a film surface temperature of 160° C. for 15 seconds, and cooled to room temperature, thereby obtaining a coating-type polarizing plate 19 having a polarizing film formed on the film. The coating-type polarizing plate 19 thus formed was parallel to the absorption axis in the rubbing direction. The polarization degree was 98.

In addition, the polarization degree denotes the ratio of the light intensity of the polarized components in the transmitted light of the polarizing film. In the present invention, in the case where the transmittance at which two polarizing films were in para Nicols was T (para), and the transmittance at which two polarizing films were in cross Nicols was T (cross), the average value in the following expression P, measured at every 1 nm in the wavelength region of 400 nm to 700 nm was defined as a polarization degree. For the measurement, Automatic Polarizing Film Measurement VAP-7070, manufactured by JASCO Corporation, was used.

$P=((T(\text{para})-T(\text{cross}))/(T(\text{para})+T(\text{cross})))^{1/2} \times 100$ (Preparation of Anti-Reflection Plate (Circularly Polarizing Plate) for Organic EL)

By the same procedure as in Example 6, except that the polarizing plate was changed to a coating-type polarizing plate 17 in the preparation of the anti-reflection plate for an organic EL (circularly polarizing plate) of Example 11, an anti-reflection plate 19 for an organic EL (circularly polarizing plate) was prepared.

Example 18

By the same procedure as in Example 17, except that the amount of chloroform in the coating liquid 19 for a coating-type polarizing plate was changed to 2600 parts by mass, an anti-reflection plate 20 for an organic EL (circularly polarizing plate) was prepared.

Example 19

(Preparation of Anti-Reflection Plate for Organic EL)

An anti-reflection plate for an organic EL was prepared using a polyethylene terephthalate film (PET; thickness of 16 μm) having an easily-adhesive layer on one surface was prepared.

<Preparation of Alignment Film 21>

A coating liquid for forming an alignment film 21 having the following composition was applied onto the surface of the easily-adhesive surface of PET with a #8 wire bar, and dried with hot air at 60° C. for 60 seconds and further dried with hot air at 100° C. for 120 seconds, thereby forming an alignment film 21.

| Composition of Coating Liquid for Forming Alignment Film 21 | |
|---|---|
| Modified polyvinyl alcohol below | 2.4 parts by mass |
| Isopropyl alcohol | 1.6 parts by mass |
| Methanol | 36 parts by mass |
| Water | 60 parts by mass |

Modified polyvinyl alcohol

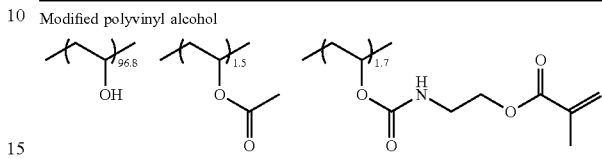

<Preparation of Coating-Type Polarizing Plate 21>

The following coating liquid 21 for a coating-type polarizing plate was prepared.

| Composition of coating liquid 21 for coating-type polarizing plate | |
|---|---|
| Dichromatic dye Y-21 | 52 parts by mass |
| Dichromatic dye M-21 | 23 parts by mass |
| Dichromatic dye C-21-1 | 15 parts by mass |
| Dichromatic dye C-21-2 | 10 parts by mass |
| Fluorine-containing compound C | 0.3 parts by mass |
| Photopolymerization initiator (Irgacure 819, manufactured by BASF Japan Ltd.) | 3.0 parts by mass |
| Chloroform | 1900 parts by mass |

Y-21

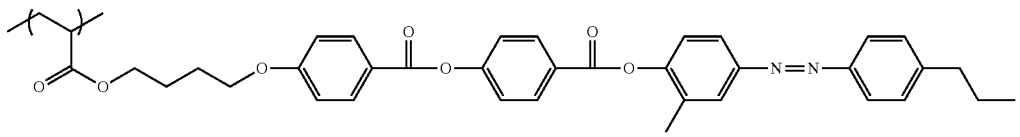

BT-12383

M-21

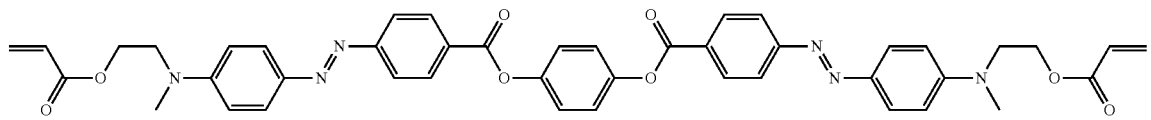

FM-7976

C-21-1

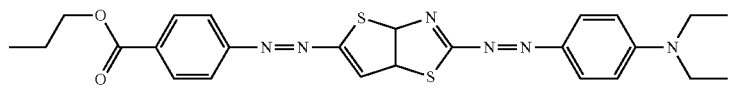

FT-21800

C-21-2

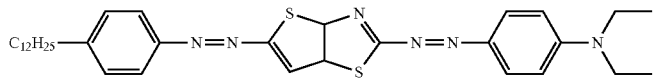

FM-8305

The aforementioned alignment film 21 was subjected to a rubbing treatment. A coating liquid 21 for forming a coating-type polarizing plate was applied onto the rubbing-treated surface, using a bar coater, and then heated and aged at a temperature of the film surface of 160° C. for 15 seconds, cooled to room temperature, and then irradiated with ultraviolet rays at 1000 mJ/cm² using an air-cooled metal halide lamp (manufactured by Eye Graphics Co., Ltd.) under nitrogen to fix the alignment state, thereby forming a coating-type polarizing plate 21. In the coating-type polarizing plate 21 thus formed, the absorption axis was parallel to the rubbing direction. The polarization degree was 98.

<Preparation of Alignment Film 21-1>

A coating liquid for forming an alignment film 14 was applied onto the surface of the coating-type polarizing plate 21 with a #8 wire bar, and dried with hot air at 60° C. for 60 seconds and further dried with hot air at 100° C. for 120 seconds, thereby forming an alignment film 21-1.

<Preparation of Positive A-Plate A-0 (21)-Bonded Polarizing Plate>

The alignment film 21-1 thus prepared was to a rubbing treatment at an angle of 45° with respect to the transmission axis of the coating-type polarizing plate, and then the coating liquid 10 for forming the positive A-plate A-0 was coated thereonto, using a bar coater, and then heated and aged at a temperature of the film surface of 80° C. for 20 seconds, and then irradiated with ultraviolet rays at 1000 mJ/cm² using an air-cooled metal halide lamp (manufactured by Eye Graphics Co., Ltd.) under atmospheric air to fix the alignment state, thereby forming a positive A-plate A-0 (21) In the positive A-plate A-0 (21) thus formed, the slow axis direction was parallel to the rubbing direction (that is, the slow axis direction was at an angle of 45° with respect to the polarizing plate). The dependence of Re on light incident angle and the tilt angle of the optical axis were measured using an automatic birefringence meter (KOBRA-21ADH, manufactured by Oji Scientific Instruments), and it was found that the reverse wavelength dispersion liquid crystal compound was homogeneously aligned with an Re of 137 nm and an Rth of 69 nm at a wavelength of 550 nm, an Re(450)/Re(550) of 0.90, an Re(650)/Re(550) of 1.01, and a tilt angle of the optical axis of 0°.

<Preparation of Anti-Reflection Plate for an organic EL 21(circularly polarizing plate 21)>

The following coating liquid 10 for forming a positive C-plate was directly applied onto the positive A-plate A-0 (21), and then heated and aged at 40° C. for 60 seconds, and then irradiated with ultraviolet rays at 1000 mJ/cm² using an air-cooled metal halide lamp (manufactured by Eye Graphics Co., Ltd.) under atmospheric air to fix the alignment state, thereby forming a positive C-plate 21. It was found that the polymerizable rod-shaped liquid crystal compound was homeotropically aligned with an Re of 0 nm and an Rth of −69 nm at a wavelength of 550 nm, and a tilt angle of the optical axis of 90°. Thus, a circularly polarizing plate 21, in which the positive A-plate A-0 (21) and the positive C-plate 21 were directly laminated on the polarizing plate, was prepared.

<Mounting into Organic EL Element and Evaluation of Display Performance>

For the anti-reflection plates of Examples 17 to 19, mounting into the organic EL element and evaluation of the display performance were carried out by the same procedure as in Example 11.

The results are shown in Table 4 below.

TABLE 4

| | Film thickness (nm) of polarizing film | Polarization degree | Display performance | |
| --- | --- | --- | --- | --- |
| | | | Front surface | Polar angle of 60° |
| Example 17 | 480 | 98 | 4 | 4 |
| Example 18 | 330 | 90 | 3 | 3 |
| Example 19 | 1000 | 99 | 4 | 4 |

What is claimed is:

1. An optical film comprising:
a positive A-plate A-0; and
a positive C-plate, wherein
Re(450) which is an in-plane retardation value measured at a wavelength of 450 nm, Re(550) which is an in-plane retardation value measured at a wavelength of 550 nm, and Re(650) which is an in-plane retardation value measured at a wavelength of 650 nm, of the positive A-plate A-0 satisfy a relationship of Re(450)≤Re(550)≤Re(650),
the positive A-plate A-0 is formed of a cured product of a composition including a reverse wavelength dispersion liquid crystal compound A0,
the positive C-plate is formed of a cured product of a composition including a liquid crystal compound C,
the liquid crystal compound A0 is a polymerizable rod-shaped liquid crystal compound, and
the liquid crystal compound A0 is fixed in a homogeneous alignment state in the positive A-plate A-0.

2. The optical film according to claim 1,
wherein the liquid crystal compound C is a polymerizable rod-shaped liquid crystal compound, and
the liquid crystal compound C is fixed in a homeotropic alignment state in the positive C- plate.

3. The optical film according to claim 1, wherein the positive A-plate A-0 exhibits Re(550), which is an in-plane retardation value measured at a wavelength of 550 nm, of 100 nm to 180 nm.

4. The optical film according to claim 2, wherein the positive C-plate exhibits an Re(550), which is an in-plane retardation value measured at a wavelength of 550 nm, of −10 nm to 10 nm, and an Rth(550), which is a retardation value measured at a wavelength of 550 nm in the thickness direction, of −180 nm to −10 nm.

5. The optical film according to claim 1, wherein the positive A-plate A-0 is directly in contact with the positive C-plate.

6. The optical film according to claim 1, wherein the positive C-plate is a layer obtained by curing the composition including the liquid crystal compound C directly applied onto the surface of the positive A-plate A-0.

7. The optical film according to claim 1, wherein at least one of the liquid crystal compound A0 and the liquid crystal compound C is a liquid crystal compound represented by the following general formula (II):

$L_1$-$G_1$-$D_1$-Ar-$D_2$-$G_2$-$L_2$  General Formula (II):

in the formula,
$D_1$ and $D_2$ 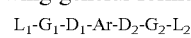 each independently represent —CO—O—, —O—CO—, —C(=S)O—, —O—C(=S)—, —$CR^1R^2$—, —$CR^1R^2$—$CR^3R^4$—, —O—$CR^1R^2$—, —$CR^1R^2$—O—, —$CR^1R^2$—O—$CR^3R^4$—, —$CR^1R^2$—O—CO—, —O—CO—$CR^1R^2$—, —$CR^1R^2$—O—CO—$CR^3R^4$—, —$CR^1R^2$—CO—O—$CR^3R^4$—, —$NR^1$—$CR^2R^3$—, —$CR^1R^2$—$NR^3$—, —CO—$NR^1$—, or —$NR^1$—CO—, $R^1$, $R^2$, $R^3$, and $R^4$ each independently represent a hydrogen atom, a halogen atom, or an alkyl group having 1 to 4 carbon atoms, $G_1$ and $G_2$ each independently represent a divalent alicyclic hydrocarbon group having 5 to 8 carbon atoms, a methylene group contained in the alicyclic hydrocarbon group may be substituted with —O—, —S—, or —N($R^6$)—, $R^6$ represents a hydrogen atom or an alkyl group having 1 to 6 carbon atoms, $L_1$ and $L_2$ each independently represent a monovalent organic group, and at least one selected from a group consisting of $L_1$ and $L_2$ represents a monovalent group having a polymerizable group, and Ar represents a divalent aromatic ring group represented by the following general formula (II-1), (II-2), (II-3), or (II-4):

General formula

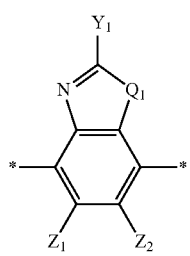

(II-1)

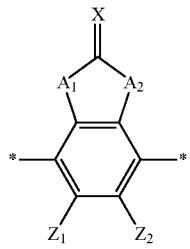

(II-2)

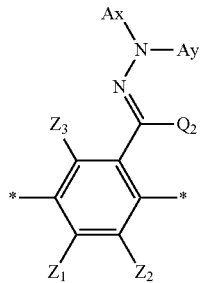

(II-3)

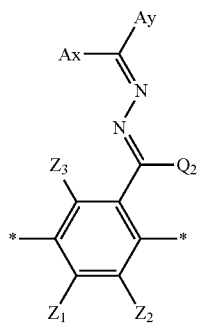

(II-4)

in Formulae (II-1) to (II-4), $Q_1$ represents —S—, —O—, or $NR^{11}$—, $R^{11}$ represents a hydrogen atom or an alkyl group having 1 to 6 carbon atoms, $Y_1$ represents an aromatic hydrocarbon group having 6 to 12 carbon atoms, or an aromatic heterocyclic group having 3 to 12 carbon atoms, $Z_1$, $Z_2$, and $Z_3$ each independently represent a hydrogen atom or an aliphatic hydrocarbon group having 1 to 20 carbon atoms, an alicyclic hydrocarbon group having 3 to 20 carbon atoms, an aromatic monovalent hydrocarbon group having 6 to 20 carbon atoms, a halogen atom, a cyano group, a nitro group, —$NR^{12}R^{13}$, or $SR^{12}$, $Z_1$ and $Z_2$ may be bonded to each other to form an aromatic ring or an aromatic heterocycle, and $R^{12}$ and $R^{13}$ each independently represent a hydrogen atom or an alkyl group having 1 to 6 carbon atoms, $A_1$ and $A_2$ each independently represent a group selected from the group consisting of —O—, —$NR^{21}$—, —S—, and CO—, in which $R^{21}$ represents a hydrogen atom or a substituent, X represents a hydrogen atom or a carbon atom or a sulfur atom, to which a substituent may be bonded, Ax represents an organic group having 2 to 30 carbon atoms, having at least one aromatic ring selected from the group consisting of an aromatic hydrocarbon ring and an aromatic heterocycle, Ay represents a hydrogen atom, an alkyl group having 1 to 6 carbon atoms, which may have a substituent, or an organic group having 2 to 30 carbon atoms, having at least one aromatic ring selected from the group consisting of an aromatic hydrocarbon ring and an aromatic heterocycle, the aromatic ring contained in Ax and Ay may have a substituent, and Ax and Ay may be bonded to each other to form a ring, and $Q_2$ represents a hydrogen atom, or an alkyl group having 1 to 6 carbon atoms, which may have a substituent.

8. The optical film according to claim 1, wherein the composition containing the liquid crystal compound A0 contains a cross-linkable polymer in the amount of 0.1% by mass to 20.0% by mass with respect to the total mass of the liquid crystal compound, and the cross-linkable polymer is a non-liquid crystal polymer having a polymerizable group.

9. The optical film according to claim 8, wherein the cross-linkable polymer has an acryloyl group or a methacryloyl group in the repeating unit.

10. The optical film according to claim 1, further comprising:
an alignment film,
wherein the alignment film, the positive A-plate A-0, and the positive C-plate are provided in this order, the alignment film is directly in contact with the positive A-plate A-0, and the positive A-plate A-0 is directly in contact with the positive C-plate.

11. A polarizing plate comprising:
a linearly polarizing film; and
the optical film according to claim 1.

12. The polarizing plate according to claim 11, wherein the linearly polarizing film is directly in contact with the optical film.

13. The polarizing plate according to claim 11, wherein the linearly polarizing film, the positive A-plate A-0, and the positive C-plate are provided in this order, and the angle formed between the slow axis of the positive A-plate A-0 and the absorption axis of the linearly polarizing film is 90°.

14. The polarizing plate according to claim 11, wherein the linearly polarizing film, the positive C-plate, and the positive A-plate A-0 are in provided this order, and the slow axis of the positive A-plate A-0 is parallel to the absorption axis of the linearly polarizing film.

15. The polarizing plate according to claim 14, which is a circularly polarizing plate.

16. A display apparatus comprising the optical film according to claim 1.

17. An anti-reflection plate comprising:
the optical film according to claim 1; and
a linearly polarizing film, wherein the angle formed between the slow axis of the positive A-plate A-0 and the absorption axis of the linearly polarizing film is 45°.

18. A method for producing the optical film according to claim 1, comprising:
applying a composition containing the liquid crystal compound C onto the surface of the positive A-plate A-0;
heating the applied composition containing the liquid crystal compound C to homeotropically align the liquid crystal compound C; and
irradiating the composition containing the homeotropically aligned liquid crystal compound C with ultraviolet rays to obtain the positive C-plate.

19. The method according to claim 18, wherein the optical film further comprises a support, and
the method further comprising:
applying a composition containing the liquid crystal compound A0 onto the support;
heating the composition containing the liquid crystal compound A0 to homogeneously align the liquid crystal compound A0; and
irradiating the composition containing the homogeneously aligned liquid crystal compound A0 with ultraviolet rays to obtain the positive A-plate A-0.

20. The optical film according to claim 1, wherein Re(450)/Re(550) satisfies 0.88 or lower.

21. The optical film according to claim 1, wherein Re(450)/Re(550) satisfies 0.83 to 0.85.

22. An organic EL display apparatus comprising the optical film according to claim 1.

23. The organic EL display according to claim 22, wherein Re(450)/Re(550) satisfies 0.88 or lower.

24. The organic EL display according to claim 22, wherein Re(450)/Re(550) satisfies 0.83 to 0.85.

* * * * *